United States Patent
Lindemann et al.

(10) Patent No.: US 12,041,039 B2
(45) Date of Patent: Jul. 16, 2024

(54) SYSTEM AND METHOD FOR ENDORSING A NEW AUTHENTICATOR

(71) Applicant: Nok Nok Labs, Inc., San Jose, CA (US)

(72) Inventors: Rolf Lindemann, Steele (DE); Matthew Lourie, San Jose, CA (US)

(73) Assignee: Nok Nok Labs, Inc., San Jose, CA (US)

( * ) Notice: Subject to any disclaimer, the term of this patent is extended or adjusted under 35 U.S.C. 154(b) by 0 days.

(21) Appl. No.: 16/289,145

(22) Filed: Feb. 28, 2019

(65) Prior Publication Data

US 2020/0280550 A1    Sep. 3, 2020

(51) Int. Cl.
*H04L 9/40* (2022.01)
*H04L 9/08* (2006.01)
*H04L 9/32* (2006.01)

(52) U.S. Cl.
CPC .......... *H04L 63/08* (2013.01); *H04L 9/0894* (2013.01); *H04L 9/3247* (2013.01); *H04L 63/0428* (2013.01)

(58) Field of Classification Search
CPC ... H04L 63/08; H04L 63/0428; H04L 9/3247; H04L 9/0894; H04L 63/0892; H04L 63/0884; H04L 63/0861; H04L 9/3231; H04W 12/06; G06F 21/31
See application file for complete search history.

(56) References Cited

U.S. PATENT DOCUMENTS

| | | | |
|---|---|---|---|
| 5,272,754 A | 12/1993 | Boerbert et al. |
| 5,280,527 A | 1/1994 | Gullman et al. |
| 5,588,061 A | 12/1996 | Ganesan et al. |
| 5,613,012 A | 3/1997 | Hoffman et al. |
| 5,764,789 A | 6/1998 | Pare, Jr. et al. |
| 5,892,900 A | 4/1999 | Ginter et al. |
| 6,035,406 A | 3/2000 | Moussa et al. |

(Continued)

FOREIGN PATENT DOCUMENTS

| | | | |
|---|---|---|---|
| AU | 1539501 A | 6/2001 |
| CA | 2933336 A1 | 10/2015 |

(Continued)

OTHER PUBLICATIONS

Biryukov et al., "Argon2: the memory-hard function for password hashing and other applications", Version 1.2.1 of Argon2: PHC release, Dec. 26, 2015, pp. 1-18.

(Continued)

*Primary Examiner* — Aravind K Moorthy
(74) *Attorney, Agent, or Firm* — NICHOLSON DE VOS WEBSTER & ELLIOTT LLP

(57) ABSTRACT

A system, apparatus, method, and machine-readable medium are described for endorsing authenticators. For example, one embodiment of an apparatus comprises: a first instance of an authenticator associated with a first app to allow a user of the first app to authenticate with a first relying party; a secure key store accessible by the first instance of the authenticator to securely store authentication data related to the first app; and a synchronization processor to share at least a portion of the authentication data with a second instance of the authenticator associated with a second app to be executed on the apparatus.

18 Claims, 22 Drawing Sheets

(56) References Cited

U.S. PATENT DOCUMENTS

| | | | |
|---|---|---|---|
| 6,088,450 A | 7/2000 | Davis et al. | |
| 6,178,511 B1 | 1/2001 | Cohen et al. | |
| 6,233,685 B1* | 5/2001 | Smith | G06F 21/34 |
| | | | 713/193 |
| 6,270,011 B1 | 8/2001 | Gottfried | |
| 6,377,691 B1 | 4/2002 | Swift et al. | |
| 6,510,236 B1 | 1/2003 | Crane et al. | |
| 6,588,812 B1 | 7/2003 | Garcia et al. | |
| 6,618,806 B1 | 9/2003 | Brown et al. | |
| 6,751,733 B1 | 6/2004 | Nakamura et al. | |
| 6,801,998 B1 | 10/2004 | Hanna et al. | |
| 6,842,896 B1 | 1/2005 | Redding et al. | |
| 6,938,156 B2 | 8/2005 | Wheeler et al. | |
| 7,155,035 B2 | 12/2006 | Kondo et al. | |
| 7,194,761 B1 | 3/2007 | Champagne | |
| 7,194,763 B2 | 3/2007 | Potter et al. | |
| 7,263,717 B1 | 8/2007 | Boydstun et al. | |
| 7,444,368 B1 | 10/2008 | Wong et al. | |
| 7,487,357 B2 | 2/2009 | Smith et al. | |
| 7,512,567 B2 | 3/2009 | Bemmel et al. | |
| 7,526,649 B2* | 4/2009 | Wiseman | H04L 63/0823 |
| | | | 713/180 |
| 7,698,565 B1 | 4/2010 | Bjorn et al. | |
| 7,747,862 B2* | 6/2010 | Ovadia | H04L 9/0877 |
| | | | 713/176 |
| 7,865,937 B1 | 1/2011 | White et al. | |
| 7,941,669 B2 | 5/2011 | Foley et al. | |
| 8,006,300 B2 | 8/2011 | Mizrah | |
| 8,060,922 B2 | 11/2011 | Crichton et al. | |
| 8,132,017 B1* | 3/2012 | Lewis | G06Q 20/206 |
| | | | 713/183 |
| 8,166,531 B2 | 4/2012 | Suzuki | |
| 8,185,457 B1 | 5/2012 | Bear et al. | |
| 8,245,030 B2 | 8/2012 | Lin | |
| 8,284,043 B2 | 10/2012 | Judd et al. | |
| 8,291,468 B1 | 10/2012 | Chickering | |
| 8,353,016 B1 | 1/2013 | Pravetz et al. | |
| 8,359,045 B1 | 1/2013 | Hopkins, III | |
| 8,380,637 B2 | 2/2013 | Levovitz | |
| 8,412,928 B1 | 4/2013 | Bowness | |
| 8,458,465 B1 | 6/2013 | Stern et al. | |
| 8,489,506 B2 | 7/2013 | Hammad et al. | |
| 8,516,552 B2 | 8/2013 | Raleigh | |
| 8,526,607 B2 | 9/2013 | Liu et al. | |
| 8,555,340 B2 | 10/2013 | Potter et al. | |
| 8,561,152 B2 | 10/2013 | Novak et al. | |
| 8,584,219 B1 | 11/2013 | Toole et al. | |
| 8,584,224 B1 | 11/2013 | Pei et al. | |
| 8,607,048 B2 | 12/2013 | Nogawa | |
| 8,646,060 B1 | 2/2014 | Ben | |
| 8,713,325 B2 | 4/2014 | Ganesan | |
| 8,719,905 B2 | 5/2014 | Ganesan | |
| 8,745,698 B1 | 6/2014 | Ashfield et al. | |
| 8,776,180 B2 | 7/2014 | Kumar et al. | |
| 8,843,997 B1 | 9/2014 | Hare | |
| 8,856,541 B1 | 10/2014 | Chaudhury et al. | |
| 8,949,978 B1 | 2/2015 | Lin et al. | |
| 8,958,599 B1 | 2/2015 | Starner | |
| 8,978,117 B2 | 3/2015 | Bentley et al. | |
| 9,015,482 B2 | 4/2015 | Baghdasaryan et al. | |
| 9,032,485 B2 | 5/2015 | Chu et al. | |
| 9,083,689 B2 | 7/2015 | Lindemann et al. | |
| 9,118,657 B1* | 8/2015 | Shetty | H04L 63/0884 |
| 9,161,209 B1 | 10/2015 | Ghoshal et al. | |
| 9,171,306 B1 | 10/2015 | He et al. | |
| 9,172,687 B2 | 10/2015 | Baghdasaryan et al. | |
| 9,183,023 B2 | 11/2015 | Pires et al. | |
| 9,219,732 B2 | 12/2015 | Baghdasaryan et al. | |
| 9,306,754 B2 | 4/2016 | Baghdasaryan et al. | |
| 9,317,705 B2 | 4/2016 | O'Hare et al. | |
| 9,367,678 B2 | 6/2016 | Pal et al. | |
| 9,396,320 B2 | 7/2016 | Lindemann | |
| 9,521,548 B2 | 12/2016 | Fosmark et al. | |
| 9,547,760 B2 | 1/2017 | Kang et al. | |
| 9,633,322 B1 | 4/2017 | Burger | |
| 9,654,469 B1* | 5/2017 | Yang | H04L 67/02 |
| 9,692,599 B1* | 6/2017 | Krahn | H04L 9/3247 |
| 9,698,976 B1 | 7/2017 | Statica et al. | |
| 9,750,205 B2 | 9/2017 | Van Dun | |
| 9,754,100 B1* | 9/2017 | Hitchcock | H04L 9/0891 |
| 9,886,701 B1* | 2/2018 | Llora | G06F 21/554 |
| 9,887,983 B2 | 2/2018 | Lindemann et al. | |
| 10,057,243 B1* | 8/2018 | Kumar | H04L 9/321 |
| 10,091,195 B2 | 10/2018 | Lindemann | |
| 10,133,867 B1* | 11/2018 | Brandwine | G06F 21/567 |
| 10,631,164 B2* | 4/2020 | Yang | H04L 63/0815 |
| 10,762,229 B2* | 9/2020 | Sion | H04L 67/1097 |
| 11,190,504 B1 | 11/2021 | Ah et al. | |
| 2001/0034719 A1 | 10/2001 | Durand et al. | |
| 2001/0037451 A1 | 11/2001 | Bhagavatula et al. | |
| 2002/0010857 A1 | 1/2002 | Karthik | |
| 2002/0016913 A1 | 2/2002 | Wheeler et al. | |
| 2002/0037736 A1 | 3/2002 | Kawaguchi et al. | |
| 2002/0040344 A1 | 4/2002 | Preiser et al. | |
| 2002/0054695 A1 | 5/2002 | Bjorn et al. | |
| 2002/0067832 A1 | 6/2002 | Jablon | |
| 2002/0073316 A1 | 6/2002 | Collins et al. | |
| 2002/0073320 A1 | 6/2002 | Rinkevich et al. | |
| 2002/0082962 A1 | 6/2002 | Farris et al. | |
| 2002/0087894 A1 | 7/2002 | Foley et al. | |
| 2002/0112157 A1 | 8/2002 | Doyle et al. | |
| 2002/0112170 A1 | 8/2002 | Foley et al. | |
| 2002/0174344 A1 | 11/2002 | Ting | |
| 2002/0174348 A1 | 11/2002 | Ting | |
| 2002/0190124 A1 | 12/2002 | Piotrowski | |
| 2003/0007645 A1* | 1/2003 | Ofir | H04L 63/0823 |
| | | | 380/282 |
| 2003/0021283 A1 | 1/2003 | See et al. | |
| 2003/0035548 A1* | 2/2003 | Kwan | H04L 63/04 |
| | | | 713/155 |
| 2003/0051171 A1* | 3/2003 | Pearson | G06Q 30/02 |
| | | | 726/4 |
| 2003/0055792 A1 | 3/2003 | Kinoshita et al. | |
| 2003/0065805 A1 | 4/2003 | Barnes et al. | |
| 2003/0084300 A1 | 5/2003 | Koike | |
| 2003/0087629 A1 | 5/2003 | Juitt et al. | |
| 2003/0115142 A1 | 6/2003 | Brickell et al. | |
| 2003/0135740 A1 | 7/2003 | Talmor et al. | |
| 2003/0152252 A1 | 8/2003 | Kondo et al. | |
| 2003/0182551 A1 | 9/2003 | Frantz et al. | |
| 2003/0226036 A1 | 12/2003 | Bivens et al. | |
| 2003/0236991 A1 | 12/2003 | Letsinger | |
| 2004/0039909 A1 | 2/2004 | Cheng | |
| 2004/0039946 A1* | 2/2004 | Smith | H04L 63/083 |
| | | | 726/6 |
| 2004/0093372 A1 | 5/2004 | Chen et al. | |
| 2004/0101170 A1 | 5/2004 | Tisse et al. | |
| 2004/0123153 A1 | 6/2004 | Wright et al. | |
| 2004/0243801 A1 | 12/2004 | Chen et al. | |
| 2005/0021964 A1 | 1/2005 | Bhatnagar et al. | |
| 2005/0080716 A1 | 4/2005 | Belyi et al. | |
| 2005/0097320 A1 | 5/2005 | Golan et al. | |
| 2005/0100166 A1 | 5/2005 | Smetters et al. | |
| 2005/0125295 A1 | 6/2005 | Tidwell et al. | |
| 2005/0136979 A1* | 6/2005 | Dietl | H04L 63/08 |
| | | | 455/558 |
| 2005/0160052 A1 | 7/2005 | Schneider et al. | |
| 2005/0187883 A1 | 8/2005 | Bishop et al. | |
| 2005/0223217 A1 | 10/2005 | Howard et al. | |
| 2005/0223236 A1 | 10/2005 | Yamada et al. | |
| 2005/0278253 A1 | 12/2005 | Meek et al. | |
| 2006/0026671 A1 | 2/2006 | Potter et al. | |
| 2006/0029062 A1 | 2/2006 | Rao et al. | |
| 2006/0064582 A1 | 3/2006 | Teal et al. | |
| 2006/0101136 A1 | 5/2006 | Akashika et al. | |
| 2006/0136727 A1* | 6/2006 | Voss | H04L 63/101 |
| | | | 713/175 |
| 2006/0149580 A1 | 7/2006 | Helsper et al. | |
| 2006/0156385 A1 | 7/2006 | Chiviendacz et al. | |
| 2006/0161435 A1 | 7/2006 | Atef et al. | |
| 2006/0161672 A1 | 7/2006 | Jolley et al. | |
| 2006/0174037 A1 | 8/2006 | Bernardi et al. | |
| 2006/0177061 A1 | 8/2006 | Orsini et al. | |
| 2006/0195689 A1 | 8/2006 | Blecken et al. | |

(56) References Cited

U.S. PATENT DOCUMENTS

| | | |
|---|---|---|
| 2006/0213978 A1 | 9/2006 | Geller et al. |
| 2006/0242415 A1* | 10/2006 | Gaylor .................... G06F 21/41 |
| | | 713/176 |
| 2006/0256108 A1* | 11/2006 | Scaralata .................. H04L 9/08 |
| | | 345/418 |
| 2006/0282670 A1 | 12/2006 | Karchov |
| 2006/0294390 A1 | 12/2006 | Navratil et al. |
| 2007/0005988 A1 | 1/2007 | Zhang et al. |
| 2007/0038568 A1 | 2/2007 | Greene et al. |
| 2007/0043949 A1* | 2/2007 | Bugbee .................. H04L 9/3247 |
| | | 713/176 |
| 2007/0077915 A1 | 4/2007 | Black et al. |
| 2007/0087756 A1 | 4/2007 | Hoffberg |
| 2007/0088950 A1 | 4/2007 | Wheeler et al. |
| 2007/0094165 A1 | 4/2007 | Gyorfi et al. |
| 2007/0100756 A1 | 5/2007 | Varma |
| 2007/0101138 A1 | 5/2007 | Camenisch et al. |
| 2007/0106895 A1 | 5/2007 | Huang et al. |
| 2007/0107048 A1 | 5/2007 | Halls et al. |
| 2007/0118883 A1 | 5/2007 | Potter et al. |
| 2007/0162581 A1* | 7/2007 | Maes ...................... H04L 61/15 |
| | | 709/223 |
| 2007/0165625 A1 | 7/2007 | Eisner et al. |
| 2007/0168677 A1 | 7/2007 | Kudo et al. |
| 2007/0169182 A1 | 7/2007 | Wolfond et al. |
| 2007/0180495 A1* | 8/2007 | Hardjono ............. H04W 12/069 |
| | | 726/3 |
| 2007/0198435 A1 | 8/2007 | Siegal et al. |
| 2007/0217590 A1 | 9/2007 | Loupia et al. |
| 2007/0220597 A1 | 9/2007 | Ishida |
| 2007/0226514 A1* | 9/2007 | Maletsky .............. H04L 9/3234 |
| | | 713/186 |
| 2007/0234417 A1 | 10/2007 | Blakley, III et al. |
| 2007/0239980 A1 | 10/2007 | Funayama |
| 2007/0278291 A1 | 12/2007 | Rans et al. |
| 2007/0286130 A1 | 12/2007 | Shao et al. |
| 2007/0288380 A1 | 12/2007 | Starrs |
| 2008/0005562 A1 | 1/2008 | Sather et al. |
| 2008/0024302 A1 | 1/2008 | Yoshida |
| 2008/0025234 A1 | 1/2008 | Zhu et al. |
| 2008/0028453 A1 | 1/2008 | Nguyen et al. |
| 2008/0034207 A1 | 2/2008 | Cam-Winget et al. |
| 2008/0046334 A1 | 2/2008 | Lee et al. |
| 2008/0046984 A1 | 2/2008 | Bohmer et al. |
| 2008/0049983 A1 | 2/2008 | Miller et al. |
| 2008/0072054 A1 | 3/2008 | Choi et al. |
| 2008/0086759 A1 | 4/2008 | Colson |
| 2008/0134311 A1 | 6/2008 | Medvinsky et al. |
| 2008/0141339 A1 | 6/2008 | Gomez et al. |
| 2008/0172725 A1 | 7/2008 | Fujii et al. |
| 2008/0184349 A1* | 7/2008 | Ting ...................... H04L 9/3231 |
| | | 726/7 |
| 2008/0184351 A1 | 7/2008 | Gephart et al. |
| 2008/0189212 A1 | 8/2008 | Kulakowski et al. |
| 2008/0196101 A1* | 8/2008 | Sade ...................... G06F 21/33 |
| | | 726/22 |
| 2008/0209545 A1 | 8/2008 | Asano |
| 2008/0232565 A1 | 9/2008 | Kutt et al. |
| 2008/0235801 A1 | 9/2008 | Soderberg et al. |
| 2008/0271150 A1 | 10/2008 | Boerger et al. |
| 2008/0289019 A1 | 11/2008 | Lam |
| 2008/0289020 A1 | 11/2008 | Cameron et al. |
| 2008/0313719 A1 | 12/2008 | Kaliski, Jr. et al. |
| 2008/0320308 A1 | 12/2008 | Kostiainen et al. |
| 2009/0025084 A1 | 1/2009 | Siourthas et al. |
| 2009/0049510 A1 | 2/2009 | Zhang et al. |
| 2009/0055322 A1 | 2/2009 | Bykov et al. |
| 2009/0064290 A1* | 3/2009 | Norman .................. G06F 21/41 |
| | | 726/5 |
| 2009/0064292 A1 | 3/2009 | Carter et al. |
| 2009/0077638 A1* | 3/2009 | Norman .................. G06F 21/41 |
| | | 726/5 |
| 2009/0083850 A1 | 3/2009 | Fadell et al. |
| 2009/0089870 A1 | 4/2009 | Wahl |
| 2009/0094164 A1 | 4/2009 | Fontaine et al. |
| 2009/0100269 A1 | 4/2009 | Naccache |
| 2009/0116651 A1 | 5/2009 | Liang et al. |
| 2009/0119221 A1 | 5/2009 | Weston et al. |
| 2009/0133113 A1 | 5/2009 | Schneider |
| 2009/0134972 A1 | 5/2009 | Wu et al. |
| 2009/0138724 A1 | 5/2009 | Chiou et al. |
| 2009/0138727 A1 | 5/2009 | Campello |
| 2009/0158425 A1 | 6/2009 | Chan et al. |
| 2009/0164797 A1 | 6/2009 | Kramer et al. |
| 2009/0183003 A1 | 7/2009 | Haverinen |
| 2009/0187988 A1 | 7/2009 | Hulten et al. |
| 2009/0193508 A1 | 7/2009 | Brenneman et al. |
| 2009/0196418 A1 | 8/2009 | Tkacik et al. |
| 2009/0199264 A1 | 8/2009 | Lang |
| 2009/0204964 A1 | 8/2009 | Foley et al. |
| 2009/0235339 A1 | 9/2009 | Mennes et al. |
| 2009/0240624 A1 | 9/2009 | James et al. |
| 2009/0245507 A1 | 10/2009 | Vuillaume et al. |
| 2009/0271618 A1 | 10/2009 | Camenisch et al. |
| 2009/0271635 A1 | 10/2009 | Liu et al. |
| 2009/0276474 A1* | 11/2009 | Sela ....................... G06F 21/10 |
| 2009/0300714 A1 | 12/2009 | Ahn |
| 2009/0300720 A1 | 12/2009 | Guo et al. |
| 2009/0307139 A1 | 12/2009 | Mardikar et al. |
| 2009/0323962 A1* | 12/2009 | Aciicmez ................ H04L 63/06 |
| | | 380/277 |
| 2009/0327131 A1 | 12/2009 | Beenau et al. |
| 2009/0327737 A1* | 12/2009 | Hsu ....................... H04L 9/3247 |
| | | 713/181 |
| 2009/0328197 A1 | 12/2009 | Newell et al. |
| 2010/0010932 A1 | 1/2010 | Law et al. |
| 2010/0023454 A1 | 1/2010 | Exton et al. |
| 2010/0025466 A1* | 2/2010 | Cardone ................ H04L 9/3268 |
| | | 235/386 |
| 2010/0029300 A1 | 2/2010 | Chen |
| 2010/0042848 A1 | 2/2010 | Rosener |
| 2010/0062744 A1 | 3/2010 | Ibrahim |
| 2010/0070424 A1 | 3/2010 | Monk |
| 2010/0077454 A1* | 3/2010 | Xiao ..................... H04L 41/0893 |
| | | 726/3 |
| 2010/0082484 A1 | 4/2010 | Erhart et al. |
| 2010/0083000 A1 | 4/2010 | Kesanupalli |
| 2010/0094681 A1 | 4/2010 | Almen et al. |
| 2010/0105427 A1 | 4/2010 | Gupta |
| 2010/0107222 A1 | 4/2010 | Glasser |
| 2010/0114776 A1 | 5/2010 | Weller et al. |
| 2010/0121855 A1 | 5/2010 | Dalia et al. |
| 2010/0150353 A1 | 6/2010 | Bauchot et al. |
| 2010/0169650 A1 | 7/2010 | Brickell et al. |
| 2010/0175116 A1 | 7/2010 | Gum |
| 2010/0186072 A1 | 7/2010 | Kumar |
| 2010/0191612 A1 | 7/2010 | Raleigh |
| 2010/0192209 A1 | 7/2010 | Steeves et al. |
| 2010/0205658 A1 | 8/2010 | Griffin |
| 2010/0211792 A1 | 8/2010 | Ureche et al. |
| 2010/0223663 A1 | 9/2010 | Morimoto et al. |
| 2010/0235637 A1 | 9/2010 | Lu et al. |
| 2010/0242088 A1 | 9/2010 | Thomas |
| 2010/0266128 A1 | 10/2010 | Asokan et al. |
| 2010/0287369 A1 | 11/2010 | Monden |
| 2010/0299265 A1 | 11/2010 | Walters et al. |
| 2010/0299738 A1 | 11/2010 | Wahl |
| 2010/0325427 A1 | 12/2010 | Ekberg et al. |
| 2010/0325664 A1 | 12/2010 | Kang |
| 2010/0325684 A1 | 12/2010 | Grebenik et al. |
| 2010/0325711 A1 | 12/2010 | Etchegoyen |
| 2011/0004918 A1 | 1/2011 | Chow et al. |
| 2011/0004933 A1 | 1/2011 | Dickinson et al. |
| 2011/0022835 A1 | 1/2011 | Schibuk |
| 2011/0035788 A1 | 2/2011 | White et al. |
| 2011/0047608 A1 | 2/2011 | Levenberg |
| 2011/0071841 A1 | 3/2011 | Fomenko et al. |
| 2011/0078443 A1 | 3/2011 | Greenstein et al. |
| 2011/0082801 A1 | 4/2011 | Baghdasaryan et al. |
| 2011/0083016 A1 | 4/2011 | Kesanupalli et al. |
| 2011/0093942 A1 | 4/2011 | Koster et al. |
| 2011/0099361 A1 | 4/2011 | Shah et al. |

(56) References Cited

U.S. PATENT DOCUMENTS

| | | |
|---|---|---|
| 2011/0099367 A1* | 4/2011 | Thom .................. H04L 9/3247 713/181 |
| 2011/0107087 A1 | 5/2011 | Lee et al. |
| 2011/0138450 A1 | 6/2011 | Kesanupalli et al. |
| 2011/0157346 A1 | 6/2011 | Zyzdryn et al. |
| 2011/0167154 A1 | 7/2011 | Bush et al. |
| 2011/0167472 A1 | 7/2011 | Evans et al. |
| 2011/0184838 A1 | 7/2011 | Winters et al. |
| 2011/0191200 A1 | 8/2011 | Bayer et al. |
| 2011/0197267 A1 | 8/2011 | Gravel et al. |
| 2011/0219427 A1 | 9/2011 | Hito et al. |
| 2011/0225431 A1 | 9/2011 | Stufflebeam, Jr. et al. |
| 2011/0225643 A1 | 9/2011 | Faynberg et al. |
| 2011/0228330 A1 | 9/2011 | Nogawa |
| 2011/0231911 A1 | 9/2011 | White et al. |
| 2011/0246756 A1* | 10/2011 | Smith .................. G06F 21/629 713/170 |
| 2011/0246766 A1 | 10/2011 | Orsini et al. |
| 2011/0265159 A1 | 10/2011 | Ronda et al. |
| 2011/0279228 A1 | 11/2011 | Kumar et al. |
| 2011/0280402 A1 | 11/2011 | Ibrahim et al. |
| 2011/0296518 A1 | 12/2011 | Faynberg et al. |
| 2011/0307706 A1 | 12/2011 | Fielder |
| 2011/0307949 A1 | 12/2011 | Ronda et al. |
| 2011/0313872 A1 | 12/2011 | Carter et al. |
| 2011/0314549 A1 | 12/2011 | Song et al. |
| 2011/0320823 A1 | 12/2011 | Saroiu et al. |
| 2012/0018506 A1 | 1/2012 | Hammad et al. |
| 2012/0023567 A1 | 1/2012 | Hammad |
| 2012/0023568 A1 | 1/2012 | Cha et al. |
| 2012/0030083 A1 | 2/2012 | Newman et al. |
| 2012/0046012 A1 | 2/2012 | Forutanpour et al. |
| 2012/0047555 A1 | 2/2012 | Xiao et al. |
| 2012/0066757 A1 | 3/2012 | Vysogorets et al. |
| 2012/0075062 A1 | 3/2012 | Osman et al. |
| 2012/0084566 A1 | 4/2012 | Chin et al. |
| 2012/0084850 A1 | 4/2012 | Novak et al. |
| 2012/0102553 A1 | 4/2012 | Hsueh et al. |
| 2012/0124639 A1 | 5/2012 | Shaikh et al. |
| 2012/0124651 A1 | 5/2012 | Ganesan et al. |
| 2012/0130898 A1 | 5/2012 | Snyder et al. |
| 2012/0137137 A1 | 5/2012 | Brickell et al. |
| 2012/0144461 A1 | 6/2012 | Rathbun |
| 2012/0159577 A1 | 6/2012 | Belinkiy et al. |
| 2012/0191979 A1 | 7/2012 | Feldbau |
| 2012/0203906 A1 | 8/2012 | Jaudon et al. |
| 2012/0204032 A1 | 8/2012 | Wilkins et al. |
| 2012/0210135 A1 | 8/2012 | Panchapakesan et al. |
| 2012/0239950 A1 | 9/2012 | Davis et al. |
| 2012/0249298 A1 | 10/2012 | Sovio et al. |
| 2012/0272056 A1 | 10/2012 | Ganesan |
| 2012/0278873 A1 | 11/2012 | Calero et al. |
| 2012/0291114 A1* | 11/2012 | Poliashenko .......... H04L 9/321 726/8 |
| 2012/0308000 A1 | 12/2012 | Arnold et al. |
| 2012/0313746 A1 | 12/2012 | Rahman et al. |
| 2012/0317297 A1 | 12/2012 | Bailey |
| 2012/0323717 A1 | 12/2012 | Kirsch |
| 2013/0013931 A1 | 1/2013 | O'Hare et al. |
| 2013/0042115 A1 | 2/2013 | Sweet et al. |
| 2013/0042327 A1 | 2/2013 | Chow |
| 2013/0046976 A1 | 2/2013 | Rosati et al. |
| 2013/0046991 A1 | 2/2013 | Lu et al. |
| 2013/0047200 A1 | 2/2013 | Radhakrishnan et al. |
| 2013/0054336 A1 | 2/2013 | Graylin |
| 2013/0054967 A1 | 2/2013 | Davoust et al. |
| 2013/0055370 A1 | 2/2013 | Goldberg et al. |
| 2013/0061055 A1 | 3/2013 | Schibuk |
| 2013/0066832 A1* | 3/2013 | Sheehan ............... G06Q 10/00 707/634 |
| 2013/0067546 A1 | 3/2013 | Thavasi et al. |
| 2013/0073859 A1 | 3/2013 | Carlson et al. |
| 2013/0080769 A1 | 3/2013 | Cha et al. |
| 2013/0086669 A1 | 4/2013 | Sondhi et al. |
| 2013/0090939 A1 | 4/2013 | Robinson et al. |
| 2013/0097682 A1 | 4/2013 | Zeljkovic et al. |
| 2013/0104187 A1 | 4/2013 | Weidner |
| 2013/0104190 A1 | 4/2013 | Simske et al. |
| 2013/0119130 A1 | 5/2013 | Braams |
| 2013/0124285 A1 | 5/2013 | Pravetz et al. |
| 2013/0124422 A1 | 5/2013 | Hubert et al. |
| 2013/0125197 A1 | 5/2013 | Pravetz et al. |
| 2013/0125222 A1 | 5/2013 | Pravetz et al. |
| 2013/0133049 A1 | 5/2013 | Peirce |
| 2013/0133054 A1 | 5/2013 | Davis et al. |
| 2013/0139238 A1 | 5/2013 | Ryan |
| 2013/0144785 A1 | 6/2013 | Karpenko et al. |
| 2013/0159413 A1 | 6/2013 | Davis et al. |
| 2013/0159716 A1 | 6/2013 | Buck et al. |
| 2013/0160083 A1 | 6/2013 | Schrix et al. |
| 2013/0160100 A1 | 6/2013 | Langley |
| 2013/0167196 A1 | 6/2013 | Spencer et al. |
| 2013/0191884 A1 | 7/2013 | Leicher et al. |
| 2013/0205360 A1 | 8/2013 | Novak et al. |
| 2013/0212637 A1 | 8/2013 | Guccione et al. |
| 2013/0219456 A1 | 8/2013 | Sharma et al. |
| 2013/0227646 A1 | 8/2013 | Haggerty et al. |
| 2013/0239173 A1 | 9/2013 | Dispensa |
| 2013/0239189 A1* | 9/2013 | Ionescu .................. H04L 63/08 726/6 |
| 2013/0246272 A1 | 9/2013 | Kirsch et al. |
| 2013/0247164 A1* | 9/2013 | Hoggan .................. H04L 63/08 726/8 |
| 2013/0262305 A1 | 10/2013 | Jones et al. |
| 2013/0276060 A1 | 10/2013 | Wiedmann et al. |
| 2013/0282589 A1 | 10/2013 | Shoup et al. |
| 2013/0308778 A1 | 11/2013 | Fosmark et al. |
| 2013/0318343 A1 | 11/2013 | Bjarnason et al. |
| 2013/0326213 A1 | 12/2013 | Murphy et al. |
| 2013/0326215 A1 | 12/2013 | Leggette et al. |
| 2013/0337777 A1 | 12/2013 | Deutsch et al. |
| 2013/0346176 A1 | 12/2013 | Alolabi et al. |
| 2013/0347064 A1 | 12/2013 | Aissi et al. |
| 2014/0002238 A1 | 1/2014 | Taveau et al. |
| 2014/0006776 A1 | 1/2014 | Scott-Nash et al. |
| 2014/0007215 A1 | 1/2014 | Romano et al. |
| 2014/0013422 A1 | 1/2014 | Janus et al. |
| 2014/0033271 A1 | 1/2014 | Barton et al. |
| 2014/0037092 A1 | 2/2014 | Bhattacharya et al. |
| 2014/0040987 A1 | 2/2014 | Haugsnes |
| 2014/0044265 A1 | 2/2014 | Kocher et al. |
| 2014/0047510 A1 | 2/2014 | Belton et al. |
| 2014/0066015 A1 | 3/2014 | Aissi |
| 2014/0068746 A1 | 3/2014 | Gonzalez et al. |
| 2014/0075501 A1* | 3/2014 | Srinivasan ............. H04L 63/08 726/1 |
| 2014/0075516 A1 | 3/2014 | Chermside |
| 2014/0082715 A1* | 3/2014 | Grajek ................ H04L 63/0815 726/8 |
| 2014/0086413 A1 | 3/2014 | Matsuda et al. |
| 2014/0089243 A1 | 3/2014 | Oppenheimer |
| 2014/0090039 A1 | 3/2014 | Bhow |
| 2014/0090088 A1 | 3/2014 | Bjones et al. |
| 2014/0096177 A1* | 4/2014 | Smith ..................... H04L 63/08 726/1 |
| 2014/0096182 A1 | 4/2014 | Smith |
| 2014/0101439 A1 | 4/2014 | Pettigrew et al. |
| 2014/0108784 A1* | 4/2014 | Pendarakis .......... H04L 9/3263 713/175 |
| 2014/0109174 A1 | 4/2014 | Barton et al. |
| 2014/0109200 A1* | 4/2014 | Tootill ................ H04W 12/068 726/5 |
| 2014/0114857 A1 | 4/2014 | Griggs et al. |
| 2014/0115702 A1 | 4/2014 | Li et al. |
| 2014/0130127 A1 | 5/2014 | Toole et al. |
| 2014/0137191 A1 | 5/2014 | Goldsmith et al. |
| 2014/0137220 A1* | 5/2014 | Niemela ................. G06F 21/31 726/6 |
| 2014/0149746 A1 | 5/2014 | Yau |
| 2014/0164776 A1 | 6/2014 | Hook et al. |
| 2014/0173754 A1 | 6/2014 | Barbir |
| 2014/0188770 A1 | 7/2014 | Agrafioti et al. |
| 2014/0189350 A1 | 7/2014 | Baghdasaryan et al. |

(56) References Cited

U.S. PATENT DOCUMENTS

| | | |
|---|---|---|
| 2014/0189360 A1 | 7/2014 | Baghdasaryan et al. |
| 2014/0189779 A1 | 7/2014 | Baghdasaryan et al. |
| 2014/0189791 A1 | 7/2014 | Lindemann et al. |
| 2014/0189807 A1 | 7/2014 | Cahill et al. |
| 2014/0189808 A1 | 7/2014 | Mahaffey et al. |
| 2014/0189828 A1 | 7/2014 | Baghdasaryan et al. |
| 2014/0189835 A1 | 7/2014 | Umerley |
| 2014/0201809 A1 | 7/2014 | Choyi et al. |
| 2014/0208407 A1* | 7/2014 | VanBlon ............... G06F 21/41 726/8 |
| 2014/0215585 A1* | 7/2014 | Sanaullah ........... H04L 63/0281 726/6 |
| 2014/0230032 A1 | 8/2014 | Duncan |
| 2014/0245391 A1 | 8/2014 | Adenuga |
| 2014/0250011 A1 | 9/2014 | Weber |
| 2014/0250511 A1* | 9/2014 | Kendall ............... G06F 21/6281 726/6 |
| 2014/0250523 A1 | 9/2014 | Savvides et al. |
| 2014/0258125 A1 | 9/2014 | Gerber et al. |
| 2014/0258711 A1 | 9/2014 | Brannon |
| 2014/0279516 A1 | 9/2014 | Rellas et al. |
| 2014/0282868 A1 | 9/2014 | Sheller et al. |
| 2014/0282945 A1 | 9/2014 | Smith et al. |
| 2014/0282965 A1 | 9/2014 | Sambamurthy et al. |
| 2014/0289116 A1 | 9/2014 | Polivanyi et al. |
| 2014/0289117 A1 | 9/2014 | Baghdasaryan |
| 2014/0289509 A1 | 9/2014 | Baghdasaryan |
| 2014/0289820 A1 | 9/2014 | Lindemann et al. |
| 2014/0289821 A1 | 9/2014 | Wilson |
| 2014/0289833 A1 | 9/2014 | Briceno et al. |
| 2014/0289834 A1 | 9/2014 | Lindemann et al. |
| 2014/0298419 A1 | 10/2014 | Boubez et al. |
| 2014/0304505 A1 | 10/2014 | Dawson |
| 2014/0325239 A1 | 10/2014 | Ghose |
| 2014/0333413 A1 | 11/2014 | Kursun et al. |
| 2014/0335824 A1 | 11/2014 | Abraham |
| 2014/0337948 A1 | 11/2014 | Hoyos et al. |
| 2014/0344904 A1* | 11/2014 | Venkataramani ....... G06F 21/35 726/5 |
| 2015/0019220 A1 | 1/2015 | Talhami et al. |
| 2015/0046340 A1 | 2/2015 | Dimmick |
| 2015/0046989 A1* | 2/2015 | Oberheide ............ G06F 21/31 726/6 |
| 2015/0052342 A1* | 2/2015 | Jang ................... G06F 21/53 713/2 |
| 2015/0058931 A1 | 2/2015 | Miu et al. |
| 2015/0072726 A1* | 3/2015 | Stern ................... H04W 88/06 455/552.1 |
| 2015/0074745 A1* | 3/2015 | Stern ................... H04L 63/20 726/1 |
| 2015/0095999 A1 | 4/2015 | Toth et al. |
| 2015/0096002 A1 | 4/2015 | Shuart et al. |
| 2015/0113618 A1* | 4/2015 | Sinha .................. G06F 21/44 726/6 |
| 2015/0121068 A1 | 4/2015 | Lindemann et al. |
| 2015/0134330 A1 | 5/2015 | Baldwin et al. |
| 2015/0142628 A1 | 5/2015 | Suplee et al. |
| 2015/0180869 A1 | 6/2015 | Verma |
| 2015/0193781 A1 | 7/2015 | Dave et al. |
| 2015/0242605 A1 | 8/2015 | Du et al. |
| 2015/0244525 A1 | 8/2015 | McCusker et al. |
| 2015/0244696 A1 | 8/2015 | Ma |
| 2015/0269050 A1 | 9/2015 | Filimonov et al. |
| 2015/0281279 A1* | 10/2015 | Smith ................... H04L 63/08 726/1 |
| 2015/0304110 A1* | 10/2015 | Oberheide ............ H04L 63/12 713/155 |
| 2015/0326529 A1 | 11/2015 | Morita |
| 2015/0334165 A1* | 11/2015 | Arling .................. H04W 8/24 717/177 |
| 2015/0373039 A1 | 12/2015 | Wang |
| 2015/0381580 A1 | 12/2015 | Graham, III et al. |
| 2016/0005032 A1 | 1/2016 | Yau et al. |
| 2016/0034892 A1 | 2/2016 | Carpenter et al. |
| 2016/0036588 A1 | 2/2016 | Thackston |
| 2016/0050193 A1* | 2/2016 | Kanov ................ H04W 12/069 726/7 |
| 2016/0071105 A1 | 3/2016 | Groarke et al. |
| 2016/0072787 A1 | 3/2016 | Balabine et al. |
| 2016/0078869 A1 | 3/2016 | Syrdal et al. |
| 2016/0087952 A1 | 3/2016 | Tartz et al. |
| 2016/0087957 A1 | 3/2016 | Shah et al. |
| 2016/0094543 A1 | 3/2016 | Innes et al. |
| 2016/0098555 A1* | 4/2016 | Mersh .................. G06F 21/57 713/187 |
| 2016/0098562 A1* | 4/2016 | Hawblitzel ............ G06F 8/41 726/22 |
| 2016/0099811 A1* | 4/2016 | Hawblitzel .......... H04L 9/3268 713/176 |
| 2016/0134421 A1 | 5/2016 | Chen et al. |
| 2016/0188958 A1 | 6/2016 | Martin |
| 2016/0191499 A1* | 6/2016 | Momchilov ............ G06F 21/41 713/171 |
| 2016/0204933 A1* | 7/2016 | Ronchi ................ H04W 12/04 713/171 |
| 2016/0219043 A1 | 7/2016 | Blanke |
| 2016/0241552 A1 | 8/2016 | Lindemann |
| 2016/0259941 A1* | 9/2016 | Vasudevan ............. H04L 63/20 |
| 2016/0275461 A1* | 9/2016 | Sprague ................ H04W 12/06 |
| 2016/0292687 A1 | 10/2016 | Kruglick et al. |
| 2016/0294810 A1* | 10/2016 | Wang ................ H04L 63/0272 |
| 2016/0316365 A1 | 10/2016 | Buhler et al. |
| 2016/0364787 A1* | 12/2016 | Walker ................ H04L 9/0891 |
| 2016/0373257 A1* | 12/2016 | Adrangi ................ H04W 76/14 |
| 2017/0004291 A1 | 1/2017 | Pathak et al. |
| 2017/0004487 A1 | 1/2017 | Hagen et al. |
| 2017/0011406 A1 | 1/2017 | Tunnell et al. |
| 2017/0013012 A1 | 1/2017 | Hansen |
| 2017/0027008 A1* | 1/2017 | Krishnamoorthy ........................ H04L 67/1072 |
| 2017/0032111 A1* | 2/2017 | Johansson ............... G06F 21/44 |
| 2017/0041147 A1* | 2/2017 | Krahn ................... H04L 9/0897 |
| 2017/0048070 A1 | 2/2017 | Gulati et al. |
| 2017/0085587 A1 | 3/2017 | Turgeman |
| 2017/0103226 A1* | 4/2017 | Eberlein ................ G06F 16/25 |
| 2017/0109751 A1 | 4/2017 | Dunkelberger et al. |
| 2017/0155513 A1* | 6/2017 | Acar ...................... G06Q 20/20 |
| 2017/0195121 A1 | 7/2017 | Frei et al. |
| 2017/0221068 A1 | 8/2017 | Krauss et al. |
| 2017/0249482 A1 | 8/2017 | Takaai et al. |
| 2017/0250972 A1 | 8/2017 | Ronda et al. |
| 2017/0279614 A1* | 9/2017 | Mercury ............... H04L 63/083 |
| 2017/0289140 A1* | 10/2017 | Cai ...................... H04L 63/0838 |
| 2017/0317833 A1 | 11/2017 | Smith et al. |
| 2017/0330174 A1 | 11/2017 | Demarinis et al. |
| 2017/0330180 A1 | 11/2017 | Song et al. |
| 2017/0331632 A1 | 11/2017 | Leoutsarakos et al. |
| 2017/0352116 A1 | 12/2017 | Pierce et al. |
| 2017/0373844 A1* | 12/2017 | Sykora ................. H04L 9/3249 |
| 2018/0034641 A1* | 2/2018 | Tiwari ................. H04L 63/0807 |
| 2018/0039990 A1* | 2/2018 | Lindemann ............ G06V 40/19 |
| 2018/0041503 A1* | 2/2018 | Lindemann ......... H04L 63/0435 |
| 2018/0046823 A1* | 2/2018 | Durham ................ H04L 9/3236 |
| 2018/0075231 A1 | 3/2018 | Subramanian et al. |
| 2018/0109538 A1* | 4/2018 | Kumar ................... H04L 63/08 |
| 2018/0167211 A1* | 6/2018 | Falk ..................... H04L 9/0869 |
| 2018/0176195 A1* | 6/2018 | Pangam ................ H04L 63/06 |
| 2018/0183586 A1* | 6/2018 | Bhargav-Spantzel ........................ G06F 21/32 |
| 2018/0191501 A1 | 7/2018 | Lindemann |
| 2018/0191695 A1 | 7/2018 | Lindemann |
| 2018/0204192 A1 | 7/2018 | Whaley et al. |
| 2018/0204213 A1 | 7/2018 | Zappier et al. |
| 2018/0309567 A1* | 10/2018 | Wooden ................ G06F 21/57 |
| 2018/0314817 A1* | 11/2018 | Gadde ................. G06F 21/604 |
| 2018/0323970 A1* | 11/2018 | Maron ................. H04L 9/0822 |
| 2018/0341765 A1* | 11/2018 | Ando ................... G06F 3/1271 |
| 2018/0351941 A1* | 12/2018 | Chhabra ................ H04L 9/38 |
| 2018/0367310 A1* | 12/2018 | Leong ................... H04L 67/10 |
| 2018/0375655 A1* | 12/2018 | Thom .................. H04L 9/0825 |
| 2019/0050551 A1* | 2/2019 | Goldman-Kirst ..... H04L 9/3213 |
| 2019/0068568 A1* | 2/2019 | Liderman ............. H04L 9/0861 |

(56) References Cited

U.S. PATENT DOCUMENTS

| | | | |
|---|---|---|---|
| 2019/0089701 A1* | 3/2019 | Mercury | G06F 30/20 |
| 2019/0124081 A1 | 4/2019 | Nowak et al. | |
| 2019/0139005 A1 | 5/2019 | Piel | |
| 2019/0149334 A1 | 5/2019 | Van Der Velden | |
| 2019/0156301 A1* | 5/2019 | Bentov | H04L 9/0897 |
| 2019/0164156 A1* | 5/2019 | Lindemann | H04L 9/3271 |
| 2019/0179806 A1* | 6/2019 | Reinsberg | H04L 9/3255 |
| 2019/0190724 A1* | 6/2019 | Sundaresan | H04L 9/3271 |
| 2019/0205885 A1 | 7/2019 | Lim et al. | |
| 2019/0222424 A1* | 7/2019 | Lindemann | H04L 9/3231 |
| 2019/0238598 A1* | 8/2019 | Mohamad Abdul | H04L 63/0807 |
| 2019/0251234 A1 | 8/2019 | Liu et al. | |
| 2019/0253404 A1 | 8/2019 | Briceno et al. | |
| 2019/0306169 A1* | 10/2019 | Statia | H04L 63/102 |
| 2019/0327223 A1* | 10/2019 | Kumar | H04L 9/0894 |
| 2019/0354397 A1* | 11/2019 | Goel | G06Q 40/00 |
| 2019/0384627 A1* | 12/2019 | De Caro | G06Q 20/3827 |
| 2020/0007530 A1* | 1/2020 | Mohamad Abdul | H04L 67/26 |
| 2020/0084042 A1* | 3/2020 | Nelson | H04L 9/30 |
| 2020/0084216 A1* | 3/2020 | North | H04L 63/083 |
| 2020/0092103 A1* | 3/2020 | Zavertnik | G06F 21/44 |
| 2020/0097661 A1* | 3/2020 | Block | H04L 9/3271 |
| 2020/0110695 A1* | 4/2020 | Maciel | G06F 11/3684 |
| 2020/0111118 A1* | 4/2020 | Patel | H04L 67/55 |
| 2020/0137056 A1 | 4/2020 | Havaralu et al. | |
| 2020/0167474 A1* | 5/2020 | Goldman | H04L 9/3247 |
| 2020/0177563 A1* | 6/2020 | Huapaya | H04L 63/061 |
| 2020/0213297 A1* | 7/2020 | Suraparaju | H04L 63/0876 |
| 2020/0351656 A1* | 11/2020 | Johansson | H04W 4/50 |
| 2021/0144551 A1 | 5/2021 | Lee et al. | |
| 2022/0029812 A1 | 1/2022 | Tamiya et al. | |

FOREIGN PATENT DOCUMENTS

| | | |
|---|---|---|
| CN | 1312510 A | 9/2001 |
| CN | 1446331 A | 10/2003 |
| CN | 1705923 A | 12/2005 |
| CN | 1705925 A | 12/2005 |
| CN | 1882963 A | 12/2006 |
| CN | 101051908 A | 10/2007 |
| CN | 101101687 A | 1/2008 |
| CN | 101276448 A | 10/2008 |
| CN | 101336436 A | 12/2008 |
| CN | 101394283 A | 3/2009 |
| CN | 101410847 A | 4/2009 |
| CN | 101495956 A | 7/2009 |
| CN | 101636949 A | 1/2010 |
| CN | 101751629 A | 6/2010 |
| CN | 101803272 A | 8/2010 |
| CN | 102077546 A | 5/2011 |
| CN | 102187701 A | 9/2011 |
| CN | 102246455 A | 11/2011 |
| CN | 102255917 A | 11/2011 |
| CN | 102404116 A | 4/2012 |
| CN | 102696212 A | 9/2012 |
| CN | 102713922 A | 10/2012 |
| CN | 102763111 A | 10/2012 |
| CN | 102763114 A | 10/2012 |
| CN | 103220145 A | 7/2013 |
| CN | 103460738 A | 12/2013 |
| CN | 103475666 A | 12/2013 |
| CN | 103793632 A | 5/2014 |
| CN | 103888252 A | 6/2014 |
| CN | 103945374 A | 7/2014 |
| CN | 103999401 A | 8/2014 |
| CN | 105229596 A | 1/2016 |
| CN | 106575326 A | 4/2017 |
| CN | 106575416 A | 4/2017 |
| CN | 107533501 A | 1/2018 |
| EP | 1376302 A2 | 1/2004 |
| EP | 2339777 A2 | 6/2011 |
| EP | 2343679 A1 | 7/2011 |
| EP | 2357754 A1 | 8/2011 |
| JP | H06195307 A | 7/1994 |
| JP | H09231172 A | 9/1997 |
| JP | 2001-325469 A | 11/2001 |
| JP | 2002152189 A | 5/2002 |
| JP | 2003143136 A | 5/2003 |
| JP | 2003-219473 A | 7/2003 |
| JP | 2003223235 A | 8/2003 |
| JP | 2003-274007 A | 9/2003 |
| JP | 2003318894 A | 11/2003 |
| JP | 2004-007556 A | 1/2004 |
| JP | 2004-508619 A | 3/2004 |
| JP | 2004-118456 A | 4/2004 |
| JP | 2004348308 A | 12/2004 |
| JP | 2005092614 A | 4/2005 |
| JP | 2005316936 A | 11/2005 |
| JP | 2006-144421 A | 6/2006 |
| JP | 2007-514333 A | 5/2007 |
| JP | 2007148470 A | 6/2007 |
| JP | 2007-194866 A | 8/2007 |
| JP | 2007220075 A | 8/2007 |
| JP | 2007249726 A | 9/2007 |
| JP | 2008-017301 A | 1/2008 |
| JP | 2008065844 A | 3/2008 |
| JP | 2008-165411 A | 7/2008 |
| JP | 2009-032070 A | 2/2009 |
| JP | 2009-199530 A | 9/2009 |
| JP | 2009223452 A | 10/2009 |
| JP | 2010015263 A | 1/2010 |
| JP | 2010-045542 A | 2/2010 |
| JP | 2010505286 A | 2/2010 |
| JP | 2010-097467 A | 4/2010 |
| JP | 2011-165102 A | 8/2011 |
| JP | 2012503243 A | 2/2012 |
| JP | 2012-078979 A | 4/2012 |
| JP | 4939121 B2 | 5/2012 |
| JP | 2013016070 A | 1/2013 |
| JP | 2013122736 A | 6/2013 |
| JP | 2013522722 A | 6/2013 |
| JP | 2014-524218 A | 9/2014 |
| JP | 2015-511348 A | 4/2015 |
| JP | 2016-521403 A | 7/2016 |
| JP | 2016-208510 A | 12/2016 |
| JP | 2017-505048 A | 2/2017 |
| JP | 2017-152880 A | 8/2017 |
| JP | 2017-157926 A | 9/2017 |
| JP | 2017-528963 A | 9/2017 |
| JP | 2017-535843 A | 11/2017 |
| KR | 10-2004-0034327 A | 4/2004 |
| KR | 10-2008-0075956 A | 8/2008 |
| KR | 10-2011-0122452 A | 11/2011 |
| KR | 10-2012-0136236 A | 12/2012 |
| KR | 10-2014-0054151 A | 5/2014 |
| KR | 10-2015-0103264 A | 9/2015 |
| TW | 200701120 A | 1/2007 |
| TW | 201121280 A | 6/2011 |
| WO | 97/50205 A1 | 12/1997 |
| WO | 03017159 A1 | 2/2003 |
| WO | 03/65169 A2 | 8/2003 |
| WO | 03065169 A2 | 8/2003 |
| WO | 2005003985 A1 | 1/2005 |
| WO | 2006/024042 A2 | 3/2006 |
| WO | 2007/004224 A1 | 1/2007 |
| WO | 2007023756 A1 | 3/2007 |
| WO | 2007094165 A1 | 8/2007 |
| WO | 2009158530 A2 | 12/2009 |
| WO | 2010032216 A1 | 3/2010 |
| WO | 2010067433 A1 | 6/2010 |
| WO | 2013082190 A1 | 6/2013 |
| WO | 2014/011997 A1 | 1/2014 |
| WO | 2014105994 A2 | 7/2014 |
| WO | 2015130734 A1 | 9/2015 |
| WO | 2016/019093 A1 | 2/2016 |

(56) References Cited

FOREIGN PATENT DOCUMENTS

| WO | 2016/019106 A1 | 2/2016 |
|---|---|---|
| WO | 2017219007 A1 | 12/2017 |

OTHER PUBLICATIONS

Communication pursuant to Article 94(3) EPC, EP App. No. 14770682.4, Jul. 7, 2020, 4 pages.
Communication pursuant to Article 94(3) EPC, EP App. No. 14803988.6, Aug. 10, 2020, 7 pages.
Corrected Notice of Allowability, U.S. Appl. No. 14/218,646, Jul. 8, 2020, 5 pages.
Corrected Notice of Allowability, U.S. Appl. No. 15/229,233, Jul. 29, 2020, 3 pages.
Corrected Notice of Allowability, U.S. Appl. No. 15/229,233, Jun. 30, 2020, 3 pages.
Corrected Notice of Allowability, U.S. Appl. No. 15/881,522, Jul. 27, 2020, 2 pages.
Corrected Notice of Allowability, U.S. Appl. No. 15/881,522, Aug. 26, 2020, 2 pages.
Corrected Notice of Allowability, U.S. Appl. No. 15/881,522, Jul. 13, 2020, 2 pages.
Corrected Notice of Allowability, U.S. Appl. No. 15/881,522, Jun. 17, 2020, 2 pages.
Decision to Grant a Patent, EP App. No. 15826364.0, Jul. 2, 2020, 2 pages.
Decision to Grant a Patent, EP App. No. 15828152.7, Aug. 13, 2020, 2 pages.
Decision to Refuse, EP App. No. 15827334.2, Jul. 2, 2020, 17 pages.
First Office Action, CN App. No. 201580041803.4, Apr. 23, 2020, 13 pages (5 pages of English Translation and 8 pages of Original Document).
Intention to Grant, EP App. No. 15786796.1, Jun. 5, 2020, 6 pages.
International Preliminary Report on Patentability, PCT App. No. PCT/US2019/013199, Jul. 23, 2020, 11 pages.
International Search Report and Written Opinion, PCT App. No. PCT/US2020/022944, Jun. 18, 2020, 12 pages.
Office Action, JP App. No. 2017-505513, Aug. 3, 2020, 9 pages (5 pages of English Translation and 4 pages of Original Document).
Communication pursuant to Article 94(3) EPC, EP App. No. 15786487.7, Feb. 20, 2020, 6 pages.
Corrected Notice of Allowability, U.S. Appl. No. 14/218,646, May 26, 2020, 5 pages.
Crowley et al., "Online Identity and Consumer Trust: Assessing Online Risk", Available Online at <https://www.brookings.edu/wp-content/uploads/2016/06/0111_online_identity_trust.pdf>, Jan. 11, 2011, 15 pages.
Decision of Final Rejection, JP App. No. 2016-566924, Feb. 27, 2020, 8 pages (5 pages of English Translation and 3 pages of Original Document).
Decision of Final Rejection, JP App. No. 2017-505072, Feb. 25, 2020, 9 pages (5 pages of English Translation and 4 pages of Original Document).
Decision to Grant a Patent, EP App. No. 15827363.1, Aug. 8, 2019, 2 pages.
Decision to Grant a Patent, EP App. No. 15841530.7, Dec. 5, 2019, 2 pages.
Decision to Grant, JP App. No. 2016-566912, Dec. 26, 2019, 3 pages (2 pages of English Translation and 1 page of Original Document).
Final Office Action, U.S. Appl. No. 15/822,531, Apr. 7, 2020, 22 pages.
First Office Action CN App. No. 201580040831.4, Mar. 3, 2020, 31 pages (18 pages of English Translation and 13 pages of Office Action).
First Office Action, CN App. No. 201580022332.2, Aug. 5, 2019, 14 pages (7 pages of English Translation and 7 pages of Original Document).

First Office Action, CN App. No. 201580040836.7, Apr. 22, 2020, 11 pages (5 pages of English Translation and 6 pages of Original Document).
Intention to Grant under Rule 71(3) EPC, EP App. No. 15826364.0, Feb. 18, 2020, 6 pages.
Intention to Grant under Rule 71(3) EPC, EP App. No. 15826660.1, Apr. 28, 2020, 6 pages.
Intention to Grant under Rule 71(3) EPC, EP App. No. 15828152.7, Apr. 1, 2020, 6 pages.
International Preliminary Report on Patentability, PCT App. No. PCT/US2018/062608, Jun. 11, 2020, 9 pages.
International Search Report and Written Opinion, PCT App. No. PCT/US2020/020439, May 27, 2020, 9 pages.
Manabe et al., "Person Verification using Handwriting Gesture", Proceedings of the 26th Annual Conference of Japanese Society for Artifical Intelligence, 2012, 9 pages (English Abstract Submitted).
Non-Final Office Action, U.S. Appl. No. 15/229,233, Jan. 31, 2020, 18 pages.
Notice of Allowance, U.S. Appl. No. 14/145,466, Feb. 12, 2020, 12 pages.
Notice of Allowance, U.S. Appl. No. 14/218,646, Dec. 17, 2019, 6 pages.
Notice of Allowance, U.S. Appl. No. 14/218,646, Mar. 25, 2020, 8 pages.
Notice of Allowance, U.S. Appl. No. 14/218,677, May 8, 2020, 10 pages.
Notice of Allowance, U.S. Appl. No. 15/229,233, May 19, 2020, 10 pages.
Notice of Allowance, U.S. Appl. No. 15/229,254, Jan. 15, 2020, 9 pages.
Notice of Allowance, U.S. Appl. No. 15/229,254, Mar. 17, 2020, 3 pages.
Notice of Allowance, U.S. Appl. No. 15/881,522, Apr. 20, 2020, 10 pages.
Notice of Allowance, U.S. Appl. No. 15/881,522, Dec. 31, 2019, 10 pages.
Notice of Reasons for Refusal, JP App. No. 2018-209608, Oct. 7, 2019, 11 pages (7 pages of English Translation and 4 pages of Original Document).
Office Action, CN App No. 201580049696.X, Feb. 6, 2020, 11 pages (5 pages of English Translation and 6 pages of Original Document).
Second Office Action, CN App. No. 201580022332.2, May 7, 2020, 7 pages (4 pages of English Translation and 3 pages of Original Document).
Second Office Action, CN App. No. 201580040813.6, Mar. 24, 2020, 19 pages (11 pages of English Translation and 8 pages of Original Document).
Summon to Attend Oral Proceedings pursuant to Rule 115(1) EPC, EP App. No. 15827334.2, Dec. 17, 2019, 11 pages.
Non-Final Office Action from U.S. Appl. No. 14/066,273 mailed Jun. 16, 2016, 43 pages.
Non-Final Office Action from U.S. Appl. No. 14/066,273 mailed May 8, 2015, 31 pages.
Non-Final Office Action from U.S. Appl. No. 14/066,273, mailed May 18, 2017, 46 pages.
Non-Final Office Action from U.S. Appl. No. 14/066,384 mailed Jan. 7, 2015, 24 pages.
Non-Final Office Action from U.S. Appl. No. 14/066,384 mailed Mar. 17, 2016, 40 pages.
Non-Final Office Action from U.S. Appl. No. 14/145,439 mailed Feb. 12, 2015, 18 pages.
Non-Final Office Action from U.S. Appl. No. 14/145,466 mailed Sep. 9, 2016, 13 pages.
Non-Final Office Action from U.S. Appl. No. 14/145,533 mailed Jan. 26, 2015, 13 pages.
Non-Final Office Action from U.S. Appl. No. 14/145,607 mailed Mar. 20, 2015, 22 pages.
Non-Final Office Action from U.S. Appl. No. 14/218,504, mailed Feb. 27, 2017, 12 pages.
Non-Final Office Action from U.S. Appl. No. 14/218,551 mailed Apr. 23, 2015, 9 pages.

(56) References Cited

OTHER PUBLICATIONS

Non-Final Office Action from U.S. Appl. No. 14/218,551 mailed Jan. 21, 2016, 11 pages.
Non-Final Office Action from U.S. Appl. No. 14/218,551 mailed May 12, 2016, 11 pages.
Non-Final Office Action from U.S. Appl. No. 14/218,575 mailed Feb. 10, 2015, 17 pages.
Non-Final Office Action from U.S. Appl. No. 14/218,575 mailed Jan. 29, 2016, 25 pages.
Non-Final Office Action from U.S. Appl. No. 14/218,575 mailed Mar. 8, 2018, 29 pages.
Non-Final Office Action from U.S. Appl. No. 14/218,575 mailed May 4, 2017, 88 pages.
Non-Final Office Action from U.S. Appl. No. 14/218,611 mailed Feb. 7, 2019, 27 pages.
Non-Final Office Action from U.S. Appl. No. 14/218,611 mailed Jun. 16, 2016, 13 pages.
Non-Final Office Action from U.S. Appl. No. 14/218,611 mailed Sep. 19, 2017, 76 pages.
Non-Final Office Action from U.S. Appl. No. 14/218,646 mailed Mar. 7, 2018, 32 pages.
Non-Final Office Action from U.S. Appl. No. 14/218,646 mailed Mar. 10, 2016, 23 pages.
Non-Final Office Action from U.S. Appl. No. 14/218,646 mailed Mar. 27, 2017, 24 pages.
Non-Final Office Action from U.S. Appl. No. 14/218,677 mailed Aug. 2, 2016, 15 pages.
Non-Final Office Action from U.S. Appl. No. 14/218,677 mailed Feb. 2, 2018, 25 pages.
Non-Final Office Action from U.S. Appl. No. 14/218,677 mailed Feb. 10, 2017, 18 pages.
Non-Final Office Action from U.S. Appl. No. 14/218,692 mailed Nov. 4, 2015, 16 pages.
Non-Final Office Action from U.S. Appl. No. 14/218,692 mailed Oct. 25, 2016, 33 pages.
Non-Final Office Action from U.S. Appl. No. 14/218,692 mailed Sep. 19, 2017, 37 pages.
Non-Final Office Action from U.S. Appl. No. 14/218,743, mailed Aug. 2, 2017, 24 pages.
Non-Final Office Action from U.S. Appl. No. 14/218,743 mailed Aug. 19, 2016, 11 pages.
Non-Final Office Action from U.S. Appl. No. 14/218,743 mailed Jan. 21, 2016, 12 pages.
Non-final Office Action from U.S. Appl. No. 14/268,563, mailed Apr. 21, 2017, 83 pages.
Non-Final Office Action from U.S. Appl. No. 14/268,563 mailed May 13, 2019, 47 pages.
Non-Final Office Action from U.S. Appl. No. 14/268,619 mailed Aug. 24, 2015, 17 pages.
Non-Final Office Action from U.S. Appl. No. 14/268,619 mailed Mar. 21, 2016, 7 pages.
Non-Final Office Action from U.S. Appl. No. 14/268,733 mailed Jul. 16, 2015, 13 pages.
Non-Final Office Action from U.S. Appl. No. 14/448,641 mailed Nov. 9, 2015, 21 pages.
Non-Final Office Action from U.S. Appl. No. 14/448,747 mailed Aug. 19, 2016, 21 pages.
Non-Final Office Action from U.S. Appl. No. 14/448,814, mailed Apr. 5, 2017, 57 pages.
Non-Final Office Action from U.S. Appl. No. 14/448,814 mailed Aug. 4, 2015, 13 pages.
Non-Final Office Action from U.S. Appl. No. 14/448,868 mailed Dec. 31, 2015, 12 pages.
Non-Final Office Action from U.S. Appl. No. 14/487,992 mailed Dec. 3, 2015, 15 pages.
Non-Final Office Action from U.S. Appl. No. 14/859,328, mailed Jul. 14, 2017, 29 pages.
Non-Final Office Action from U.S. Appl. No. 14/859,328 mailed Sep. 15, 2016, 39 pages.
Non-Final Office Action from U.S. Appl. No. 15/229,233, mailed Apr. 18, 2019, 87 pages.
Non-Final Office Action from U.S. Appl. No. 15/229,254, mailed Feb. 14, 2018, 75 pages.
Non-Final Office Action from U.S. Appl. No. 15/229,254, mailed Feb. 26, 2019, 46 pages.
Non-Final Office Action from U.S. Appl. No. 15/396,452 mailed Oct. 13, 2017, 76 pages.
Non-Final Office action from U.S. Appl. No. 15/595,460, mailed Jul. 27, 2017, 09 pages.
International Preliminary Report on Patentability for Application No. PCT/US2015/042870, mailed Feb. 9, 2017, 8 pages.
International Preliminary Report on Patentability for Application No. PCT/US2015/050348, mailed Mar. 30, 2017, 7 pages.
International Preliminary Report on Patentability for Application No. PCT/US2015/42783, mailed Feb. 9, 2017, 12 pages.
International Preliminary Report on Patentability for Application No. PCT/US2015/42827, mailed Feb. 9, 2017, 6 pages.
International Preliminary Report on Patentability for Application No. PCT/US2017/045534, mailed Feb. 14, 2019, 11 pages.
International Search Report and Written Opinion for Application No. PCT/US13/77888, mailed Aug. 4, 2014, 10 pages.
International Search Report and Written Opinion for Application No. PCT/US2015/028924 mailed Jul. 30, 2015, 10 pages.
International Search Report and Written Opinion for Application No. PCT/US2015/042786, mailed Oct. 16, 2015, 8 pages.
International Search Report and Written Opinion for Application No. PCT/US2015/042799, mailed Oct. 16, 2015, 8 pages.
International Search Report and Written Opinion for Application No. PCT/US2015/042870, mailed Oct. 30, 2015, 9 pages.
International Search Report and Written Opinion for Application No. PCT/US2015/050348, mailed Dec. 22, 2015, 9 pages.
International Search Report and Written Opinion for Application No. PCT/US2015/42783, mailed Oct. 19, 2015, 13 pages.
International Search Report and Written Opinion for Application No. PCT/US2015/42827, mailed Oct. 30, 2015, 9 pages.
International Search Report and Written Opinion for Application No. PCT/US2017/045534, mailed Nov. 27, 2017, 14 pages.
International Search Report and Written Opinion for Application No. PCT/US2019/013199, mailed Apr. 1, 2019, 12 pages.
International Search Report and Written Opinion for PCT Application No. PCT/US2018/062608, mailed Mar. 28, 2019, 12 pages.
Jafri R., et al. "A Survey of Face Recognition Techniques," Journal of Information Processing Systems, 2009, vol. 5 (2), pp. 41-68.
Julian J., et al., "Biometric Enabled Portable Trusted Computing Platform," 2011 IEEE 10th International Conference on Trust Security and Privacy in Computing and Communications (TRUSTCOM), Nov. 16, 2011, pp. 436-442.
Kim et al., "Secure User Authentication based on the Trusted Platform for Mobile Devices," EURASIP Journal on Wireless Communications and Networking, Sep. 29, 2016, pp. 1-15.
Kim H.C., et al., "A Design of One-Time Password Mechanism Using Public Key Infrastructure," Networked Computing and Advanced Information Management, 2008, NCM'08, 4th International Conference on IEEE, Sep. 2, 2008, pp. 18-24.
Kollreider K., et al., "Evaluating Liveness by Face Images and the Structure Tensor," Halmstad, Sweden: s.n., Halmstad University, SE-30118, Sweden, [online], 2005, Retrieved from the Internet: URL: http://citeseerx.ist.psu.edu/viewdoc/download?doi=10.1.1.62.6534&rep=rep1 &type=pdf, pp. 75-80.
Kollreider K., et al., "Non-Instrusive Liveness Detection by Face Images," Image and Vision Computing, 2007, vol. 27 (3), pp. 233-244.
Kong S., et al. "Recent Advances in Visual and Infrared Face Recognition: A Review," Journal of Computer Vision and Image Understanding, 2005, vol. 97 (1), pp. 103--135.
Li J., et al., "Live Face Detection Based on the Analysis of Fourier Spectra," Biometric Technology for Human Identification, 2004, pp. 296-303.
Linux.com, "The source for Linux information," 2012, 3 pages, downloaded from http://www.linux.com/ on Jan. 28, 2015.
Lubin, G., et al., "16 Heatmaps That Reveal Exactly Where People Look," Business Insider, [online], May 21, 2012, [Cited: Nov. 1,

(56) References Cited

OTHER PUBLICATIONS

2012], Retrieved from the Internet: URL: http://www.businessinsider. com/eye-tracking-heatmaps-2012-5? pp=1, pp. 1-21.
Maatta J., et al., "Face Spoofing Detection From Single Images Using Micro-Texture Analysis," Machine Vision Group, University of Oulu, Finland, Oulu, IEEE, [online], 2011, Retrieved from the Internet: URL: http://www.ee.oulu.fi/research/mvmp/mvg/files/pdf/131.pdf., pp. 1-7.
Marcialis G.L., et al. "First International Fingerprint Liveness Detection Competition—Livdet 2009," Image Analysis and Processing—ICIAP, Springer Berlin Heidelberg, 2009. pp. 12-23.
Martins R A., et al., "A Potpourri of Authentication Mechanisms the Mobile Device Way," CISTI, Jan. 2013, pp. 843-848.
Mobile Device Security Using Transient Authentication, IEEE Transactions on Mobile Computing, 2006, vol. 6 (11), pp. 1489-1502.
Monden A., et al., "Remote Authentication Protocol," Multimedia, Distributed, Cooperative and Mobile Symposium (DICOM02007), Information Processing Society of Japan, Jun. 29, 2007, pp. 1322-1331.
National Science & Technology Council's Subcommittee on Biometrics. Biometrics Glossary. 33 pages, Last updated Sep. 14, 2006. NSTC. http://www.biometrics.gov/documents/glossary.pdf.
Nielsen, Jakib. useit.com. Jakob Nielsen's Alertbox—Horizontal Attention Leans Left. [Online] Apr. 6, 2010. [Cited: Nov. 1, 2012.] 4 pages. http://www.useit.com/alertbox/horizontal-attention.html.
Nielsen, Jakob. useit.com. Jakob Nielsen's Alertbox—Scrolling and Attention. [Online] Mar. 22, 2010. [Cited: Nov. 1, 2012.] 6 pages. http://www.useit.com/alertbox/scrolling-attention.html.
Niinuma K., et al., "Continuous User Authentication Using Temporal Information," Apr. 2010, http://www.cse.msu.edu/biometrics/Publications/Face/NiinumaJain_ContinuousAuth_SPIE10.pdf, 11 pages.
Non-Final Office Action from U.S. Appl. No. 14/218,646, mailed Dec. 31, 2018, 42 pages.
Non-Final Office Action from U.S. Appl. No. 14/218,677, mailed Dec. 26, 2018, 32 pages.
Non-Final Office Action from U.S. Appl. No. 14/218,692, mailed Jul. 31, 2018, 40 pages.
Non-Final Office Action from U.S. Appl. No. 14/145,466, mailed May 11, 2018, 33 pages.
Non-Final Office Action from U.S. Appl. No. 14/268,563, mailed Jun. 28, 2018, 56 pages.
Non-Final Office Action from U.S. Appl. No. 15/881,522, mailed Jun. 6, 2018, 87 pages.
Non-Final Office Action from U.S. Appl. No. 15/900,620, mailed Oct. 19, 2018, 66 pages.
Non-Final Office Action from U.S. Appl. No. 13/730,761, mailed Feb. 27, 2014, 24 pages.
Non-Final Office Action from U.S. Appl. No. 13/730,761, mailed Sep. 9, 2014, 36 pages.
Non-Final Office Action from U.S. Appl. No. 13/730,776, mailed Jul. 15, 2014, 16 pages.
Non-Final Office Action from U.S. Appl. No. 13/730,780, mailed Aug. 4, 2014, 30 pages.
Non-Final Office Action from U.S. Appl. No. 13/730,780, mailed Mar. 12, 2014, 22 pages.
Non-Final Office Action from U.S. Appl. No. 13/730,791, mailed Jun. 27, 2014, 17 pages.
Non-Final Office Action from U.S. Appl. No. 13/730,795, mailed Jan. 5, 2015, 19 pages.
Non-Final Office Action from U.S. Appl. No. 13/730,795, mailed Jun. 11, 2014, 14 pages.
RFC 2560: Myers M., et al., "The Online Certificate Status Protocol, OCSP," Network working group, Jun. 1999, RFC 2560, 22 pages.
RFC 6063: Doherty, et al., "Dynamic Symmetric Key Provisioning Protocol (DSKPP)," Dec. 2010, 105 pages, Internet Engineering Task Force (IETF), Request for Comments : 6063.
RFC 6749: Hardt D, "The OAuth 2.0 Authorization Framework," Internet Engineering Task Force(IETF), Request for Comments: 6749, retrieved from https://tools.ietf.org/pdf/rfc6749.pdf, Oct. 2012, pp. 1-76.
Roberts C., "Biometric Attack Vectors and Defences," Sep. 2006, 25 pages. Retrieved from the Internet: URL: http://otago.ourarchive.ac.nz/bitstream/handle/10523/1243/BiometricAttackVectors.pdf.
Rocha A., et al., "Vision of the Unseen: Current Trends and Challenges in Digital Image and Video Forensics," ACM Computing Surveys, 2010, 47 pages. Retrieved from the Internet: URL: http://www.wjscheirer.com/papers/wjscsur2011forensics.pdf.
Rodrigues R.N., et al., "Robustness of Multimodal Biometric Fusion Methods Against Spoof Attacks," Journal of Visual Language and Computing. 2009. 11 pages, doi:10.1016/j.jvlc.2009.01.010; Retrieved from the Internet: URL: http://cubs.buffalo.edu/govind/papers/visual09.pdf.
Ross A., et al., "Multimodal Biometrics: An Overview," Proceedings of 12th European Signal Processing Conference (EUSIPCO), Sep. 2004, pp. 1221-1224. Retrieved from the Internet: URL: http://www.csee.wvu.edu/-ross/pubs/RossMultimodaiOverview EUSIPC004.pdf.
Saito T, "Mastering TCP/IP, Information Security," Ohmsha Ltd, Sep. 1, 2013, pp. 77-80 (7 Pages).
Schneier B., Biometrics: Uses and Abuses. Aug. 1999. Inside Risks 110 (CACM 42, Aug. 8, 1999), Retrieved from the Internet: URL: http://www.schneier.com/essay-019.pdf, 3 pages.
Schuckers, "Spoofing and Anti-Spoofing Measures," Information Security Technical Report, 2002, vol. 2002, pp. 56-62.
Schwartz et al., "Face Spoofing Detection Through Partial Least Squares and Low-Level Descriptors," International Conference on Biometrics, 2011, vol. 2011, pp. 1-8.
Smiatacz M., et al., Gdansk University of Technology. Liveness Measurements Using Optical Flow for Biometric Person Authentication. Metrology and Measurement Systems. 2012, vol. XIX, 2. pp. 257-268.
Starnberger G., et al., "QR-TAN: Secure Mobile Transaction Authentication," Availability, Reliability and Security, 2009, ARES'09, International Conference on IEEE, Mar. 16, 2009, pp. 578-583.
Supplementary Partial European Search Report for Application No. 13867269, dated Aug. 3, 2016, 7 pages.
T. Weigold et al., "The Zurich Trusted Information Channel—An Efficient Defence against Man-in-the-Middle and Malicious Software Attacks," P. Lipp, A.R. Sadeghi, and K.M. Koch, eds., Proc. Trust Conf. (Trust 2008), LNCS 4968, Springer-Verlag, 2008, pp. 75-91.
Tan et al., "Face Liveness Detection from a Single Image with Sparse Low Rank Bilinear Discriminative Model," European Conference on Computer Vision, 2010, vol. 2010, pp. 1-14.
TechTarget, "What is network perimeter? Definition from WhatIs. com", downloaded from http://searchnetworking.techtarget.com/definition/network-perimeter on Jun. 14, 2018, 3 pages.
The Extended M2VTS Database, [Online] [Cited: Sep. 29, 2012] downloaded from http://www.ee.surrey.ac.uk/CVSSP/xm2vtsdb/ on Jan. 28, 2015, 1 page.
Transmittal of International Preliminary Report On Patentability from foreign counterpart PCT Patent Application No. PCT/US2014/031344 dated Oct. 1, 2015, 9 pages.
Tresadern P., et al., "Mobile Biometrics (MoBio): Joint Face and Voice Verification for a Mobile Platform", 2012, 7 pages. Retrieved from the Internet: URL: http://personal.ee.surrey.ac.uk/Personai/Norman.Poh/data/tresadem_PervComp2012draft.pdf.
Tronci R., et al., "Fusion of Multiple Clues for Photo-Attack Detection in Face Recognition Systems," International Joint Conference on Biometrics, 2011. pp. 1-6.
Uludag, Umut, and Anil K. Jain. "Attacks on biometric systems: a case study in fingerprints." Electronic Imaging 2004. International Society for Optics and Photonics, 2004, 12 pages.
Unobtrusive User-Authentication on Mobile Phones using Biometric Gait Recognition, 2010, 6 pages.
Uymatiao M.L.T., et al., "Time-based OTP authentication via secure tunnel (TOAST); A mobile TOTP scheme using TLS seed exchange

(56) References Cited

OTHER PUBLICATIONS and encrypted offline keystore," 2014 4th IEEE International Conference on Information Science and Technology, IEEE, Apr. 26, 2014, pp. 225-229.
Validity, OSTP Framework, 24 pages, 2010.
Vassilev, A.T.; du Castel, B.; Ali, A.M., "Personal Brokerage of Web Service Access," Security & Privacy, IEEE , vol. 5, No. 5, pp. 24-31, Sep.-Oct. 2007.
Watanabe H., et al., "The Virtual Wearable Computing System Assumed Widely Movement," the multimedia, distribution and cooperation which were taken into consideration, mobile (DICOMO2009) symposium collected-papers [CD-ROM], Japan, Information Processing Society of Japan, Jul. 1, 2009, and vol. 2009 (1), pp. 1406-1414. (Abstract only in English).
WikiPedia article for Eye Tracking, 15 pages, Last Modified Jun. 21, 2014, en.wikipedia.org/wiki/Eye_tracking.
Willis N., Linux.com. Weekend Project: Take a Tour of Open Source Eye-Tracking Software. [Online] Mar. 2, 2012. [Cited: Nov. 1, 2012.], 4 pages. Retrieved from the Internet: URL: https://www.linux.com/learn/tutorials/550880-weekend-project-take-a-tour-of-opensource-eye-tracking-software.
Wilson R., "How To Trick Google's New Face Unlock On Android 4.1 Jelly Bean," Aug. 6, 2012, 5 pages, [online], [retrieved Aug. 13, 2015]. Retrieved from the Internet: URL: http://printscreenmac.info/how-to-trick-android-jelly-bean-faceunlock/.
World Wide Web Consortium, W3C Working Draft: Media Capture and Streams, 2013, 36 pages.
Zhang, "Security Verification of Hardware-enabled Attestation Protocols," IEEE, 2012, pp. 47-54.
Zhao W., et al., "Face Recognition: A Literature Survey," ACM Computing Surveys, 2003, vol. 35 (4), pp. 399-458.
Zhou, et al., "Face Recognition from Still Images and Videos". University of Maryland, College Park, MD 20742. Maryland : s.n., Nov. 5, 2004.pp. 1-23, Retrieved from the Internet: http://citeseerx.ist.psu.edu/viewdoc/download?doi=1 0.1.1.77.1312&rep=rep1 &type=pdf.
Abate A., et al., "2D and 3D face recognition: A survey," Jan. 2007, Pattern Recognition Letters, pp. 1885-1906.
Advisory Action from U.S. Appl. No. 13/730,791, mailed Jan. 23, 2015, 4 pages.
Akhtar Z., et al., "Spoof Attacks on Multimodal Biometric Systems," International Conference on Information and Network Technology, 2011, vol. 4, pp. 46-51.
Babich A., "Biometric Authentication. Types of Biometric Identifiers," Haaga-Helia, University of Applied Sciences, 2012, retrieved from https://www.theseus.fi/bitstream/handle/10024/44684/Babich_Aleksandra.pdf, 56 pages.
Bao W., et al., "A liveness detection method for face recognition based on optical flow field", 2009, pp. 233-236, http://ieeexplore.ieee.org/stamp/stamp.jsp?tp=&arnumber=5054589&isnumber=5054562.
Barker E., et al., "Recommendation for key management Part 3: Application-Specific Key Management Guidance," NIST Special Publication 800-57, Dec. 2009, pp. 1-103.
Behaviosec, "Measuring FAR/FRR/EER in Continuous Authentication," Stockholm, Sweden (2009), 8 pages.
Brickell, E., et al., Intel Corporation; Jan Camenish, IBM Research; Liqun Chen, HP Laboratories. "Direct Anonymous Attestation". Feb. 11, 2004, pp. 1-28 [online]. Retrieved from the Internet: URL:https://eprint.iacr.org/2004/205.pdf.
Chakka M., et al., "Competition on Counter Measures to 2-D Facial Spoofing Attacks". 6 pages .2011. http://www.csis.pace.edu/-ctappert/dps/IJCB2011/papers/130.pdf. 978-1-4577-1359-0/11.
Chen L., "Direct Anonymous Attestation," Oct. 12, 2005, retrieved from https://trustedcomputinggroup.org/wp-content/uploads/051012_DAA-slides.pdf on Apr. 2, 2018, 27 pages.
Chen L., et al., "Flexible and scalable digital signatures in TPM 2.0." Proceedings of the 2013 ACM SIGSAC conference on Computer & communications security. ACM, 2013, 12 pages.

Chetty G. School of ISE University of Canberra Australia. "Multilevel liveness verification for face-voice biometric authentication". BYSM-2006 Symposium. Baltimore: BYSM-Symposium 9 pages. Sep. 19, 2006. http://www.biometrics.org/bc2006/presentations/Tues_Sep_19/BSYM/19_Chetty_research.pdf.
Communication pursuant to Article 94(3) EPC for Application No. 15786796.1, mailed Oct. 23, 2018, 4 pages.
Communication Pursuant to Article 94(3) EPC for Application No. 15828152.7, mailed Jan. 31, 2019, 7 pages.
Communication pursuant to Article 94(3) EPC for Application No. 15841530.7, mailed Feb. 8, 2019, 4 pages.
Communication pursuant to Rules 161(2) and 162 EPC for EP Application No. 15826364.0, mailed Mar. 7, 2017, 2 pages.
Communication Pursuant to Rules 70(2) and 70a(2) EPC for European Application No. 15786487.7, mailed Nov. 9, 2017, 1 page.
Communication Pursuant to Rules 70(2) and 70a(2) EPC for European Application No. 15827363.7, mailed Mar. 13, 2018, 1 page.
Corrected Notice of Allowance from U.S. Appl. No. 15/396,452, mailed Aug. 30, 2018, 17 pages.
Corrected Notice of Allowance from U.S. Appl. No. 14/066,273, mailed Feb. 8, 2018, 4 pages.
Corrected Notice of Allowance from U.S. Appl. No. 15/396,454, mailed Sep. 28, 2018, 24 pages.
Corrected Notice of Allowance from U.S. Appl. No. 14/218,575, mailed Jun. 24, 2019, 16 pages.
Crazy Egg Heatmap Shows Where People Click on Your Website, 2012, 3 pages, www.michaelhartzell.com/Blog/bid/92970/Crazy-Egg-Heatmap-shows-where-people-click-on-your-website).
Dawei Zhang; Peng Hu, "Trusted e-commerce user agent based on USB Key", Proceedings of the International MultiConference of Engineers and Computer Scientists 2008 vol. I, IMECS 2008, Mar. 19-21, 2008, Hong Kong, 7 pages.
Decision to Grant a Patent from counterpart Japanese Patent Application No. 2016-516743 mailed Jan. 10, 2019, 5 pages.
Decision to Grant from foreign counterpart Japanese Patent Application No. 2015-550778, mailed Jul. 25, 2018, 6 pages.
Delac K. et al., Eds., "Image Compression in Face Recognition a Literature Survey," InTech, Jun. 1, 2008, ISBN 978-953-7619-34-3, Uploaded as individual Chapters 1-15, downloaded from https://www.intechopen.com/books/recent_advances_in_face_recognition/image_compression_in_face_recognition_-_a_literature_survey, 15 pages.
Extended European Search Report for U.S. Appl. No. 13/867,269, mailed Nov. 4, 2016, 10 pages.
Extended European Search Report for Application No. 14803988.6, mailed Dec. 23, 2016, 10 pages.
Extended European Search Report for Application No. 15786487.7, mailed Oct. 23, 2017, 8 pages.
Extended European Search Report for Application No. 15786796.1, mailed Nov. 3, 2017, 9 pages.
Extended European Search Report for Application No. 15826364.0, mailed Feb. 20, 2018, 6 pages.
Extended European Search Report for Application No. 15826660.1, mailed Nov. 16, 2017, 9 pages.
Extended European Search Report for Application No. 15827334.2, mailed Nov. 17, 2017, 8 pages.
Extended European Search Report for Application No. 15827363.1, mailed Feb. 22, 2018, 7 pages.
Extended European Search Report for Application No. 15828152.7, mailed Feb. 20, 2018, 8 pages.
Extended European Search Report for Application No. 15841530.7, mailed Mar. 26, 2018, 8 pages.
Extended European Search Report from European Patent Application No. 14770682.4, mailed Jan. 17, 2017, 14 pages.
Final Office Action from U.S. Appl. No. 14/145,466, mailed Nov. 20, 2018, 28 pages.
Final Office Action from U.S. Appl. No. 14/218,677, mailed May 31, 2018, 16 pages.
Final Office Action from U.S. Appl. No. 14/218,677, mailed Jun. 10, 2019, 15 pages.

(56) References Cited

OTHER PUBLICATIONS

Final Office Action from U.S. Appl. No. 14/268,563, mailed Dec. 27, 2018, 47 pages.
Final Office Action from U.S. Appl. No. 15/229,254, mailed Aug. 23, 2018, 16 pages.
Final Office Action from U.S. Appl. No. 13/730,761, mailed Jan. 15, 2015, 31 pages.
Final Office Action from U.S. Appl. No. 13/730,761, mailed Jul. 8, 2014, 36 pages.
Final Office Action from U.S. Appl. No. 13/730,776, mailed Nov. 3, 2014, 20 pages.
Final Office Action from U.S. Appl. No. 13/730,780, mailed Jan. 27, 2015, 30 pages.
Final Office Action from U.S. Appl. No. 13/730,780, mailed May 12, 2014, 34 pages.
Final Office Action from U.S. Appl. No. 13/730,791, mailed Nov. 13, 2014, 22 pages.
Final Office Action from U.S. Appl. No. 13/730,795, mailed Aug. 14, 2014, 20 pages.
Non-Final Office Action from U.S. Appl. No. 15/595,460, mailed May 3, 2018, 20 pages.
Non-Final Office Action from U.S. Appl. No. 15/954,188, mailed Sep. 7, 2018, 41 pages.
Notice of Allowance from U.S. Appl. No. 15/396,454, mailed Jan. 28, 2019, 23 pages.
Notice of Allowance from U.S. Appl. No. 15/396,454, mailed Nov. 16, 2018, 34 pages.
Notice of Allowance from foreign counterpart Chinese Patent Application No. 201480031042.X, mailed Jul. 23, 2018, 5 pages.
Notice of Allowance from foreign counterpart Taiwan Patent Application No. 106125986, mailed Jul. 6, 2018, 7 pages.
Notice of Allowance from U.S. Appl. No. 14/218,743, mailed Aug. 1, 2018, 18 pages.
Notice of Allowance from U.S. Appl. No. 14/448,814, mailed May 9, 2018, 42 pages.
Notice of Allowance from U.S. Appl. No. 15/396,452, mailed Jul. 2, 2018, 23 pages.
Notice of Allowance from U.S. Appl. No. 14/487,992 mailed May 12, 2016, 11 pages.
Notice of Allowance from U.S. Appl. No. 13/730,761, mailed Jun. 10, 2015, 15 pages.
Notice of Allowance from U.S. Appl. No. 13/730,761, mailed Sep. 28, 2015, 5 pages.
Notice of Allowance from U.S. Appl. No. 13/730,776, mailed Feb. 13, 2015, 16 pages.
Notice of Allowance from U.S. Appl. No. 13/730,776, mailed Mar. 24, 2015, 3 pages.
Notice of Allowance from U.S. Appl. No. 13/730,780, mailed Aug. 13, 2015, 13 pages.
Notice of Allowance from U.S. Appl. No. 13/730,791, mailed Mar. 10, 2015, 17 pages.
Notice of Allowance from U.S. Appl. No. 13/730,795, mailed Jan. 14, 2016, 11 pages.
Notice of Allowance from U.S. Appl. No. 13/730,795, mailed May 15, 2015, 3 pages.
Notice of Allowance from U.S. Appl. No. 13/730,795, mailed Sep. 17, 2015, 11 pages.
Notice of Allowance from U.S. Appl. No. 14/066,273, mailed Jan. 18, 2018, 26 pages.
Notice of Allowance from U.S. Appl. No. 14/066,384 mailed Sep. 27, 2016, 19 pages.
Notice of Allowance from U.S. Appl. No. 14/066,384, mailed Dec. 1, 2017, 23 pages.
Notice of Allowance from U.S. Appl. No. 14/066,384, mailed Jul. 26, 2017, 20 pages.
Notice of Allowance from U.S. Appl. No. 14/066,384, mailed May 23, 2017, 50 pages.
Notice of Allowance from U.S. Appl. No. 14/145,439 mailed Jul. 6, 2015, 6 pages.
Notice of Allowance from U.S. Appl. No. 14/145,439 mailed Mar. 14, 2016, 17 pages.
Notice of Allowance from U.S. Appl. No. 14/145,439 mailed Oct. 28, 2015, 12 pages.
Notice of Allowance from U.S. Appl. No. 14/145,533 mailed Jan. 20, 2016, 12 pages.
Notice of Allowance from U.S. Appl. No. 14/145,533 mailed May 11, 2015, 5 bages.
Notice of Allowance from U.S. Appl. No. 14/145,533 mailed Sep. 14, 2015, 13 pages.
Notice of Allowance from U.S. Appl. No. 14/145,607 mailed Feb. 1, 2016, 28 pages.
Notice of Allowance from U.S. Appl. No. 14/145,607 mailed Sep. 2, 2015, 19 pages.
Notice of Allowance from U.S. Appl. No. 14/218,504, mailed May 31, 2018, 95 pages.
Notice of Allowance from U.S. Appl. No. 14/218,551, mailed Aug. 16, 2017, 24 pages.
Notice of Allowance from U.S. Appl. No. 14/218,551, mailed Dec. 13, 2017, 13 pages.
Notice of Allowance from U.S. Appl. No. 14/218,551, mailed Feb. 8, 2017, 56 pages.
Notice of Allowance from U.S. Appl. No. 14/218,551, mailed Mar. 1, 2017, 7 pages.
Notice of Allowance from U.S. Appl. No. 14/218,575, mailed Apr. 10, 2019, 32 pages.
Notice of Allowance from U.S. Appl. No. 14/218,692, mailed Dec. 5, 2018, 13 pages.
Notice of Allowance from U.S. Appl. No. 14/268,619 mailed Oct. 3, 2016, 65 pages.
Notice of Allowance from U.S. Appl. No. 14/268,619 mailed Jul. 19, 2016, 5 bages.
Notice of Allowance from U.S. Appl. No. 14/268,686 mailed Apr. 18, 2016, 16 pages.
Notice of Allowance from U.S. Appl. No. 14/268,686 mailed Jul. 8, 2016, 4 pages.
Notice of Allowance from U.S. Appl. No. 14/268,686 mailed Mar. 30, 2016, 38 pages.
Notice of Allowance from U.S. Appl. No. 14/268,686 mailed Nov. 5, 2015, 23 pages.
Notice of Allowance from U.S. Appl. No. 14/268,733 mailed Sep. 23, 2016, 8 pages.
Notice of Allowance from U.S. Appl. No. 14/268,733, mailed Jan. 20, 2017, 62 pages.
Notice of Allowance from U.S. Appl. No. 14/448,641 mailed Jun. 7, 2016, 13 pages.
Notice of Allowance from U.S. Appl. No. 14/448,697 mailed Jan. 14, 2016, 23 pages.
Notice of Allowance from U.S. Appl. No. 14/448,697 mailed May 20, 2016, 14 pages.
Final Office Action from U.S. Appl. No. 14/066,273 mailed Feb. 11, 2016, 29 pages.
Final Office Action from U.S. Appl. No. 14/066,273, mailed Jan. 10, 2017, 24 pages.
Final Office Action from U.S. Appl. No. 14/066,273, mailed Sep. 8, 2017, 30 pages.
Final Office Action from U.S. Appl. No. 14/066,384 mailed Aug. 20, 2015, 23 pages.
Final Office Action from U.S. Appl. No. 14/145,466, mailed Apr. 13, 2017, 61 pages.
Final Office Action from U.S. Appl. No. 14/218,504, mailed Sep. 12, 2017, 83 pages.
Final Office Action from U.S. Appl. No. 14/218,551 mailed Sep. 9, 2015, 15 pages.
Final Office Action from U.S. Appl. No. 14/218,551 mailed Sep. 16, 2016, 11 pages.
Final Office Action from U.S. Appl. No. 14/218,575 mailed Aug. 7, 2015, 19 pages.
Final Office Action from U.S. Appl. No. 14/218,575 mailed Jul. 7, 2016, 29 pages.
Final Office Action from U.S. Appl. No. 14/218,575, mailed Jul. 31, 2017, 42 pages.

(56) References Cited

OTHER PUBLICATIONS

Final Office Action from U.S. Appl. No. 14/218,575 mailed Sep. 5, 2018, 19 pages.
Final Office Action from U.S. Appl. No. 14/218,611, mailed Jan. 27, 2017, 14 pages.
Final Office Action from U.S. Appl. No. 14/218,611, mailed May 3, 2018, 20 pages.
Final Office Action from U.S. Appl. No. 14/218,646, mailed Aug. 9, 2018, 23 pages.
Final Office Action from U.S. Appl. No. 14/218,646 mailed Aug. 11, 2016, 25 pages.
Final Office Action from U.S. Appl. No. 14/218,646, mailed Sep. 27, 2017, 81 pages.
Final Office Action from U.S. Appl. No. 14/218,677, mailed Sep. 28, 2017, 16 pages.
Final Office Action from U.S. Appl. No. 14/218,692, mailed Apr. 17, 2018, 99 pages.
Final Office Action from U.S. Appl. No. 14/218,692, mailed Feb. 28, 2017, 27 pages.
Final Office Action from U.S. Appl. No. 14/218,692 mailed Mar. 2, 2016, 24 pages.
Final Office Action from U.S. Appl. No. 14/218,743, mailed Feb. 7, 2018, 27 pages.
Final Office Action from U.S. Appl. No. 14/218,743, mailed Mar. 3, 2017, 67 pages.
Final Office Action from U.S. Appl. No. 14/268,563, mailed Nov. 3, 2017, 46 pages.
Final Office Action from U.S. Appl. No. 14/268,619 mailed Dec. 14, 2015, 10 pages.
Final Office Action from U.S. Appl. No. 14/268,733 mailed Jan. 15, 2016. 14 pages.
Final Office Action from U.S. Appl. No. 14/448,747, mailed Feb. 13, 2017, 74 pages.
Final Office Action from U.S. Appl. No. 14/448,814 mailed Feb. 16, 2016, 14 pages.
Final Office Action from U.S. Appl. No. 14/448,814 mailed Jun. 14, 2016, 17 bages.
Final Office Action from U.S. Appl. No. 14/448,814 mailed Oct. 6, 2017, 24 pages.
Final Office Action from U.S. Appl. No. 14/448,868 mailed Aug. 19, 2016, 11 pages.
Final Office Action from U.S. Appl. No. 14/859,328, mailed Mar. 6, 2017, 26 pages.
Final Office Action from U.S. Appl. No. 15/396,452, mailed Feb. 27, 2018, 24 pages.
Final Office Action from U.S. Appl. No. 15/595,460, mailed Jan. 11, 2018, 19 pages.
Final Office Action from U.S. Appl. No. 15/881,522, mailed Feb. 6, 2019, 21 pages.
Final Office Action from U.S. Appl. No. 15/954,188, mailed Feb. 25, 2019, 8 pages.
First Office Action and Search Report from foreign counterpart China Patent Application No. 201380068869.3, mailed Sep. 19, 2017, 17 pages.
First Office Action and Search Report from foreign counterpart China Patent Application No. 201480025959.9, mailed Jul. 7, 2017, 10 pages.
Fourth Office Action from foreign counterpart China Patent Application No. 201480025959.9, mailed Apr. 12, 2019, 10 pages.
Grother, P.J., et al., NIST. Report on the Evaluation of 2D Still-Image Face Recognition Algorithms, NIST IR 7709. s.I, NIST, 2011, Jun. 22, 2010, pp. 1-58.
GSM Arena, "Ice Cream Sandwich's Face Unlock duped using a photograph," Nov. 13, 2011, downloaded from http://www.gsmarena.com/ice_cream_sandwichs_face_unlock_duped_using_a_photograph-news-3377.php on Aug. 18, 2015, 2 pages.
Heikkila M., et al., "A Texture-Based Method for Modeling the Background and Detecting Moving Objects", Oulu : IEEE , Jun. 22, 2005, Draft, Retrieved from the Internet: http://www.ee.oulu.fi/mvg/files/pdf/pdf_662.pdf, 16 pages.
Hernandez, T., "But What Does It All Mean? Understanding Eye-Tracking Results (Part 3)", Sep. 4, 2007, 2 pages. EyeTools. Part III: What is a heatmap . . . really? [Online] [Cited: Nov. 1, 2012.] Retrieved from the Internet: URL:http://eyetools.com/articles/p3-understanding-eye-tracking-what-is-a-heatmap-really.
Himanshu, et al., "A Review of Face Recognition". International Journal of Research in Engineering & Applied Sciences. Feb. 2012, vol. 2, pp. 835-846. Retrieved from the Internet: URL:http://euroasiapub.org/IJREAS/Feb2012/81.pdf.
Huang L., et al., "Clickjacking: Attacks and Defenses". S.I. : Usenix Security 2012, pp. 1-16, 2012 [online]. Retrieved from the Internet: URL:https://www.usenix.org/system/files/conference/usenixsecurity12/sec12-final39.pdf.
International Preliminary Report On Patentability for Application No. PCT/US2013/077888, mailed Jul. 9, 2015, 7 pages.
International Preliminary Report on Patentability for Application No. PCT/US2015/028924 mailed Nov. 17, 2016, 9 pages.
International Preliminary Report on Patentability for Application No. PCT/US2015/028927 mailed Nov. 17, 2016, 10 pages.
International Preliminary Report on Patentability for Application No. PCT/US2015/042786, mailed Feb. 9, 2017, 7 pages.
International Preliminary Report on Patentability for Application No. PCT/US2015/042799, mailed Feb. 9, 2017, 7 pages.
Corrected Notice of Allowability, U.S. Appl. No. 15/881,522, Sep. 9, 2020, 2 pages.
Decision to Grant, EP App. No. 15826660.1, Sep. 3, 2020, 2 pages.
Non Final Office Action, U.S. Appl. No. 15/822,531, Sep. 9, 2020, 23 pages.
Notification to Grant Patent Right for Invention, CN App. No. 201580049696.X, Sep. 2, 2020, 4 pages (2 pages of English Translation and 2 pages of Original Document).
Requirement for Restriction/Election, U.S. Appl. No. 16/392,301, Sep. 14, 2020, 13 pages.
Third Office Action, CN App. No. 201580040813.6, Aug. 28, 2020, 10 pages (5 pages of English Translation and 5 pages of Original Document).
Communication pursuant to Article 94(3) EPC, EP App. No. 13867269.6, Aug. 30, 2019, 6 pages.
Communication Pursuant to Article 94(3) EPC, EP App. No. 14770682.4, Jun. 6, 2019, 5 pages.
Communication pursuant to Article 94(3) EPC, EP App. No. 15786796.1, May 31, 2019, 5 pages.
Communication pursuant to Article 94(3) EPC, EP App. No. 15826660.1, Jul. 4, 2019, 6 pages.
Communication Pursuant to Article 94(3) EPC, EP App. No. 15827334.2, Apr. 30, 2019, 9 pages.
Communication pursuant to Article 94(3)EPC, EP. App. No. 14803988.6, Oct. 25, 2019, 5 pages.
Final Office Action, U.S. Appl. No. 14/218,611, Aug. 2, 2019, 26 pages.
Final Office Action, U.S. Appl. No. 14/268,563, Nov. 8, 2019, 36 pages.
Final Office Action, U.S. Appl. No. 15/229,233, Sep. 24, 2019, 18 pages.
First Office Action and Search Report, CN App. No. 201580040813.6, Jun. 28, 2019, 19 pages.
First Office Action and Search Report, CN App. No. 201580040814, Jul. 10, 2019, 10 pages (Translation available only for the office action).
Hebbes L., et al., "2-Factor Authentication with 2D Barcodes," Proceedings of the Fifth International Symposium on Human Aspects of Information Security & Assurance (HAISA 2011), 2011, pp. 86-96.
IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks-Specific requirements, Mar. 2015, 632 pages.
IEEE Std 802.11-2012: "Part 11: Wireless LAN Medium Access Control (MAC) and Physical Layer (PHY) Specifications," IEEE Standard for Information technology—Telecommunicationsand infor-

(56) References Cited

OTHER PUBLICATIONS mation exchange between systems, Local and metropolitan area networks—Specific requirements, Mar. 29, 2012, 2793 pages.
IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 Ghz," IEEE Standard for Information technology—Telecommunicationsand information exchange between systems, Local and metropolitan area networks—Specific requirements, Dec. 18, 2013, 425 pages.
Non-Final Office Action, U.S. Appl. No. 14/218,677, Oct. 30, 2019, 5 pages.
Non-Final Office Action, U.S. Appl. No. 15/881,522, Jul. 16, 2019, 39 pages.
Notice of Abandonment, U.S. Appl. No. 16/209,838, Sep. 4, 2019, 2 pages.
Notice of Allowance, TW App. No. 102148853, Jul. 6, 2017, 3 pages.
Notice of Allowance, U.S. Appl. No. 14/218,646, Sep. 5, 2019, 6 pages.
Notice of Allowance, U.S. Appl. No. 15/229,254, Sep. 11, 2019, 8 pages.
Notice of Reasons for Refusal, JP App. No. 2018-153218, Jun. 5, 2019, 7 pages.
Notification to Grant Patent Right for Invention, CN App. No. 201580021972, Jul. 16, 2019, 4 pages.
Office Action and Search Report, TW App. No. 107127837, Jun. 26, 2019, 4 pages.
Rejection Judgment, JP App. No. 2017-505513, Jun. 17, 2019, 4 pages.
Requirement for Restriction/Election, U.S. Appl. No. 15/822,531, Oct. 16, 2019, 6 pages.
Schmidt et al., "Trusted Platform Validation and Management," International Journal of Dependable and Trustworthy Information Systems, vol. 1, No. 2, Apr.-Jun. 2010, pp. 1-31.
Theuner et al., "Analysis of Advertising Effectiveness with Eye Tracking", Department of Marketing, Ludwigshafen University of Applied Science, Proceedings of Measuring Behavior 2008, 2008, 2 pages.
Notification of Grant of Invention Patent, CN App. No. 201580022332.2, Sep. 4, 2020, 4 pages (2 pages of English Translation and 2 pages of Original Document).
Notification of Grant of Invention Patent, CN App. No. 201580041803.4, Oct. 9, 2020, 4 pages (2 pages of English Translation and 2 pages of Original Document).
Second Office Action, CN App. No. 201580040831.4, Sep. 2, 2020, 8 pages (5 pages of English Translation and 3 pages of Original Document).
Notice of Allowance from U.S. Appl. No. 14/448,697 mailed Sep. 1, 2016, 3 pages.
Notice of Allowance from U.S. Appl. No. 14/448,697 mailed Sep. 15, 2015, 14 pages.
Notice of Allowance from U.S. Appl. No. 14/448,747, mailed Jun. 20, 2017, 14 pages.
Notice of Allowance from U.S. Appl. No. 14/448,868, mailed Apr. 27, 2017, 62 pages.
Notice of Allowance from U.S. Appl. No. 14/448,868, mailed Jun. 26, 2017, 14 pages.
Notice of Allowance from U.S. Appl. No. 14/448,868, mailed Mar. 23, 2017, 57 pages.
Notice of Allowance from U.S. Appl. No. 14/448,868, mailed Nov. 17, 2017, 15 pages.
Notice of Allowance from U.S. Appl. No. 14/487,992, mailed Apr. 12, 2017, 14 pages.
Notice of Allowance from U.S. Appl. No. 14/487,992, mailed Dec. 27, 2016, 28 pages.
Notice of Allowance from U.S. Appl. No. 14/487,992, mailed Jul. 17, 2017, 8 pages.
Notice of Allowance from U.S. Appl. No. 14/487,992, mailed Jun. 14, 2017, 14 pages.
Notice of Allowance from U.S. Appl. No. 14/487,992 mailed Sep. 6, 2016, 26 pages.
Notice of Allowance from U.S. Appl. No. 14/859,328, mailed Feb. 1, 2018, 18 pages.
Notice of Allowance from U.S. Appl. No. 15/396,454, mailed Sep. 18, 2018, 79 pages.
Notice of Allowance from U.S. Appl. No. 15/595,460, mailed Mar. 14, 2019, 32 pages.
Notice of Allowance from U.S. Appl. No. 15/595,460, mailed May 17, 2019, 10 pages.
Notice of Allowance from U.S. Appl. No. 15/595,460, mailed Oct. 9, 2018, 8 pages.
Notice of Allowance from U.S. Appl. No. 15/900,620, mailed Feb. 15, 2019, 20 pages.
Notice of Allowance from U.S. Appl. No. 15/954,188, mailed Apr. 26, 2019, 5 pages.
Notice of Reasons for Rejection from foreign counterpart Japanese Patent Application No. 2017-505513, mailed Oct. 22, 2018, 6 pages.
Notice of Reasons for Rejection from foreign counterpart Japanese Patent Application No. 2016-566924, mailed Mar. 7, 2019, 23 pages.
Notification Concerning Transmittal of International Preliminary Report on Patentability for Application No. PCT/US14/39627, mailed on Dec. 10, 2015, 8 pages.
Notification for Granting Patent Right and Search Report from foreign counterpart Chinese Patent Application No. 201380068869.3, mailed May 4, 2018, 10 pages.
Notification of Reason for Rejection from foreign counterpart Japanese Patent Application No. 2016-505506, mailed Feb. 13, 2018, 6 pages.
Notification of Reasons for Refusal from foreign counterpart Japanese Patent Application No. 2017-505072, mailed Apr. 15, 2019, 8 pages.
Notification of Reasons for Refusal from foreign counterpart Japanese Patent Application No. 2017-514840, mailed Apr. 1, 2019, 10 pages.
Notification of Reasons for Rejection from foreign counterpart Japanese Patent Application No. 2016-0516743, mailed Apr. 23, 2018, 12 pages.
Notification of Reasons for Rejection from foreign counterpart Japanese Patent Application No. 2016-566912, mailed Jan. 31, 2019, 11 pages.
Notification of Transmittal of the International Search Report and the Written Opinion from counterpart Patent Cooperation Treaty Application No. PCT/US14/31344, mailed Nov. 3, 2014, 16 pages.
Notification of Transmittal of the International Search Report and the Written Opinion from counterpart Patent Cooperation Treaty Application No. PCT/US14/39627, mailed Oct. 16, 2014, 10 bages.
Notification of Transmittal or International Search Report and Written Opinion from PCT/US2015/028927, mailed Jul. 30, 2015, 12 pages.
OASIS Standard, "Authentication Context for the OASIS Security Assertion Markup Language (SAML) V2.0," Mar. 15, 2005, 70 pages.
Office Action and Search Report from foreign counterpart Chinese Patent Application No. 201480031042.X, mailed Dec. 4, 2017, 20 pages.
Office Action and Search Report from foreign counterpart Taiwan Patent Application No. 106125986, mailed Mar. 19, 2018, 6 pages.
Office Action from foreign counterpart Japanese Patent Application No. 2015-550778, mailed Feb. 7, 2018, 14 pages.
Office Action from foreign counterpart Japanese Patent Application No. 2017-505504, mailed Apr. 15, 2019, 3 pages.
Office Action from foreign counterpart Taiwan Patent Application No. 102148853, mailed Feb. 17, 2017, 9 pages.
"OpenID Connect Core 1.0—draft 17," Feb. 3, 2014, 70 pages.
Pan G., et al., "Liveness Detection for Face Recognition" in: Recent Advances in Face Recognition, 2008, pp. 109-124, Vienna : I-Tech, 2008, Ch. 9, ISBN: 978-953-7619-34-3.
Pan G., et al., "Monocular Camera-based Face Liveness Detection by Combining Eyeblink and Scene Context," pp. 215-225, s.I. :

(56) References Cited

OTHER PUBLICATIONS

Springer Science+Business Media, LLC, Aug. 4, 2010. Retrieved from the Internet: URL: http://www.cs.zju.edu.cn/-gpan/publication/2011-TeleSysliveness.pdf.
Partial Supplementary European Search Report from European Patent Application No. 14770682.4, mailed Oct. 14, 2016, 8 pages.
Peng Y., et al., "RASL: Robust Alignment by Sparse and Low-Rank Decomposition for Linearly Correlated Images", IEEE Conference on Computer Vision and Pattern Recognition, 2010, pp. 763-770. Retrieved from the Internet: URL: http://yima.csl.illinois.edu/psfile/RASL_CVPR10.pdf.
Phillips P. J., et al., "Biometric Image Processing and Recognition," Chellappa, 1998, Eusipco, 8 pages.
Phillips P.J., et al., "Face Recognition Vendor Test 2002: Evaluation Report," s.I. : NISTIR 6965, 2002, 56 pages. Retrieved from the Internet: URL: http://www.facerec.org/vendors/FRVT2002_Evaluation_Report.pdf.
Phillips P.J., et al., "FRVT 2006 and ICE 2006 Large-Scale Results", NIST IR 7408, Gaithersburg, NIST, 2006, Mar. 29, 2007, pp. 1-55.
Pinto A., et al., "Video-Based Face Spoofing Detection through Visual Rhythm Analysis," Los Alamitos : IEEE Computer Society Conference Publishing Services, 2012, Conference on Graphics, Patterns and Images, 8 pages. (SIBGRAPI). Retrieved from the Internet: URL: http://sibgrapi.sid.inpe.br/rep/sid.inpe.br/sibgrapi/2012/07.13.21.16?mirror=SID.inpe.br/ banon/2001/03.30.15.38.24&metadatarepository=sid.inpe.br/sibgrapi/2012/07.13.21.1 6.53.
Quinn G.W., et al., "Performance of Face Recognition Algorithms on Compressed Images", NIST Inter Agency Report 7830, NIST, Dec. 4, 2011, 35 pages.
Ratha N.K., et al., "An Analysis of Minutiae Matching Strength," Audio and Video-Based Biometric Person Authentication, Springer Berlin Heidelberg, 2001, 7 pages.
Ratha N.K., et al., "Enhancing Security and Privacy in Biometrics-Based Authentication Systems," IBM Systems Journal, 2001, vol. 40 (3), pp. 614-634.
Requirement for Restriction/Election from U.S. Appl. No. 14/218,504 mailed Aug. 16, 2016, 11 pages.
Decision of Appeal, JP App. No. 2017-505513, Mar. 4, 2021, 4 pages (2 pages of English Translation and 2 pages of Original Document).
Non-Final Office Action, U.S. Appl. No. 16/369,823, Mar. 18, 2021, 23 pages.
Notice of Allowance, CN App. No. 201580040813.6, Dec. 2, 2020, 2 pages of Original Document Only.
Notification to Grant Patent Right for Invention, CN App. No. 201580040831.4, Dec. 29, 2020, 4 pages (2 pages of English Translation and 2 pages of Original Document).
Non-Final Office Action, U.S. Appl. No. 16/392,301, Mar. 22, 2021, 17 pages.
Office Action, EP App. No. 14803988.6, Mar. 9, 2021, 11 pages.
Intention to Grant, EP App. No. 14803988.6, Nov. 8, 2021, 7 pages.
Notification of Reason for Refusal, KR App. No. 10-2017-7003447, Nov. 2, 2021, 6 pages (3 pages of English Translation and 3 pages of Original Document).
Office Action, KR App. No. 10-2017-7003592, Nov. 16, 2021, 5 pages of Original Document Only.
Final Office Action, U.S. Appl. No. 15/822,531, Jun. 3, 2021, 19 pages.
Final Office Action, U.S. Appl. No. 16/392,301, Jun. 30, 2021, 20 pages.
Non-Final Office Action, U.S. Appl. No. 16/244,705, Jun. 17, 2021, 33 pages.
Brown et al., "U-Prove CTP R2 Whitepaper", Revision 17, Microsoft Corporation, Feb. 2011, pp. 1-22.
European Search Report and Search Opinion, EP App. No. 19738099.1, Jul. 26, 2021, 13 pages.
Intention to Grant, EP App. No. 14770682.4, Jul. 13, 2021, 6 pages.
International Preliminary Report on Patentability, PCT App. No. PCT/US2020/020439, Sep. 10, 2021, 8 pages.
Non-Final Office Action U.S. Appl. No. 16/369,823, Sep. 28, 2021, 24 pages.
Notice to File a Response, KR App. No. 10-2016-7033634, Jul. 7, 2021, 22 pages (13 pages of English Translation and 9 pages of Original Document).
Notice to File a Response, KR App. No. 10-2017-7003444, Jul. 7, 2021, 26 pages (12 pages of English Translation and 14 pages of English Translation).
Notification of Reason for Refusal, KR App. No. 10-2016-7033631, Oct. 5, 2021, 20 pages (11 pages of English Translation and 9 pages of Original Document).
Notification of Reason for Refusal, KR App. No. 10-2017-7007634, Sep. 10, 2021, 13 pages (7 pages of English Translation and 6 pages of Original Document).
Othman et al., "The Horcrux Protocol: A Method for Decentralized Biometric-based Self-sovereign Identity", 2018 International Joint Conference on Neural Networks (IJCNN), Nov. 20, 2017, 7 pages.
Supplementary European Search Report and Search Opinion, EP App. No. 18882247.2, Aug. 30, 2021, 13 pages.
Wefel et al., "Raising User Acceptance of Token-based Authentication by Single Sign-On Sandro", International Journal of Information and Computer Science, vol. 1, Jun. 2012, pp. 70-77.
Notice of Reasons for Refusal, JP App. No. 2018-209608, Jul. 12, 2021, 07 pages (4 pages of English Translation and 3 pages of Original Document).
Notification of Reason for Refusal, KR App. No. 10-2017-7003449, Jul. 7, 2021, 14 pages (7 pages of English Translation and 7 pages of Office Action).
Supplementary Partial European Search Report and Search Opinion, EP App. No. 18882247.2, May 28, 2021, 14 pages.
Notification of Reason for Refusal, KR App. No. 10-2017-7003450, Jan. 27, 2022, 12 pages (6 pages of English Translation and 6 pages of Original Document).
Decision to grant a European patent, EP App. No. 14770682.4, Nov. 25, 2021, 3 pages.
Decision to grant a European patent, EP App. No. 14803988.6, Jan. 20, 2022, 2 pages.
Grant of Patent, KR App. No. 10-2017-7003444, Jan. 6, 2022, 4 pages (2 pages of English Translation and 2 pages of Original Document).
Notice Of Allowance, KR App. No. 10-2016-7033631, Jan. 13, 2022, 3 pages (1 page of English Translation and 2 pages of Original Document).
Notice Of Allowance, KR App. No. 10-2017-7003447, Jan. 12, 2022, 3 pages (1 page of English Translation and 2 pages of Original Document).
Notice of Reasons for Refusal, JP App. No. 2020-180503, Jan. 26, 2022, 10 pages (6 pages of English Translation and 4 pages of Original Document).
Notification of Reason for Refusal, KR App. No. 10-2016-7033634, Jan. 26, 2022, 6 pages (3 pages of English Translation and 3 pages of Original Document).
Non-Final Office Action, U.S. Appl. No. 16/392,301, Feb. 24, 2022, 14 pages.
Advisory Action, U.S. Appl. No. 15/822,531, Dec. 10, 2021, 4 pages.
Final Office Action, U.S. Appl. No. 16/244,705, Jan. 27, 2022, 36 pages.
Notice of Allowance, U.S. Appl. No. 16/244,705, Aug. 25, 2022, 20 pages.
Notice of Allowance, U.S. Appl. No. 16/369,823, Aug. 25, 2022, 10 pages.
European Search Report and Search Opinion, EP App. No. 21214856.3, Mar. 23, 2022, 9 pages.
Final Office Action, U.S. Appl. No. 16/369,823, Apr. 25, 2022, 7 pages.
Final Office Action, U.S. Appl. No. 16/392,301, Jun. 2, 2022, 18 pages.
Non-Final Office Action, U.S. Appl. No. 15/822,531, Mar. 29, 2022, 16 pages.
Notice of Allowance, KR App. No. 10-2017-7003449, Mar. 20, 2022, 3 pages (1 page of English Translation and 2 pages of Original Document).

(56) References Cited

OTHER PUBLICATIONS

Notice of Allowance, KR App. No. 10-2017-7003592, Jun. 9, 2022, 3 pages (1 page of English Translation and 2 pages of Original Document).
Notice of Allowance, KR App. No. 10-2017-7007634, Apr. 22, 2022, 3 pages (1 page of English Translation and 2 pages of Original Document).
Trial and Appeal Decision, JP App. No. 2018-209608, Apr. 11, 2022, 15 pages (8 pages of English Translation and 7 pages of Original Document).
Notice of Allowance, KR App. No. 10-2016-7033634, Jul. 20, 2022, 3 pages (1 page of English Translation and 2 pages of Original Document).
Notice of Allowance, KR App. No. 10-2017-7003450, Jul. 27, 2022, 3 pages (1 page of English Translation and 2 pages of Original Document).
Final Office Action, U.S. Appl. No. 15/822,531, Sep. 28, 2022, 16 pages.
Notice of Allowance, U.S. Appl. No. 16/244,705, Nov. 30, 2022, 16 pages.
Notice of Allowance, U.S. Appl. No. 16/369,823, Nov. 29, 2022, 9 pages.
Notice of Allowance, U.S. Appl. No. 16/392,301, Dec. 9, 2022, 10 pages.
Notice of Reasons for Refusal, JP App. No. 2020-180503, Nov. 21, 2022, 5 pages (3 pages of English Translation and 2 pages of Original Document).
Notice of Reasons for Refusal, JP App. No. 2020-546306, Nov. 16, 2022, 17 pages (10 pages of English Translation and 7 pages of Original Document).
Decision to Grant a Patent, JP App. No. 2020-538981, Aug. 7, 2023, 4 pages (2 pages of English Translation and 2 pages of Original Document).
Final Office Action, U.S. Appl. No. 15/822,531, Jul. 28, 2023, 16 pages.
Notice of Allowance, CN App. No. 202010235627.0, Aug. 11, 2023, 2 pages of Original Document Only.
Notice of Allowance, KR App. No. 10-2016-0170660, Jul. 28, 2023, 3 pages (1 page of English Translation and 2 pages of Original Document).
Notice of Allowance, U.S. Appl. No. 15/822,531, Aug. 24, 2023, 9 pages.
Notice of Allowance, U.S. Appl. No. 16/392,301, Aug. 28, 2023, 8 pages.
Advisory Action, U.S. Appl. No. 15/822,531, Mar. 13, 2023, 3 pages.
First Office Action, CN App. No. 202010235627.0, Mar. 13, 2023, 8 pages (2 pages of English Translation and 6 pages of Original Document).
Notice of Allowance, U.S. Appl. No. 16/244,705, Apr. 19, 2023, 2 pages.
Notice of Allowance, U.S. Appl. No. 16/244,705, Mar. 1, 2023, 16 pages.
Notice of Allowance, U.S. Appl. No. 16/369,823, Mar. 15, 2023, 9 pages.
Notice of Allowance, U.S. Appl. No. 16/392,301, May 1, 2023, 10 pages.
Notice of Reasons for Refusal, JP App. No. 2020-538981, Feb. 27, 2023, 7 pages (4 pages of English Translation and 3 pages of Original Document).
Office Action, EP App. No. 18882247.2, Mar. 27, 2023, 5 pages.
Request for the Submission of an Opinion, KR App. No. 10-2016-0164456, Feb. 24, 2023, 5 pages (2 pages of English Translation and 3 pages of Original Document).
Request for the Submission of an Opinion, KR App. No. 10-2016-0170660, Mar. 5, 2023, 25 pages (13 pages of English Translation and 12 pages of Original Document).
Richards, G., "One-Time Password (OTP) Pre-Authentication," Internet Engineering Task Force (IETF), RFC 6560, Apr. 2012, 43 pages, XP015081490.
Supplementary European Search Report and Search Opinion, EP App. No. 20782486.3, Nov. 28, 2022, 10 pages.
Decision of Refusal, JP App. No. 2020-546306, May 29, 2023, 7 pages (4 pages of English Translation and 3 pages of Original Document).
Decision to Grant a Patent, JP App. No. 2020-180503, Jun. 1, 2023, 4 pages (2 pages of English Translation and 2 pages of Original Document).
Notice of Allowance, KR App. No. 10-2016-0164456, Jul. 14, 2023, 3 pages (1 page of English Translation and 2 pages of Original Document).
Notice of Allowance, U.S. Appl. No. 16/244,705, Jun. 29, 2023, 15 pages.
Notice of Allowance, U.S. Appl. No. 16/369,823, Jul. 19, 2023, 8 pages.
Emeni, "U-Prove Offers Security while Protecting Privacy", Available Online at <https://www.infoq.com/news/2010/03/U-Prove-Security-Privacy/>, 2010, 5 pages.
Intention to Grant, EP App. No. 18882247.2, Dec. 7, 2023, 7 pages.
Notice of Allowance, U.S. Appl. No. 16/369,823, Sep. 20, 2023, 6 pages.
Notice of Allowance, U.S. Appl. No. 16/392,301, Nov. 30, 2023, 7 pages.
Office Action, CN App. No. 201980008272.7, Aug. 17, 2023, 13 pages (6 pages of English translation and 7 pages of Original Document).
Office Action, EP App. No. 19738099.1, Sep. 13, 2023, 4 pages.
Office Action, KR App. No. 10-2020-7018624, Aug. 29, 2023, 8 pages (4 pages of English Translation and 4 pages of Original Document).
First Office Action, CN App. No. 202080026123.6, Feb. 8, 2024, 13 page (5 pages of English Translation and 8 pages of Original Document).
Office Action, KR App. No. 10-2020-7020336, Feb. 21, 2024, 18 pages (9 pages of English Translation and 9 pages of Original Document).
Avram, et al., "U-Prove: Providing Security without Sacrificing Privacy", InfoQ, Available Online at <https://www.infoq.cn/article/2010/03/U-Prove-Security-Privacy>, Mar. 19, 2010, 5 pages.
Office Action, CN App. No. 201880076556.5, Apr. 26, 2024, 22 pages (12 pages of English Translation and 10 pages of Original Document).
Notice of Allowance, KR App. No. 10-2020-7018624, Feb. 28, 2024, 3 pages (1 page of English Translation and 2 pages of Original Document).
Office Action, CN App. No. 201980008272.7, May 12, 2024, 13 pages (7 pages of English Translation and 6 pages of Original Document).
Office Action, JP App. No. 2021-558614, Apr. 15, 2024, 8 pages (5 pages of English Translation and 3 pages of Original Document).

\* cited by examiner

SYSTEM AND METHOD FOR ENDORSING A NEW AUTHENTICATOR

BACKGROUND

Field of the Invention

This invention relates generally to the field of data processing systems. More particularly, the invention relates to a system and method for endorsing a new authenticator.

Description of Related Art

FIG. 1 illustrates an exemplary client 120 with a biometric device 100. When operated normally, a biometric sensor 102 reads raw biometric data from the user (e.g., capture the user's fingerprint, record the user's voice, snap a photo of the user, etc.) and a feature extraction module 103 extracts specified characteristics of the raw biometric data (e.g., focusing on certain regions of the fingerprint, certain facial features, etc.). A matcher module 104 compares the extracted features 133 with biometric reference data 110 stored in a secure storage on the client 120 and generates a score based on the similarity between the extracted features and the biometric reference data 110. The biometric reference data 110 is typically the result of an enrollment process in which the user enrolls a fingerprint, voice sample, image or other biometric data with the device 100. An application 105 may then use the score to determine whether the authentication was successful (e.g., if the score is above a certain specified threshold).

While the system shown in FIG. 1 is oriented towards biometric authentication, various other or additional authentication techniques may be employed on the exemplary client 120. For example, the client-side authenticators may be based on a PIN or other secret code (e.g., a password) entered by the user and/or may be triggered based on user presence (e.g., a button that user pushes to verify presence).

Systems have been designed for providing secure user authentication over a network using biometric sensors. In such systems, the score generated by the application, and/or other authentication data, may be sent over a network to authenticate the user with a remote server. For example, Patent Application No. 2011/0082801 ("'801 Application") describes a framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc.).

The assignee of the present application has developed a variety of improvements to the authentication framework described in the '801 application. Some of these improvements are described in the following set of U.S. Patent Applications ("Co-pending Applications"), all filed Dec. 29, 1012, which are assigned to the present assignee and incorporated herein by reference: Ser. No. 13/730,761, Query System and Method to Determine Authentication Capabilities; Ser. No. 13/730,776, System and Method for Efficiently Enrolling, Registering, and Authenticating With Multiple Authentication Devices; Ser. No. 13/730,780, System and Method for Processing Random Challenges Within an Authentication Framework; Ser. No. 13/730,791, System and Method for Implementing Privacy Classes Within an Authentication Framework; Ser. No. 13/730,795, System and Method for Implementing Transaction Signaling Within an Authentication Framework.

Briefly, the Co-Pending Applications describe authentication techniques in which a user enrolls with authentication devices (or Authenticators) such as biometric devices (e.g., fingerprint sensors) on a client device. When a user enrolls with a biometric device, biometric reference data is captured (e.g., by swiping a finger, snapping a picture, recording a voice, etc.). The user may subsequently register the authentication devices with one or more servers over a network (e.g., Websites or other relying parties equipped with secure transaction services as described in the Co-Pending Applications); and subsequently authenticate with those servers using data exchanged during the registration process (e.g., cryptographic keys provisioned into the authentication devices). Once authenticated, the user is permitted to perform one or more online transactions with a Website or other relying party. In the framework described in the Co-Pending Applications, sensitive information such as fingerprint data and other data which can be used to uniquely identify the user, may be retained locally on the user's authentication device to protect a user's privacy.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Figure 1:
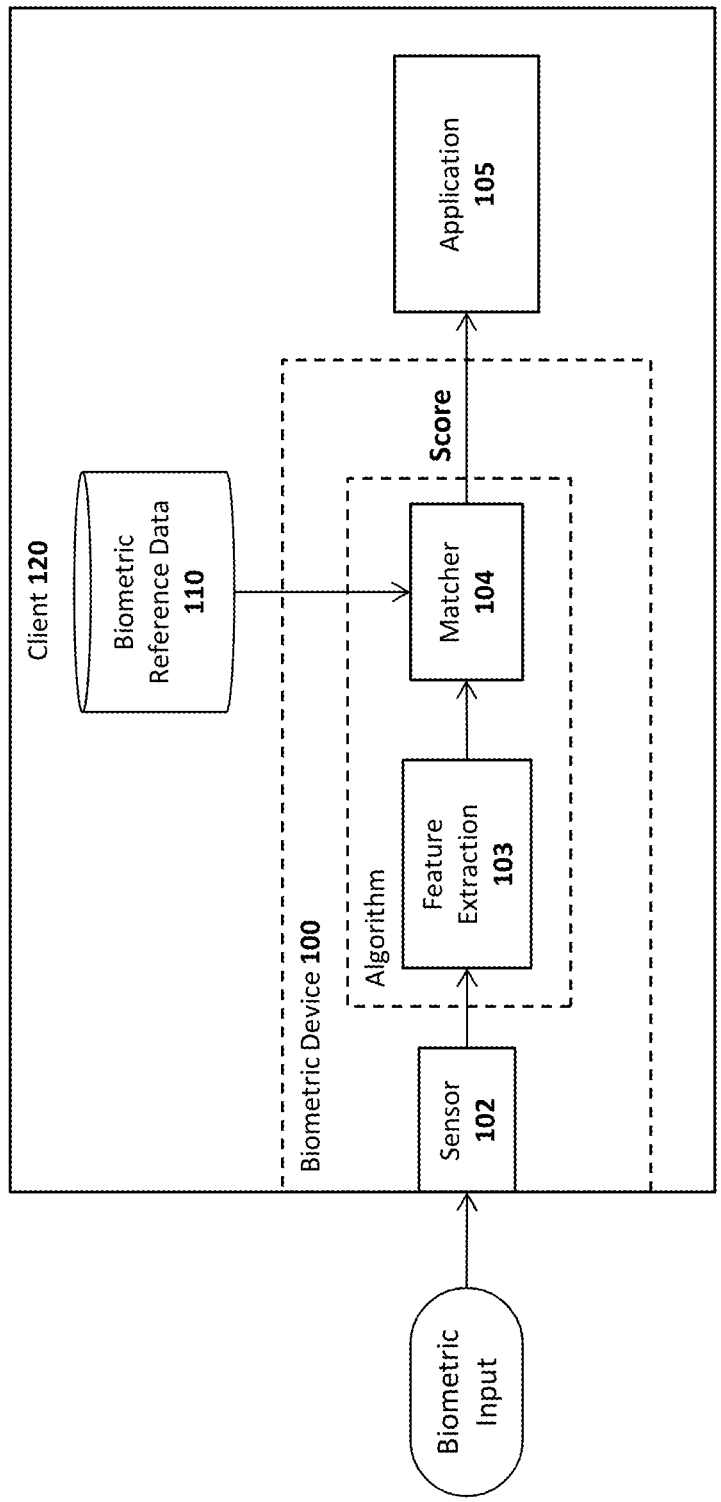
FIG. 1 illustrates an exemplary client equipped with a biometric device.

Described below are embodiments of an apparatus, method, and machine-readable medium for authorizing a new authenticator. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve authentication devices with user verification capabilities such as biometric modalities or PIN entry. These devices are sometimes referred to herein as "tokens," "authentication devices," or "authenticators." While certain embodiments focus on facial recognition hardware/software (e.g., a camera and associated software for recognizing a user's face and tracking a user's eye movement), some embodiments may utilize additional biometric devices including, for example, fingerprint sensors, voice recognition hardware/software (e.g., a microphone and associated software for recognizing a user's voice), and optical recognition capabilities (e.g., an optical scanner and associated software for scanning the retina of a user). The user verification capabilities may also include non-biometric modalities, like PIN entry. The authenticators might use devices like trusted platform modules (TPMs), smartcards and secure elements for cryptographic operations and key storage.

In a mobile biometric implementation, the biometric device may be remote from the relying party. As used herein, the term "remote" means that the biometric sensor is not part of the security boundary of the computer it is communicatively coupled to (e.g., it is not embedded into the same physical enclosure as the relying party computer). By way of example, the biometric device may be coupled to the relying party via a network (e.g., the Internet, a wireless network link, etc.) or via a peripheral input such as a USB port. Under these conditions, there may be no way for the relying party to know if the device is one which is authorized by the relying party (e.g., one which provides an acceptable level of authentication strength and integrity protection) and/or whether a hacker has compromised or even replaced the biometric device. Confidence in the biometric device depends on the particular implementation of the device.

The term "relying party" is sometimes used herein to refer, not merely to the entity with which a user transaction is attempted (e.g., a Website or online service performing user transactions), but also to the secure transaction servers implemented on behalf of that entity which may performed the underlying authentication techniques described herein. The secure transaction servers may be owned and/or under the control of the relying party or may be under the control of a third party offering secure transaction services to the relying party as part of a business arrangement.

The term "server" is used herein to refer to software executed on a hardware platform (or across multiple hardware platforms) that receives requests over a network from a client, responsively performs one or more operations, and transmits a response to the client, typically including the results of the operations. The server responds to client requests to provide, or help to provide, a network "service" to the clients. Significantly, a server is not limited to a single computer (e.g., a single hardware device for executing the server software) and may, in fact, be spread across multiple hardware platforms, potentially at multiple geographical locations.

System and Method for Authorizing a New Authenticator

In some instances, it may be useful to allow a new authenticator to be enabled using registered authenticators on existing client devices. For example, if the user purchases a new device with a new set of authenticators, it would be beneficial to provide the user with a way to automatically register all of the new authenticators using the existing authenticators.

The embodiments of the invention described below allow a user to authorize the authenticator(s) on a new client device using an existing/old, trusted client device that is registered with one or more relying parties. In particular, these embodiments may be used to enable new authenticators on new or existing client devices and keep the registrations in sync between multiple client devices.

Figure 2:
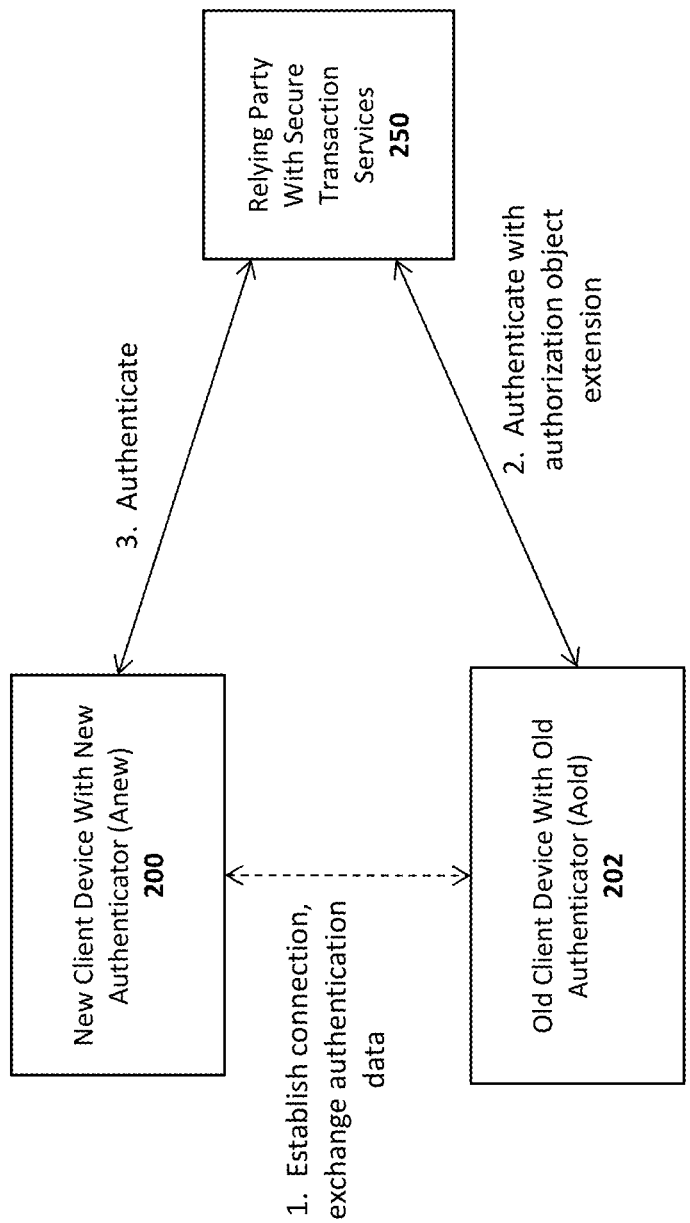
FIG. 2 illustrates one embodiment of a system for authorizing a new authenticator with a relying party.

FIG. 2 provides a high level overview of authenticator authorization in accordance with one embodiment of the invention. A client device with an old/existing authenticator (Aold) 202 (i.e., a device which has an authenticator which is registered with one or more relying parties 250), establishes a connection with the user's new client device 200. The particular manner in which the connection is established is not pertinent to the underlying principles of the invention. In one embodiment, the connection comprises a secure/encrypted connection (e.g., established via SSL, TLS, etc.). Various techniques may be used such as near field communication (NFC), Bluetooth, Wifi Direct, using a quick response (QR) code and establishing an HTTPS connection, or over a standard network connection (e.g., via WiFi or Ethernet).

In one embodiment, once the connection is established between the client with Aold 202 and the client with Anew 200, a secure protocol is implemented (described in detail below) to transfer and integrate the registration data from the old/existing client 202 to the new client 200. For example, in one embodiment, the old client 202 sends registration data to the new client 200 which then generates a new set of key pairs (e.g., one for each relying party) and sends the public keys back to the old client 202 along with an indication of the types of authenticators on the new client 200. The client with Aold then generates a signed authorization object (e.g., using the public keys, authenticator identification data, and user account data) which it sends to each respective relying party 250.

Figure 3:
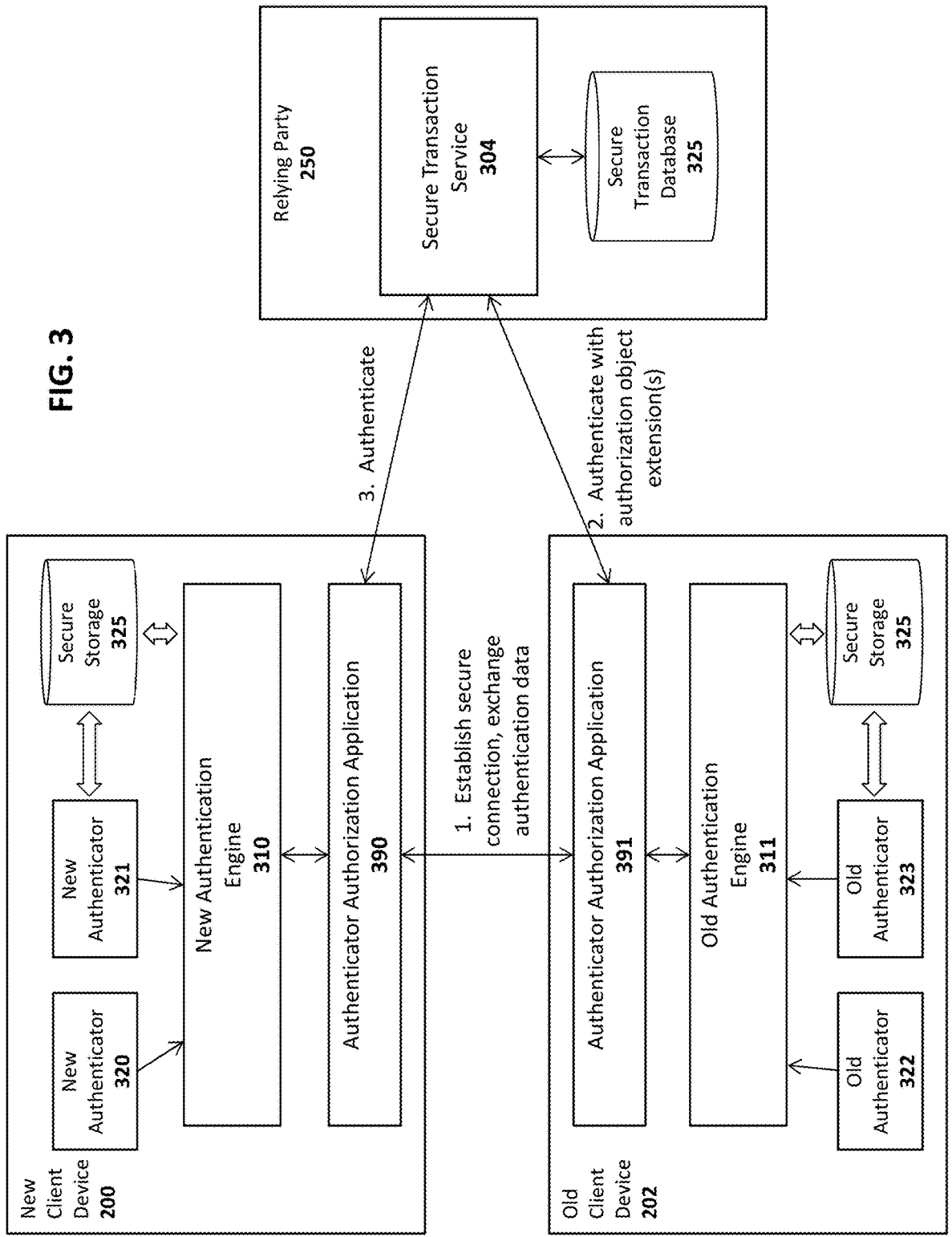
FIG. 3 illustrates additional details of one embodiment of a system for authorizing a new authenticator with a relying party.

As illustrated in FIG. 3, an authenticator authorization application 390, 391 may be executed on the new device 200 and old device 202, respectively, to establish the secure connection, exchange the authorization data, and verify the registrations with a secure transaction service 304 on each relying party 250. As used herein, an "old authenticator" (Aold) is an authenticator that a user has already registered with one or more relying parties. A "new authenticator" (Anew) is one which the user wishes to enable with all the relying party registrations currently being used with the old authenticator. Thus, the authentication engine 311 in the described embodiments has previously registered one or more old authentication devices 322-323 with a relying party. The goal of one embodiment is to transfer registrations from the old authentication engine 311 to the new authentication engine 310 to enable the new authenticators 320-321 with each relying party.

As illustrated the new client 200 and the old client 202 both include secure storage 325 and 326, respectively, for storing the registration data for each relying party (e.g., public/private key pairs used during authentication). In addition, the relying party 250 includes a secure transaction database 325 for securely storing registration data for each of the client devices 200-202 (e.g., user account data, authenticator identification data, public keys provided by for each authenticator, etc.).

In one embodiment, the user initiates the authenticator authorization application 390 on the new client device 200 and the authenticator authorization application 390 on the old client device 202 to establish the initial secure connection. The authenticator authorization applications 390-391 may be mobile device apps or applications specifically designed to perform the authorization operations described herein. In another embodiment, the authenticator authorization applications may be browser plugins executed in response to the user indicating that he/she wishes to perform authorization (e.g., via a web page with embedded Javascript or other applet or executable program code). Moreover, the authenticator authorization applications 390-391 may be software modules within a larger application such as an authentication application designed to manage authentications with relying parties. It should be noted, however, that the underlying principles of the invention are not limited to any particular implementation of the authenticator authorization applications 390-391.

In one embodiment, to approve the authorization operations on the old device 202, the user is verified by the authentication engine 311 on the old device (e.g., providing biometric input to a user authentication device 322-323). Similarly, in one embodiment, the user may be verified by the authentication engine 310 on the new client device 200. These two verification steps may provide authorization for the authenticator authorization applications 390-391 to perform the authorization process.

As mentioned, at the start of the authorization process, the authenticator authorization applications 390-391 establish a secure connection (e.g., using Bluetooth, WiFi, etc.). In one embodiment, the authenticator authorization application 390 on the new client device 200 receives a set of registration data for each relying party with which the old client device 202 is registered. The registration data may include usernames and a unique code associated with the user's account on each relying party. This unique code associating the user with each relying party is sometimes referred to herein as an "AppID." In some embodiments, where a relying party offers multiple online services, a user may have multiple AppIDs with a single relying party (one for each service offered by the relying party).

In one embodiment, the authenticator authorization application 390 on the new client 200 then generates a new public/private key pair for each relying party (e.g., one for each Username+AppID pair). The authenticator authorization application 390 on the new client 200 sends the authenticator authorization application 391 on the old client 202 the key pair (or just the public key) along with an authenticator ID identifying each new authenticator type (e.g., an Authenticator Attestation ID or "AAID"). The user may then be prompted to confirm the authorization of the new authenticator(s).

In one embodiment, the authenticator authorization application 391 generates a signed authorization object comprising a signature over the tuple of the AAID, the public key and the AppID for each relying party. In one embodiment, the signature is generated using the current authentication key associated with the relying party (e.g., a private key associated with the old authenticator for the relying party). The authenticator authorization application 391 then authenticates to each of the relying parties (e.g., via the old authentication engine 311 and one or more old authenticators 322-323) and includes the signed authorization object as an extension to one of the authentication messages.

Upon receiving the signed authentication message, the secure transaction service 304 may then verify the signature (e.g., using the public key corresponding to the private key used to generate the signature). Once verified, it may identify the user's account with the AppID and store the new AAID and the new public key for the new authenticator(s) within the secure transaction database 325. The user may subsequently authenticate using the new authenticators 320-321 without re-registering with each relying party 250.

Although illustrated in FIGS. 2-3 as a new user device, the underlying principles of the invention may also be implemented in a scenario where a user installs a new authenticator on an existing client device. For example, the user may upgrade or add an authenticator to an existing desktop, notebook or other type of client. In such a case, the communication of between the authenticator authorization applications 390-391 shown in FIG. 3 may occur internally (e.g., via internal function calls between software modules implemented on the client).

Figure 4:
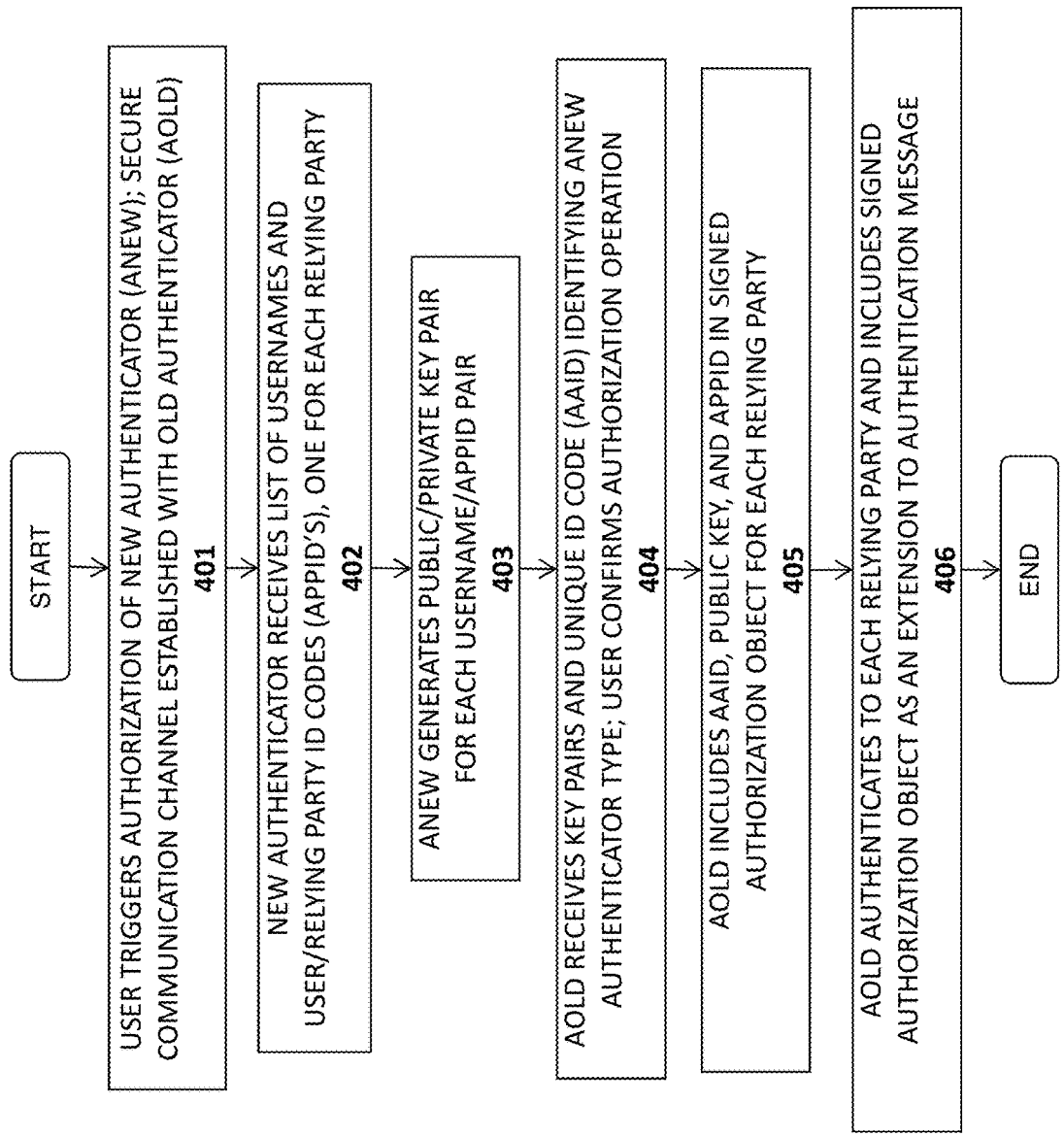
FIG. 4 illustrates one embodiment of a method for authorizing a new authenticator with a relying party.

One embodiment of a method for authorizing a new authenticator is illustrated in FIG. 4. The method may be implemented within the context of a system such as shown in FIG. 3, but is not limited to any particular system architecture.

At 401, the user triggers the authorization of one or more new authenticators (Anew) and establishes a secure communication channel with the old authenticator(s) (Aold). As mentioned, the secure communication channel may be established via a direct connection (e.g., via NFC, Bluetooth, etc.) or over a network (e.g., via an Ethernet or WiFi connection).

At 402, the new authenticator receives a username and user/relying party ID code for each relying party.

At 403, the new authenticator generates a public/private key pair for each username/AppID pair (e.g., for each unique relying party account).

At 404, the old authenticator receives the key pairs and an authenticator attestation ID code identifying the type of each new authenticator (e.g., an AAID). The user may then be asked to confirm the authorization operation.

At 405, the old authenticator generates a signed authorization object comprising a signature over the tuple of the AAID, the public key and the AppID for each relying party. As mentioned, the signature may be generated using the current authentication key associated with the relying party (e.g., a private key associated with the old authenticator for the relying party).

At 406, the old authenticator authenticates to each relying party and includes the signed authorization object as an extension to the authentication message. Once this operation is successfully completed, the user may then authenticate with each relying party using the new device and/or new authenticators.

Figure 5:
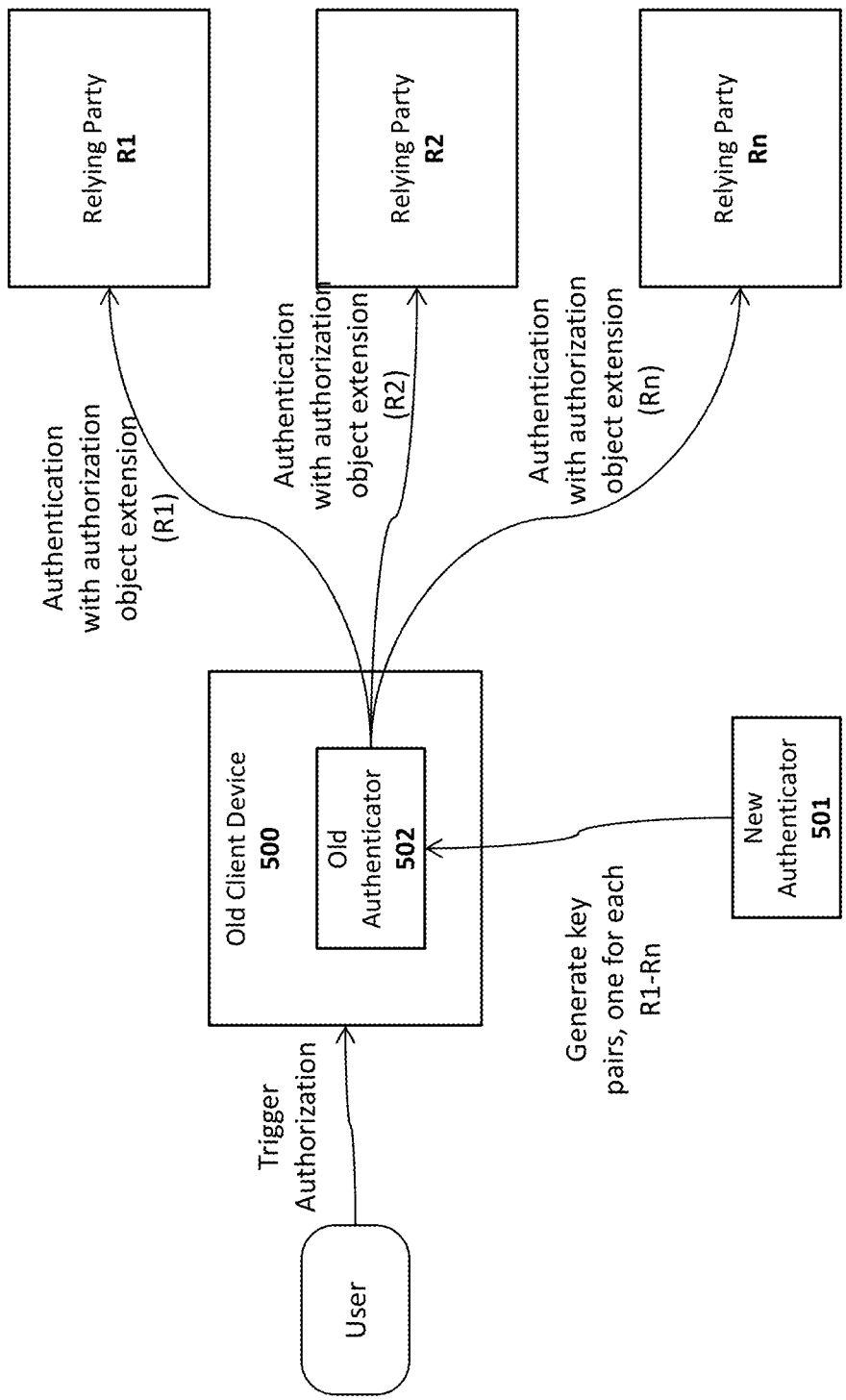
FIG. 5 illustrates a one embodiment in which an old authenticator authorizes a new authenticator with a plurality of relying parties.

FIG. 5 graphically illustrates a sequence of operations in which a new authenticator 501 is authorized for use with a plurality of relying parties R1-Rn using an old authenticator 502 on an old client 500. As mentioned, after receiving account data related to each of the relying parties, the new authenticator 501 generates new key pairs for each of the relying parties R1-Rn and provides the new key pairs to the old authenticator 502. The old authenticator 502 then generates a secure authorization object containing data related to the new authenticator 501 (e.g., the AAID) and a new key for each authenticator. It then performs authentication with each of the relying parties R1-Rn and includes the authentication object. Following verification (e.g., in which a signature on the authorization object is verified), the new authenticator 501 is automatically registered at each relying party R1-Rn.

In one embodiment, each relying party R1-Rn can choose whether or not to accept the new authenticator 501. For example, if the AAID indicates an authenticator type which is not sufficiently reliable or accurate, then the relying party may choose to deny the new registration. Thus, each relying party may maintain an authenticator database (i.e., Metadata) containing data for all known authenticators (e.g., identified by AAID). It may then query the database in response to receiving the authorization object from the old authenticator, determine the characteristics of the new authenticator, and determine whether those characteristics are acceptable.

Figure 6:
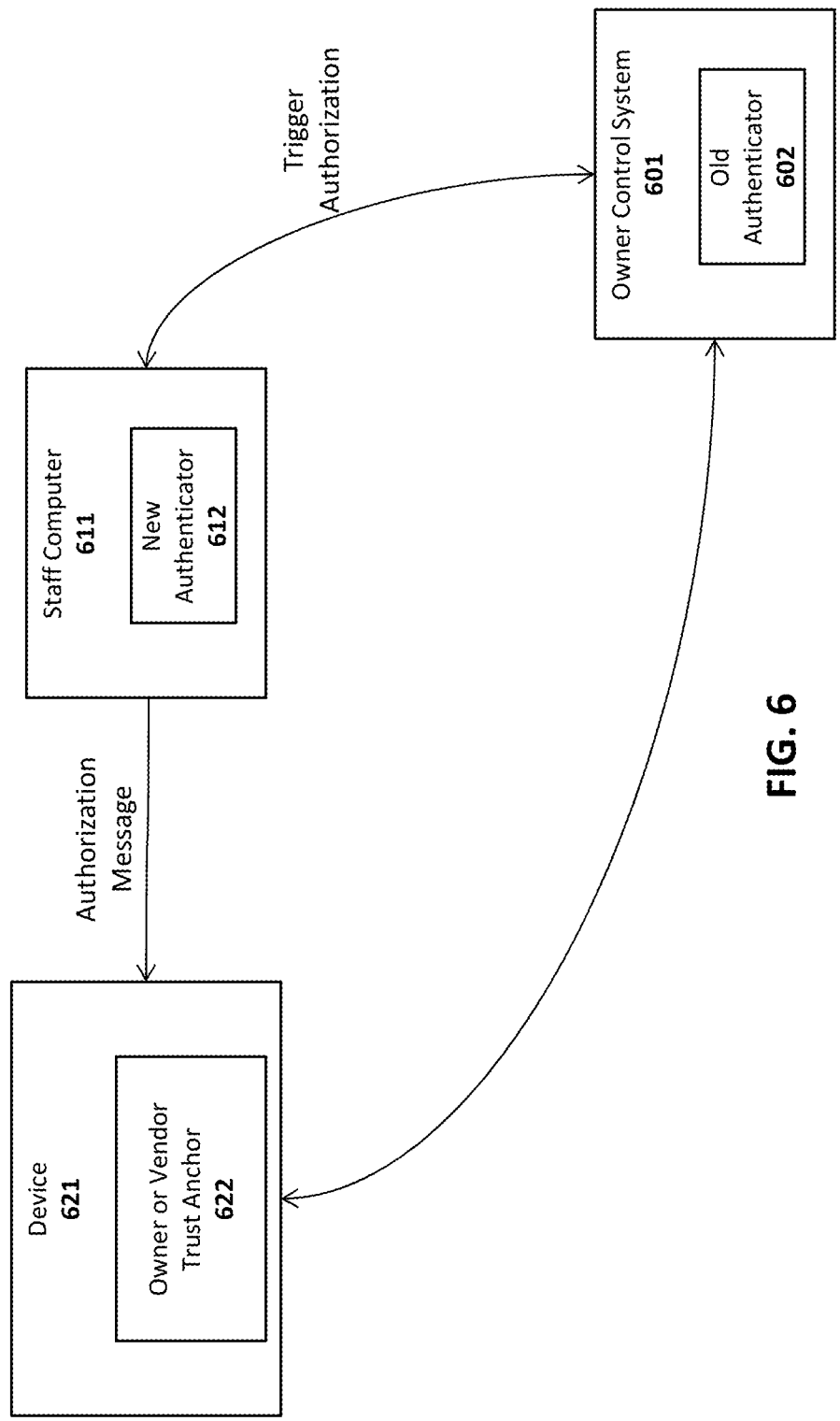
FIG. 6 illustrates one particular embodiment in which a control system controls authorization of new authenticators within an organization.

In one embodiment of the invention, an authenticator can specify a more generic "confirmation" method, where the authenticators may be indirectly controlled by the same entity, but still belong to different users. For example, in FIG. 6, the old authenticator 601 might be integrated into an Owner Control System 601 controlled by a single owner/operator (e.g., a corporation or government entity). The new authenticator 612 in this example may be authenticator belonging to a staff computer 611 and authorization of the new authenticator 612 may be trigger by the owner control system 601 using a known trusted authenticator 602. In this example, the interactions between the new authenticator 612 and old authenticator 602 may be as described above (e.g., the new authenticator generating new key pairs and the old authenticator sending an authorization object to a device 621 comprising an owner or vendor trust anchor 622 (e.g., for storing authenticator registration data as does the secure transaction database 325 of the secure transaction service 304 in FIG. 3).

Exemplary Authentication System Architectures

It should be noted that the term "relying party" is used herein to refer, not merely to the entity with which a user transaction is attempted (e.g., a Website or online service performing user transactions), but also to the secure transaction servers implemented on behalf of that entity which may perform the underlying authentication techniques described herein. The secure transaction servers may be owned and/or under the control of the relying party or may be under the control of a third party offering secure transaction services to the relying party as part of a business arrangement. These distinctions are indicated in FIGS. 7A-B discussed below which show that the "relying party" may include Websites 731 and other network services 751 as well as the secure transaction servers 732-733 for performing the authentication techniques on behalf of the websites and network services.

Figure 7A:
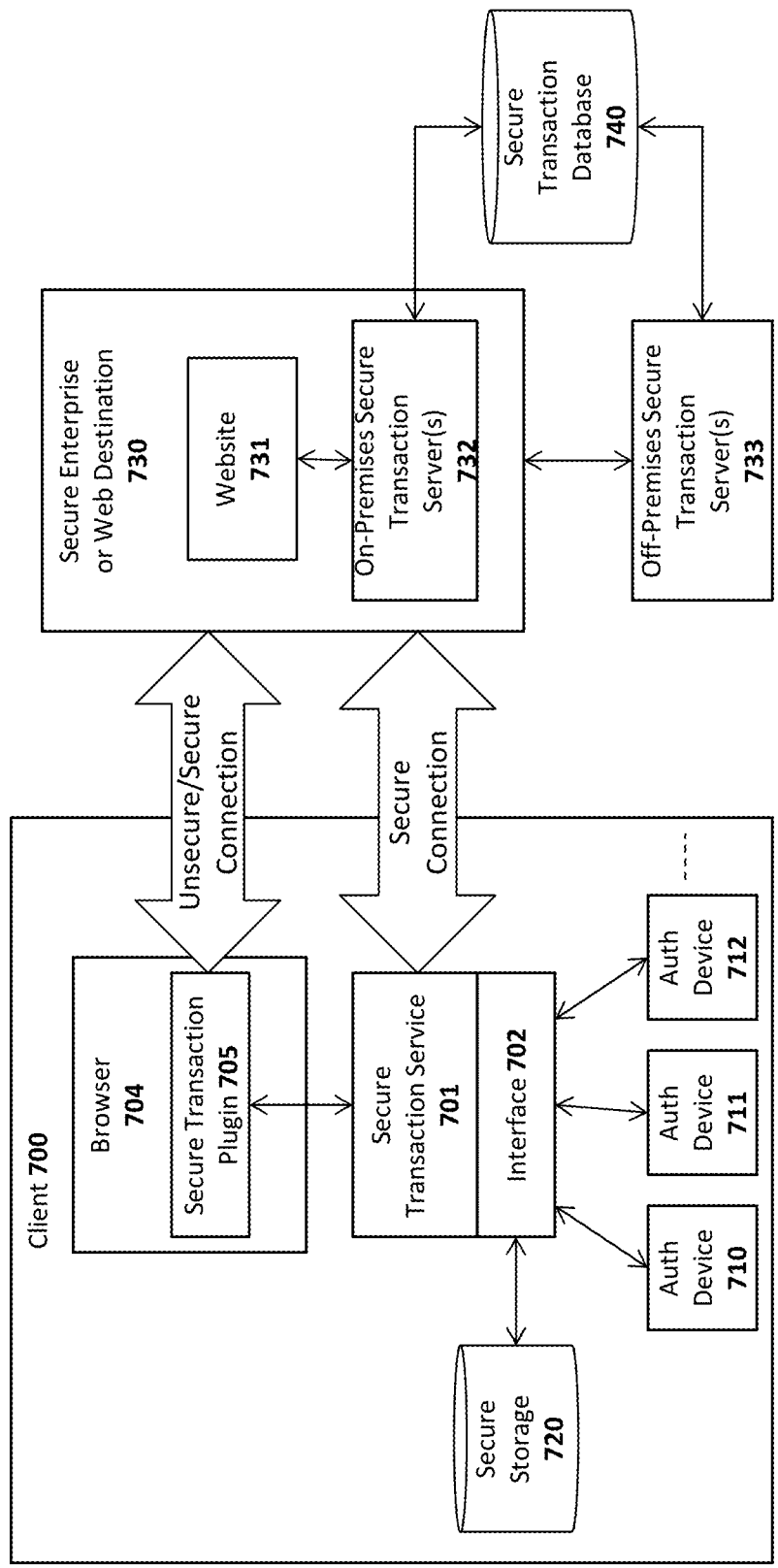
FIGS. 7A-B illustrate exemplary system architectures on which the embodiments of the invention may be implemented.
Figure 7B:
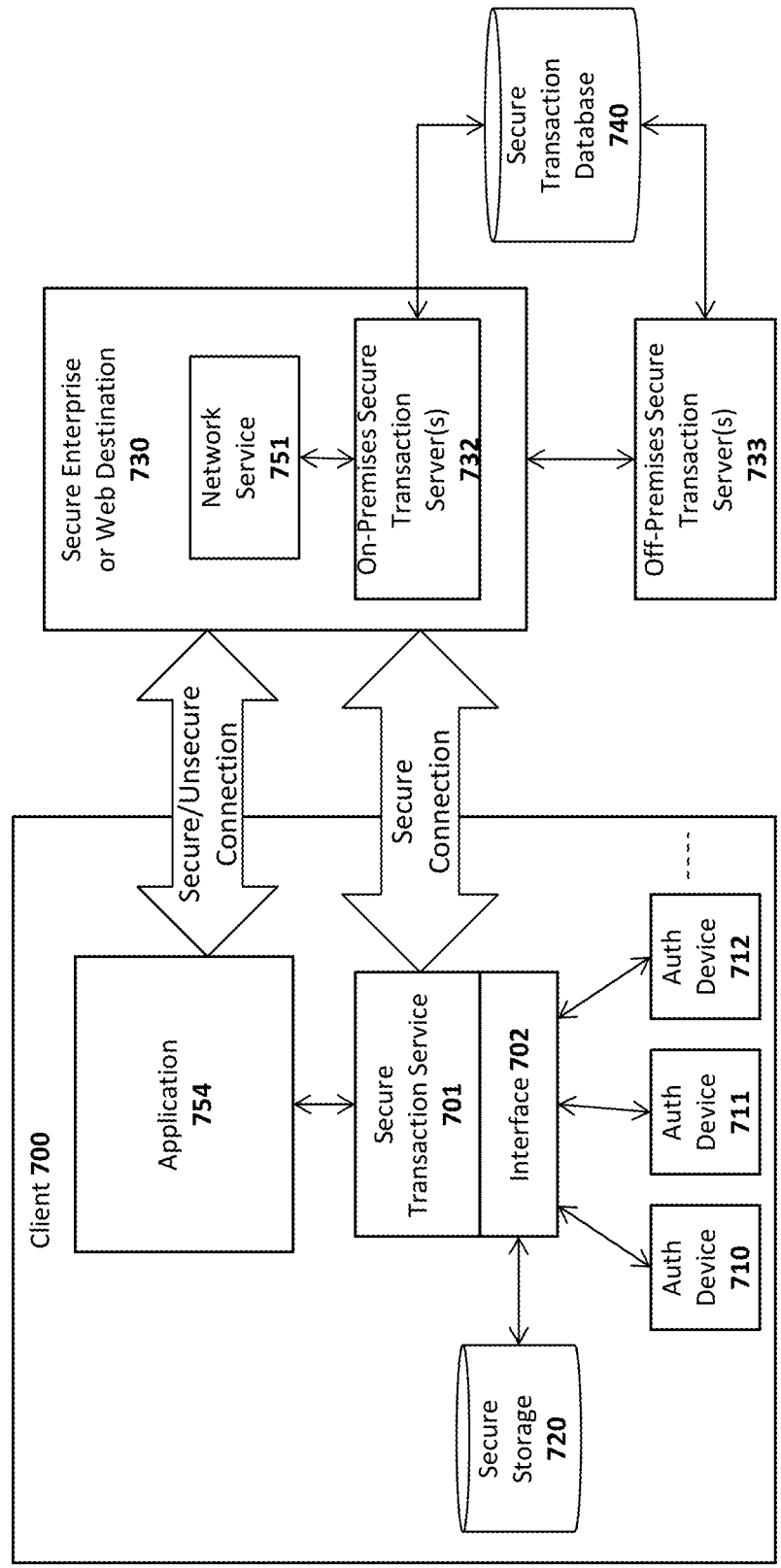

In particular, FIGS. 7A-B illustrate two embodiments of a system architecture comprising client-side and server-side components for authenticating a user. The embodiment shown in FIG. 7A uses a browser plugin-based architecture for communicating with a website while the embodiment shown in FIG. 7B does not require a browser. The various user confirmation and authorization techniques described herein may be employed on either of these system architectures. For example, the authentication engines 310, 311 and authenticator authorization applications 390, 391 may be implemented as part of the secure transaction service 701 including interface 702. It should be noted, however, that the embodiments described above may be implemented using logical arrangements of hardware and software other than those shown in FIGS. 7A-B.

Turning to FIG. 7A, the illustrated embodiment includes a client 700 equipped with one or more authentication devices 710-712 for enrolling and authenticating an end user. As mentioned above, the authentication devices 710-712 may include biometric devices such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and non-biometric devices such as a trusted platform modules (TPMs) and smartcards. A user may enroll to the biometric devices by providing biometric data (e.g., swiping a finger on the fingerprint device) which the secure transaction service 701 may store as biometric template data in secure storage 720 (via interface 702).

While the secure storage 720 is illustrated outside of the secure perimeter of the authentication device(s) 710-712, in one embodiment, each authentication device 710-712 may have its own integrated secure storage. Additionally, each authentication device 710-712 may cryptographically protect the biometric reference data records (e.g., wrapping them using a symmetric key to make the storage 720 secure).

The authentication devices 710-712 are communicatively coupled to the client through an interface 702 (e.g., an application programming interface or API) exposed by a secure transaction service 701. The secure transaction service 701 is a secure application for communicating with one or more secure transaction servers 732 over a network and for interfacing with a secure transaction plugin 705 executed within the context of a web browser 704. As illustrated, the Interface 702 may also provide secure access to a secure storage device 720 on the client 700 which stores information related to each of the authentication devices 710-712 such as a device identification code, user identification code, user enrollment data (e.g., scanned fingerprint or other biometric data), and keys used to perform the secure authentication techniques described herein. For example, as discussed in detail below, a unique key may be stored into each of the authentication devices during registration and used when communicating to servers 730 over a network such as the Internet.

Once the user has enrolled with an authentication device on the client 700, the secure transaction service 701 may register the authentication device with the secure transaction servers 732-733 over the network (e.g., using the registration techniques described herein) and subsequently authenticate with those servers using data exchanged during the registration process (e.g., encryption keys provisioned into the biometric devices). The authentication process may include any of the authentication techniques described herein (e.g., generating an assurance level on the client 700 based on explicit or non-intrusive authentication techniques and transmitting the results to the secure transaction servers 732-733).

As discussed below, certain types of network transactions are supported by the secure transaction plugin 705 such as HTTP or HTTPS transactions with websites 731 or other servers. In one embodiment, the secure transaction plugin is initiated in response to specific HTML tags inserted into the HTML code of a web page by the web server 731 within the secure enterprise or Web destination 730 (sometimes simply referred to below as "server 730"). In response to detecting such a tag, the secure transaction plugin 705 may forward transactions to the secure transaction service 701 for processing. In addition, for certain types of transactions (e.g., such as secure key exchange) the secure transaction service 701 may open a direct communication channel with the on-premises transaction server 732 (i.e., co-located with the website) or with an off-premises transaction server 733.

The secure transaction servers 732-733 are coupled to a secure transaction database 740 for storing user data, authentication device data, keys and other secure information needed to support the secure authentication transactions described below. It should be noted, however, that the underlying principles of the invention do not require the separation of logical components within the secure enterprise or web destination 730 shown in FIG. 7A. For example, the website 731 and the secure transaction servers 732-733 may be implemented within a single physical server or separate physical servers. Moreover, the website 731 and transaction servers 732-733 may be implemented within an integrated software module executed on one or more servers for performing the functions described below.

As mentioned above, the underlying principles of the invention are not limited to a browser-based architecture shown in FIG. 7A. FIG. 7B illustrates an alternate implementation in which a stand-alone application 754 utilizes the functionality provided by the secure transaction service 701 to authenticate a user over a network. In one embodiment, the application 754 is designed to establish communication sessions with one or more network services 751 which rely on the secure transaction servers 732-733 for performing the user/client authentication techniques described in detail below.

In either of the embodiments shown in FIGS. 7A-B, the secure transaction servers 732-733 may generate the keys which are then securely transmitted to the secure transaction service 701 and stored into the authentication devices within the secure storage 720. Additionally, the secure transaction servers 732-733 manage the secure transaction database 740 on the server side.

Canonical Authentication System

Even after many years of IT innovations, passwords are still the most widely used authentication method. However, neither users nor service providers handle passwords appropriately, making this form of authentication inherently insecure. On the other hand, more than 1 billion Trusted Platform Modules (TPMs) and more than 150 million secure elements have been shipped; microphones and cameras are integrated in most smart phones and fingerprint sensors and Trusted Execution Environments (TEEs) are on the rise. There are better ways for authentication than passwords or One-Time-Passwords (OTPs).

In 2007, the average user had 25 accounts, used 6.5 passwords and performed logins 8 times a day. Today, things are much worse. An analysis of 6 million accounts showed that 10,000 common passwords would have access to 30% of the accounts (Burnett, 2011). Even when looking at passwords for banking accounts, it can be found that 73% of users shared their online banking password with at least one non-financial site (Trusteer, Inc., 2010), which means that when the non-banking site gets hacked, the banking account is threatened.

Several proposals to replace passwords have been made, including silos of authentication, heterogeneous authentication, and trustworthy client environments.

Silos of Authentication: Current alternative technologies require their respective proprietary server technology. The current authentication architecture therefore consists of silos comprising the authentication method, the related client implementation and the related server technology.

Innovative authentication methods proposed by the research community are not widely deployed, as in addition to the client implementation the complete server software needs to be implemented and deployed. Instead of having a competition for better user verification methods, authentication companies are faced with a battle for the best server technology.

Heterogeneous Authentication: Users may authenticate using standalone PCs, tablets or smart phones. The employer may control some devices while others may be controlled by the user (David A. Willis, Gartner, 2013). Increased adoption of mobile devices and the BYOD trend lead to an increasingly heterogeneous authentication landscape. The one authentication method satisfying all needs seems to be out of reach.

Trustworthy Client Environment: Client side malware may capture and disclose passwords or OTPs. It may alter transactions to be confirmed after being displayed or it can misuse authenticated communication channels to perform unintended actions. Authentication—even with user name and password—needs at least one trustworthy component at the client side.

Today the alternatives to password or OTP-based authentication do not scale. This is primarily due to sub-optimal combinations of authentication building blocks. To address this limitation, one embodiment of the invention identifies canonical building blocks which can be implemented in various different ways and still lead to a well-known and functional authentication system—suitable for integration within existing platform functionality.

Figure 8:
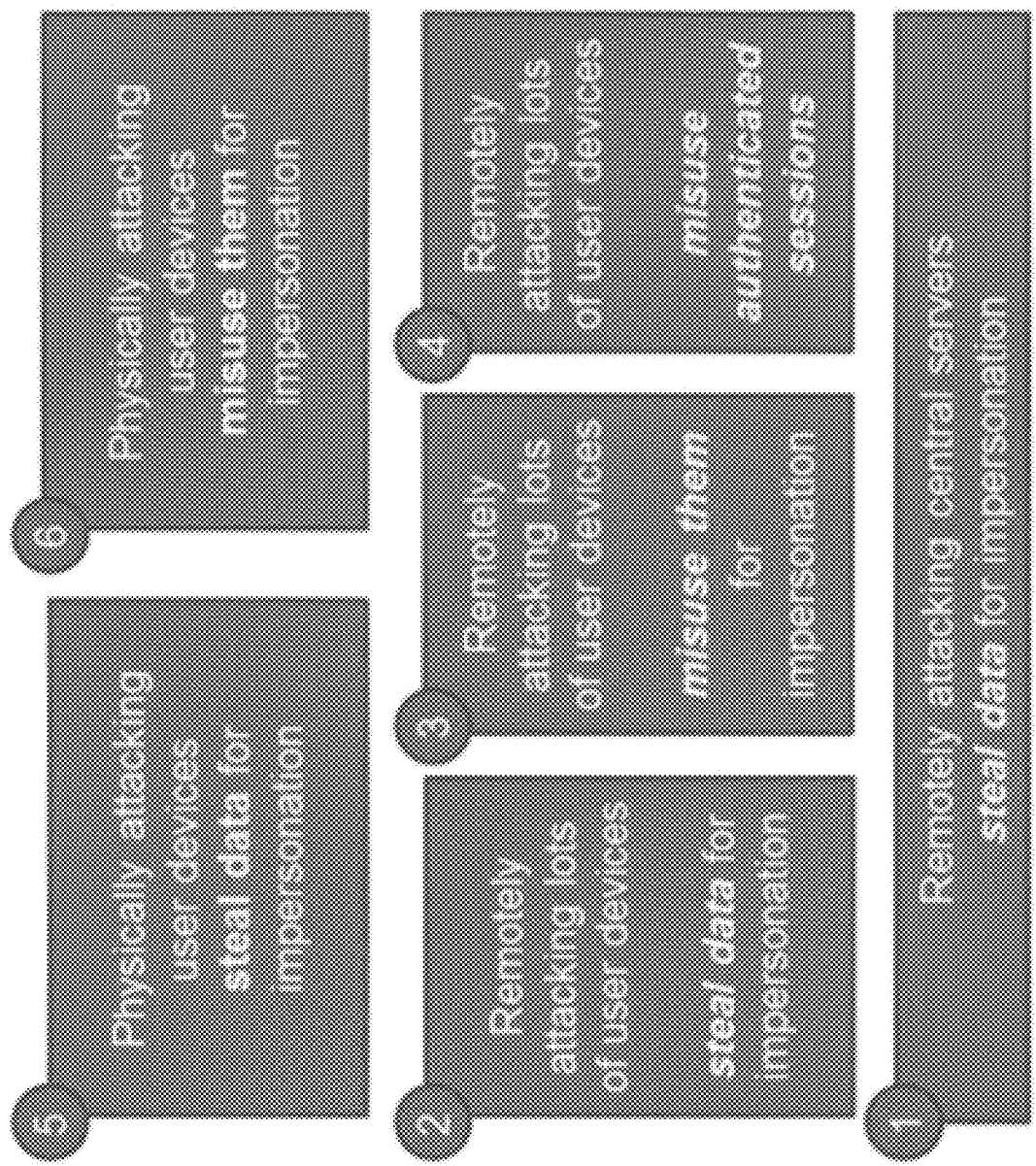
FIGS. 8-9 illustrate exemplary embodiments of a system for executing embodiments of the invention.

The recent large-scale attacks on passwords were all focused on the server side. Such attacks are independent from the effort and from the security measures users take. In the attack classification illustrated in FIG. 8, these attacks are labelled with (1). Introducing protection measures against this single threat class will very likely shift the attacker focus to attacks to steal and misuse authentication credentials from user devices (2-4), including stealing and misusing data by impersonating a user (2-3) and misusing authenticated sessions (4). Items (5) and (6) include physical theft of the user's device and stealing data (5) and/or misusing the device for impersonating the user. However, it is very likely that attacks will focus on some kind of scalable attack, i.e. an attack with some fixed cost but the potential of a large number of sellable items. Physically attacking individual devices is possible, but less scalable.

In one embodiment of the invention, instead of storing hashed passwords having relatively low entropy, asymmetric public keys may be stored on the server and the related private key may be stored in the device. Computing the private key from a given public key is very resource consuming as it requires factoring (RSA) or solving the discrete logarithm problem (DSA/ECDSA). The private key at least should be protected against malware attacks. In one embodiment, this is accomplished using Trusted Execution Environments (TEEs) or Secure Elements (SEs) on the client device.

Given that most client devices are always online, instead of extracting the private key, malware may simply attempt to misuse it. In order to protect against such attacks, (a) the access to use the key should be limited to eligible apps and (b) some kind of user interaction which cannot be emulated by malware is required. TrustedUI (GlobalPlatform, 2013) can be used to implement such kind of user interaction. Note that Secure Elements typically do not have a user interface and hence do not provide this kind of protection.

When implementing the protection measures as described above, the authentication is secure. However, attackers may then focus on attacking the App which controls the authenticated session. Existing PC infection rates (APWG, 2014) demonstrate the feasibility of these types of attacks. When having an Authenticator with higher protection than current Mobile Apps, this Authenticator can be used for displaying and retrieving a user's confirmation for a particular transaction. In such a case, infected Apps could lead to (a) malicious transactions being displayed which would be rejected by the user or (b) signed transactions which would be modified after signing, which would be detected by the server. This is the second use-case for the TrustedUI implementation.

In one embodiment, Secure Elements are used to protect against physical key extraction. The underlying chip hardware for SE typically implements state-of-the-art protection measures against physical attacks. (Dr. Sergei Skorobogatov, University of Cambridge, 2011). In addition, in one embodiment, TrustedUI or other dedicated user verification hardware such as Fingerprint sensors may be used to meet the need for physical user interaction.

If an attacker gains physical access to a device, the attacker could try to misuse the key instead of extracting it. In order to protect against such attacks, an effective user verification method is used which has a low false acceptance rate, good anti-spoofing methods and anti-hammering mechanisms (i.e., to effectively limit the number of potential brute-force attempts).

Given that scalable attacks are predominant, one embodiment focuses on counter-measures for physical attacks after implementing the counter-measures for the scalable attacks.

Having good protection for attestation on the client side is beneficial, but in reality the remote party (i.e., the server side) is also interested in understanding the security being used. Consequently, one embodiment of the invention "attests" the client-side security properties to the remote server. In order to be effective, these attestation techniques need to be at least as strong as the client side protection.

For practical solutions, the privacy of attestation is also important. Methods like direct anonymous attestation (DAA) are a good choice. Unfortunately, the original DAA method was too slow when implemented on standard hardware. The improved pairing-based DAA scheme is much faster. It has been adopted by TCG for TPMv2 (Liqun Chen, HP Laboratories and Jiangtao Li, Intel Corporation, 2013).

A typical signature consist of a to-be-signed object controlled by the App and a signature computed using the private key. So to the verifier, any data in the to-be-signed object is only as trustworthy as the App controlling the contents of the to-be-signed object.

Figure 9:
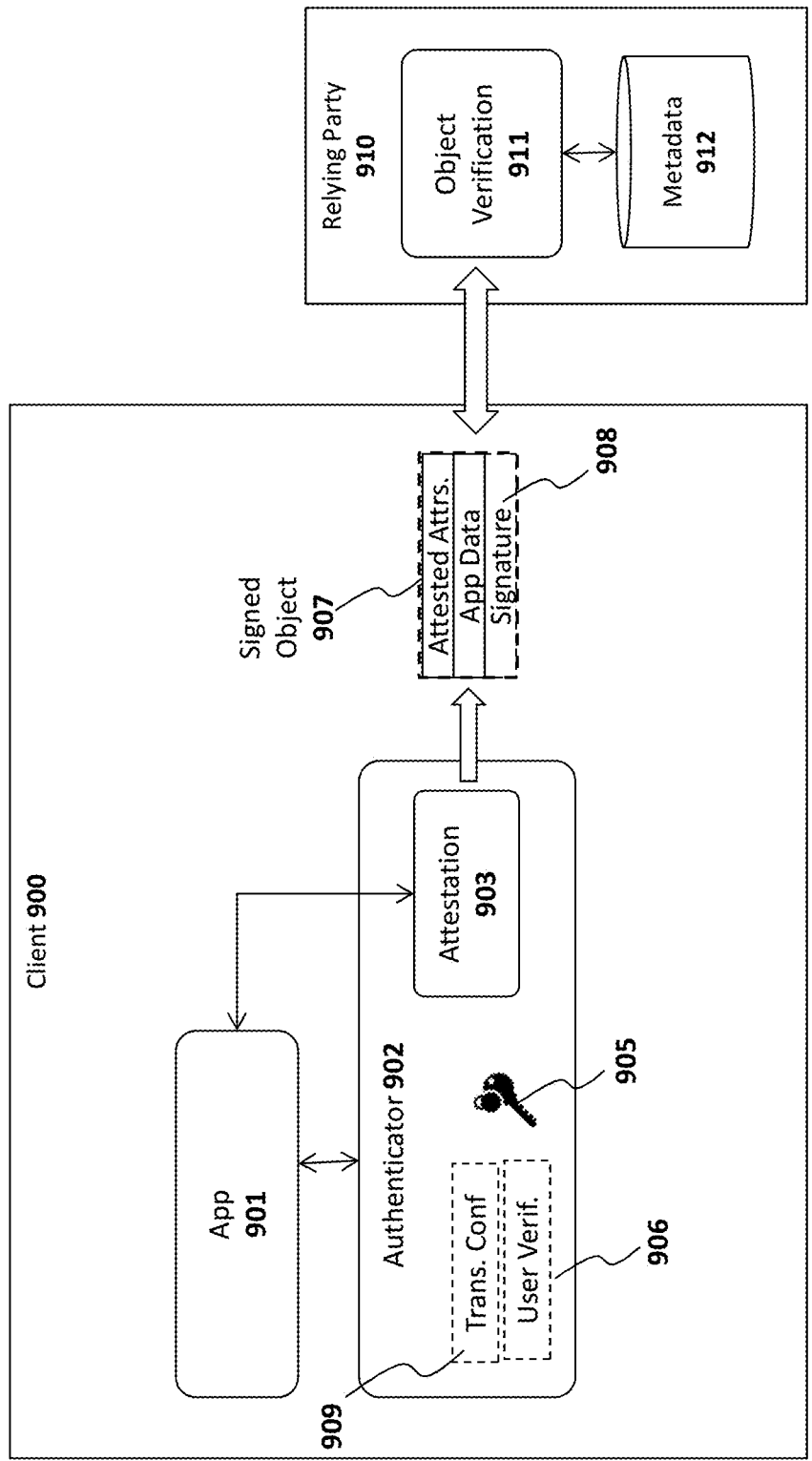

As illustrated in FIG. 9, in one embodiment, the private key 905 is protected by an attested authenticator 902, which is more trustworthy than the App 901. The authenticator may include a transaction confirmation component 909 (e.g., to allow the user to confirm the text of a confirmation as described herein) and a user verification component 906 (e.g., to allow for biometric or other type of user authentication). In one embodiment, an attestation module 903 uses the private key 905 to generate a signature 908 over an object which includes authenticator attributes and application data to generate a signed object 907. As illustrated, in one embodiment, the object to be signed comprises a concatenation of attested attributes of the authenticator and application data. The attested attributes used in the signed object may include, for example, (a) the Transaction Text as confirmed by the user, (b) the actual personal identification number (PIN) length as opposed to the minimal PIN length, or (c) the firmware version of the authenticator implementation.

The illustrated implementation is more secure than existing systems because exclusive control of the key 905 is granted to the Authenticator 902 (instead of being granted to the app 901). In one embodiment, the to-be-signed object, exclusively controlled by the Authenticator 902 has a "slot" reserved for data controlled by the App 901 (identified as "App Data" in FIG. 9). As a result, in this embodiment, the App 901 is not permitted to arbitrarily create any form of to-be-signed objects. Each signed object will look similar, so the object verification module 911 of the relying party 910 can trust that the attested attributes were contributed by the trusted Authenticator 902. In one embodiment, the object verification module 911 uses the public key and metadata 912 associated with the authenticator 902 (e.g., the authenticator type, model and/or version) to verify the signature 908.

In one embodiment, a set of canonical building blocks are defined that can be used to assemble an authentication system such as shown in FIG. 9. Once particular set of building blocks include:

1. Hardware and/or software to generate cryptographic keys and attest to such keys to a remote party.
2. Hardware and/or software to generate attested signatures.
3. Hardware and/or software to verify a user.
4. Hardware and/or software bind keys to an entity (e.g., restrict "use" access of such keys to a defined set of software applications).

Not all building blocks need to be present. Authentication systems can be built even using only building block #1. The other building blocks can be added as needed. The overall security and usability characteristic depends on the specific implementations of the building blocks used.

Figure 10:
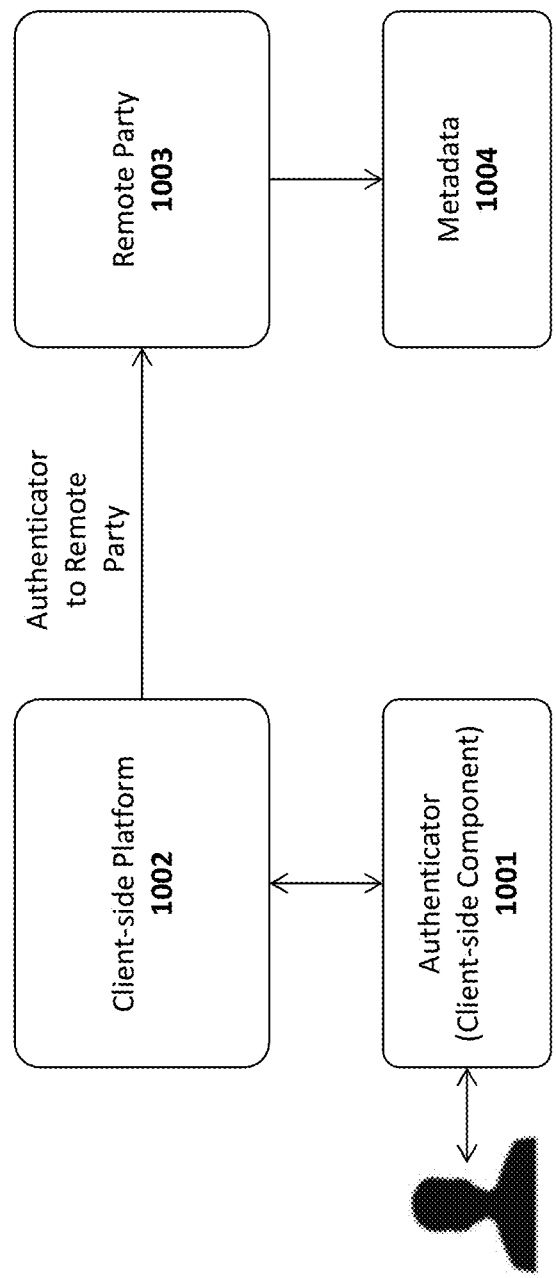
FIG. 10 illustrates one embodiment in which metadata is used by a relying party to authenticate a client.

FIG. 10 illustrates one particular embodiment which includes a client-side authenticator 1001, a client side platform 1002 (e.g., a mobile device using Android OS or Windows OS), a remote party 1003, and metadata 6304. One embodiment of the authenticator 1001 generates the authentication keys and supports attestation of the authentication keys to a remote party 1003. Various attestation methods are supported including those described above. See also FIDO Basic Attestation (Rolf Lindemann, Davit Baghdsaryan and Eric Tiffany, 2014), DAA (Ernie Brickell, Intel Corporation;

Jan Camenisch, IBM Research; Liqun Chen, HP Laboratories, 2004), ECDAA (Ernie Brickell, Intel Corporation; Jiangtao Li, Intel Labs).

The remote party has access to metadata 1004 which it uses to verify the attestation object. The authenticator may be implemented as a physically separate entity (e.g. crypto SD-card, USB crypto token, etc.), but could also be physically embedded into the client-side platform (e.g. in an embedded secure element, TPM, TEE).

The authenticator 1001 may optionally have the capability of verifying a user. However, the underlying principles of the invention are not limited to any specific user verification method. However, the remote party can learn the user verification method by looking into the attestation object and the metadata 1004.

The embodiments of the invention do not rely on any specific wire-protocol or protocol message encoding. The only requirement is that the assertions generated by the authenticator 1001 such as the attestation object and the attested signature object need to be "understood" by the remote party 1003. The concrete wire format may depend on the specific platform.

This section is intended to give a first impression on how these canonical building blocks could be used.

In current authentication frameworks such as the FIDO UAF specification, the client is quite "heavy". With the approaches described herein, the client can easily be split into two parts: (1) an application software development kit (AppSDK) performing all of the protocol related tasks (which are too specific to be implemented in a platform) and (2) a platform functionality that implements the security related tasks such as binding a key to a set of software applications. With this approach, a client such as the FIDO client being a separate entity disappears.

The following is an example of a FIDO UAF being implemented on an Android platform extended to support these canonical building blocks.

AttestationType: No need to set it explicitly. All Android Apps will know that they can only use the Android-Attestation method (e.g. through a FIDO AppSDK).

AAID: A unique identifier for each class of authenticator (e.g., an "authenticator attestation ID" as described above). Essentially the AAID is reduced to some Android KeyStore Implementation using a user verification method specified when creating the key. The Key Store will lookup the AAID based on the user verification method (and the static knowledge about its own KeyStore crypto implementation).

Username: One embodiment allows the mobile app (through the AppSDK) set the KeyAlias to the concatenation of the keyID and the username if present.

AppID: Is addressed using the appID binding (if supported).

In summary, one embodiment of the invention includes a system for authenticating a client-side authenticator to a remote party, that includes:

(1) a client-side authenticator comprising (i) circuitry and/or program code to generate cryptographic key pairs ("authentication keys") and (ii) circuitry and/or program code attesting the identity of the key generating entity to a remote party.

(2) data regarding the authenticator which at least contains sufficient information to verify the attestation made available to the remote party. This data is referred to as "metadata" above.

(3) circuitry and/or program code to use the generated authentication private key to perform a cryptographic operation to prove possession of the private authentication key to the remote party.

Additionally, the authenticator might be known to restrict the use of the authentication private key to perform cryptographic signature operations on well-defined to-be-signed objects only. This well-define to-be-signed object contains data fields controlled by the authenticator and one or more data fields which are clearly marked to contain arbitrary data (not controlled by the authenticator). The authenticator might indicate such objects by starting them with a magic number MN followed by the well-defined data structure. This signature operation is called "attested signing" herein. This magic number MN can be chosen freely, but it needs to be fixed and well known. One example on how to set this magic number is "ATTESTED_SIGNATURE".

In addition, in one embodiment, the client side authenticator has the ability to verify a user using an arbitrary user verification method and in which the properties of this user verification method are static (i.e. they do not change over time for any authenticator) and described in the Metadata. The user verification method may be arbitrarily complex and even consist of multiple biometric and non-biometric modalities (e.g., PIN or fingerprint, speaker recognition in combination with PIN/ Fingerprint, facial recognition, etc.).

Moreover, in one embodiment of the system, (a) the key may only be used for attested signing and (b) the authenticator has the ability to verify a user using a user verification method in which the properties of the user verification method are described in the data fields controlled by authenticator (e.g., in the attested signature). Note the user verification method might be arbitrarily complex and even consist of multiple biometric and non-biometric modalities (e.g., PIN or fingerprint, speaker recognition in combination with PIN/ Fingerprint, facial recognition, etc.).

In one embodiment, access to the private authentication key 905 is limited to a specified set of applications. In addition, the set may be restricted to applications considered equivalent by the platform (e.g. operating system). As an example, access to the authentication key could be restricted by the operating system to the applications signed using the same package signing key as the application which triggered the key generation. Moreover, the set of applications may include applications considered equivalent by the application developer through a list of application facets which are considered equivalent.

In yet another embodiment, the authenticator 902 supports securely displaying a transaction text and asking the user for confirming (or rejecting) this particular transaction. The transaction text may be cryptographically bound to the attested signature (i.e. a cryptographic hash of the transaction text will be included in one of the fields controlled by the authenticator).

One embodiment of the invention implements the security related tasks of the FIDO UAF/U2F stack (which do not belong to the authenticator) on a platform (e.g. the OS or the web browser) and leaves the implementation of the other protocol handling tasks to the app and thus removes the need to implement specific protocols in the platform (i.e., removing the need of having a FIDO Client).

System and Method for Bootstrapping a User Binding

Today, any user may enroll to a new FIDO authenticator or device having a key store that is being shipped/purchased, including both the legitimate owner and a potential attacker. In general, FIDO authenticators and devices having a key store are bound to a user (i.e., the user enrolls to the authenticator/device) once the user first receives physical access to the device. This is in contrast to smartcards (e.g. EMV banking cards and SIM cards) which are personalized for a user before delivery. This personalization typically includes a user specific personal identification number (PIN).

Sometimes the user has already been identified/vetted before a FIDO authenticator (or device having a key store) is shipped. It would be desirable to leverage the identity vetting performed at a shop (or some other place) and to bind the authenticator to a user before the authenticator actually reaches the user. The embodiments of the invention provide techniques to address this desire.

In one embodiment, it is assumed that some trusted identification system already has access to (a) the user verification reference data (e.g. biometric templates, or a PIN), or (b) to some data from which the user verification reference data can be derived, or (c) to some data which is tied to the user through some other system. For example a copy of the user's facial image taken from a photo-ID card verified in some branch office, or a photo of the user's fingerprint taken from a governmental identification database or through a SIM card tied to the authenticator and bound to the account owner by the mobile network operator (MNO). Approach (a) works for "what-you-know" factors; approach (b) for "what-you-are" factors; and approach (c) works for "what-you-have" factors, as described below.

One embodiment includes some form of secure communication channel to the authenticator allowing a single and initial injection of user verification reference data into the authenticator (i.e., in a state in which there is no other user verification reference data being enrolled by someone). The secure communication channel could be a Trusted Service Manager (TSM) securely talking to a SIM-card based authenticator, or the TSM securely talking to the Trusted Execution Environment (TEE)-based authenticator, or it could be implemented by some secret or private key used by the authenticator for decrypting such data. In any case, one embodiment of the authenticator may include a pre-processing engine, which converts the initial reference data to the form required by the authenticator. Note that this pre-processing may also be done by the trusted system.

Figure 11:
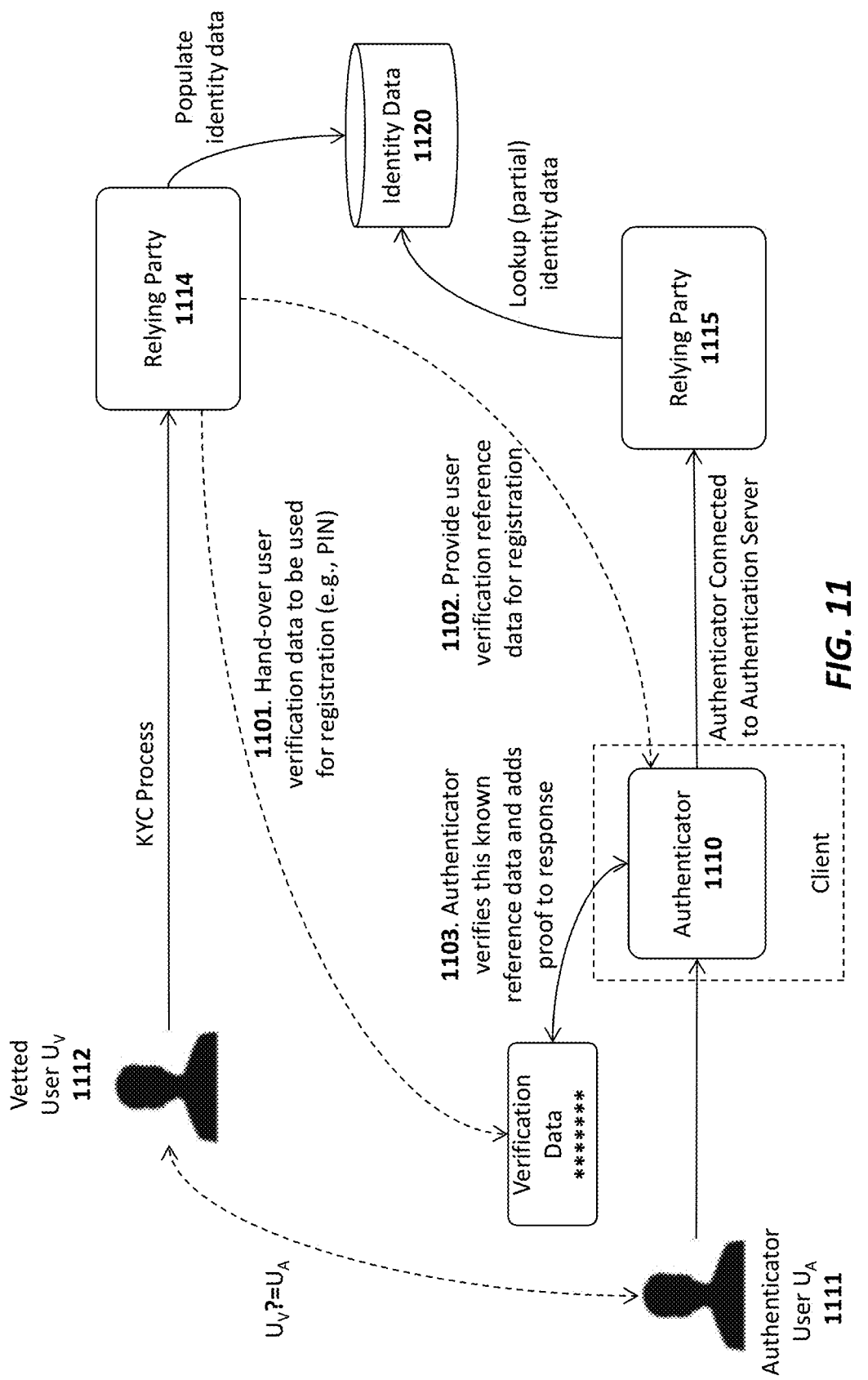
FIG. 11 illustrates one embodiment of an architecture for bootstrapping user binding to an authenticator using data such as a code securely provided to the user.

FIG. 11 illustrates one embodiment of an implementation in which a vetted user Uv initially provides verification of his/her identity to a first relying party 1104. For example, the relying party 1104 may be a brick and mortar store where the user purchases a new mobile device. During this process, a PIN or other identification code may be generated by the relying party 1104 (e.g., generated randomly or selected by the vetted user Uv). This identification code is one form of initial user verification reference data (IUVRD) described herein which is used to verify the identity of the user when registering the user. In addition, the relying party 1114 may store identification data associated with the user and/or client device within an identity database 1120.

Subsequently, at 1101, the user verification data is securely provided to the user 1112. For example, the identification code may be mailed to the user in a tamper resistant or tamper evident (e.g. sealed) envelope. Alternatively, the relying party 1114 may provide the identification code to the user 1114 at the store where the user purchases the device. At 1102, the IUVRD is provided over a secure communication channel from the relying party 1114 to the authenticator 1110 (e.g., at the store and/or encrypted using a key or key pair known by the relying party 1114 and authenticator 1110). In one embodiment, the communication may be encrypted to the authenticator model/instance to prevent misuse. At 1103 the authenticator user $U_A$ 1111 is prompted to enter the verification data when registering the authenticator 1110 for the first time with a relying party 1115. In one embodiment, the authenticator 1110 comprises a FIDO authenticator and the relying party 1115 comprises a FIDO server. If the user 1111 enters the correct verification code, then the authenticator 1110 may include this as proof of the identity of the user 1111 in the transactions with the relying party 1115 (e.g., when registering the authenticator 1110 with the relying party). In addition, in one embodiment, the relying party 1115 may perform a lookup in the identity database to confirm the identity of the authenticator 1110 and/or authenticator user $U_A$ 1111.

Figure 12:
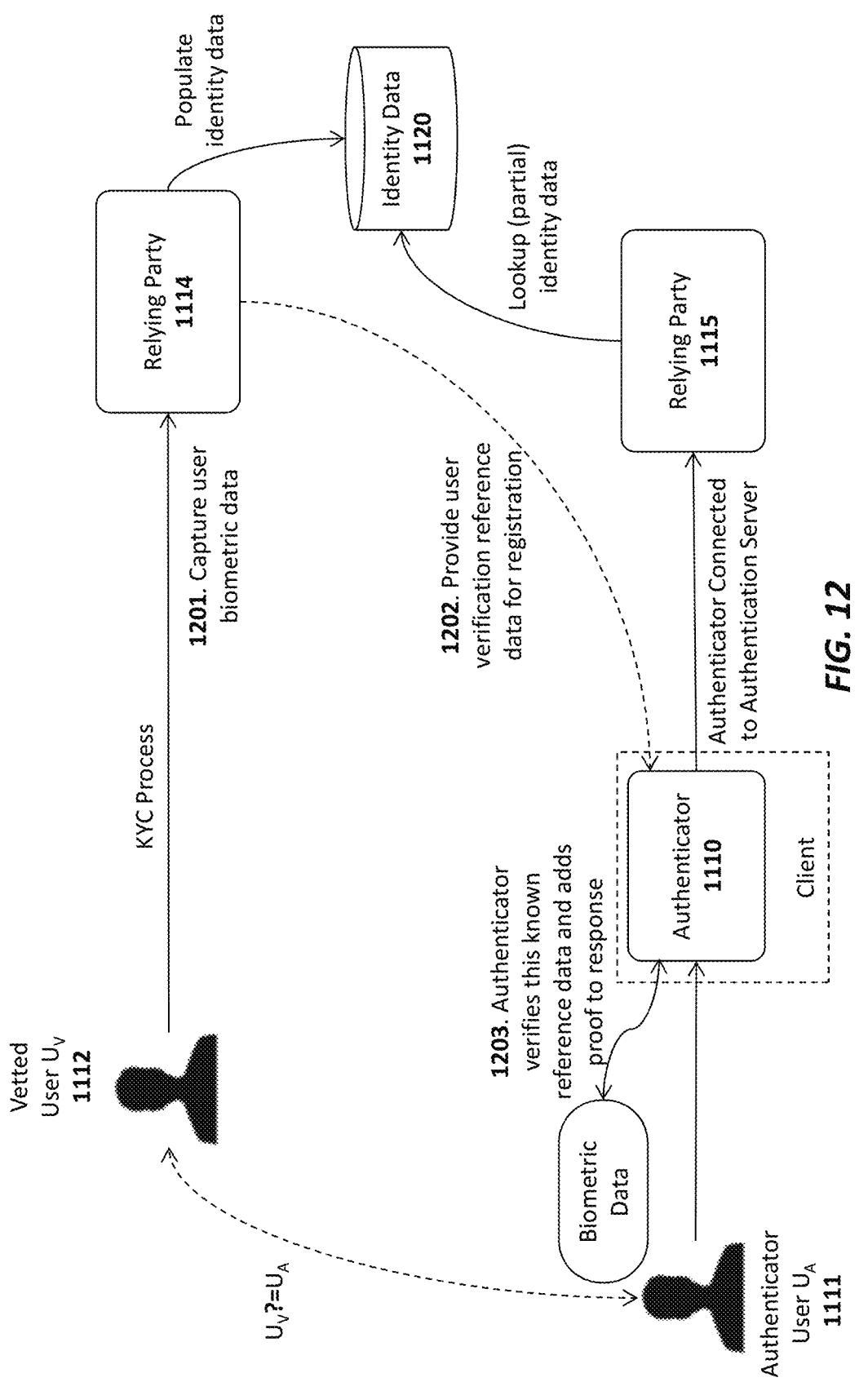
FIG. 12 illustrates one embodiment of an architecture for bootstrapping user binding to an authenticator using biometric data.

FIG. 12 illustrates another embodiment in which biometric data is initially captured as IUVRD during the KYC process between the vetted user Uv 1112 and the relying party 1114. For example, at 1201 an image of the user's face may be captured and facial recognition template may be generated, the user's fingerprint may be captured, and/or or voice recognition may be performed. At 1202, the IUVRD is provided to the authenticator 1110 over a secure communication channel. This may be done, for example, at the store and/or may be encrypted and transmitted over a network to the authenticator 1110 (e.g., using a key or key pair known by the relying party 1114 and authenticator 1110). At 1203, the authenticator user $U_A$ 1111 is prompted to collect biometric data such as by analyzing a picture of the user's face, collecting the user's fingerprint, and/or recording the user's voice. The authenticator 1110 compares the collected data against the IUVRD biometric data and, if a match is detected, proof of the user's identify is provided during the registration with the relying party 1115. In addition, the relying party 1115 may perform a lookup in the identity database 1120 initially populated by the relying party 1114 to further verify the identity of the user 1111.

Figure 13:
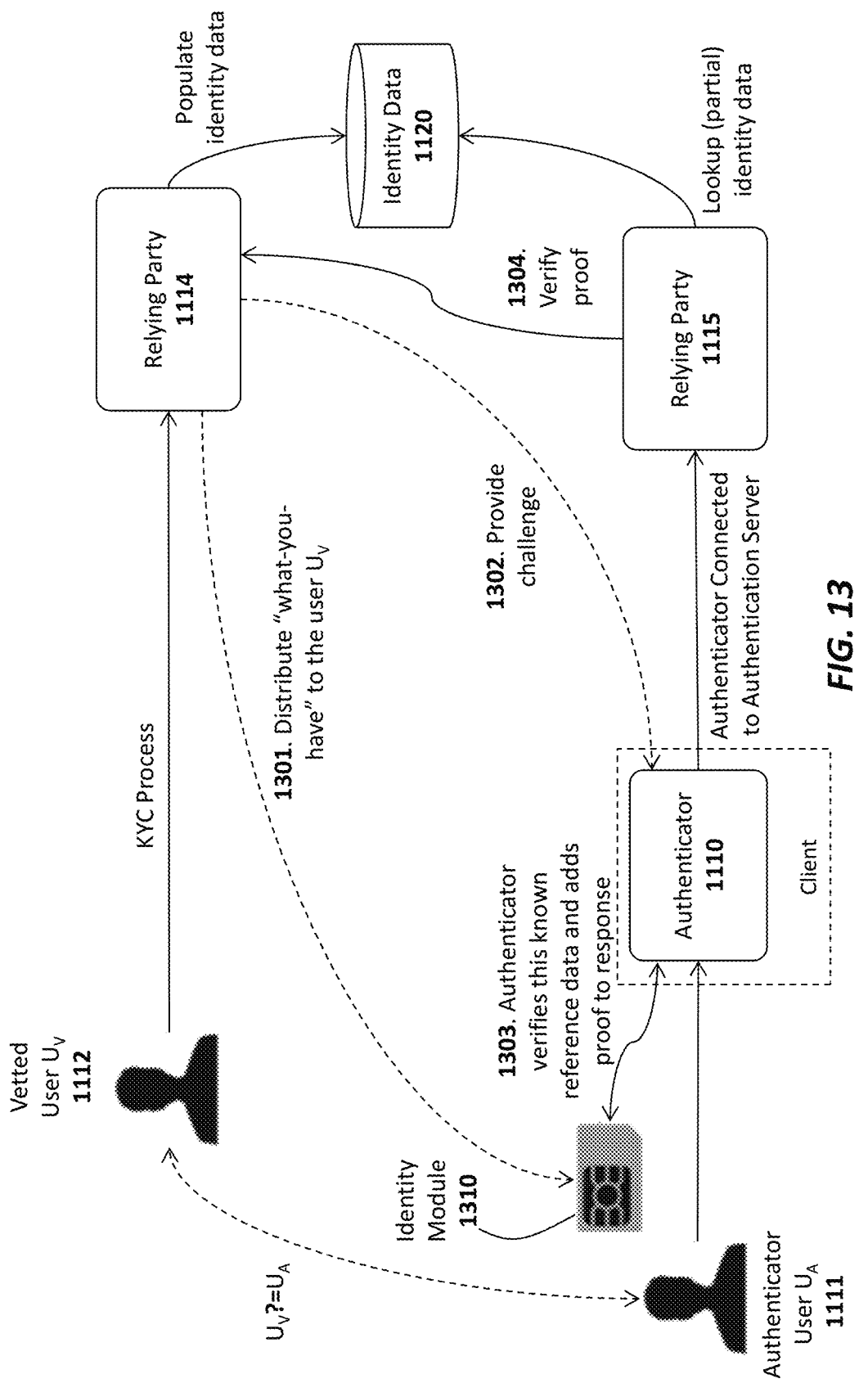
FIG. 13 illustrates one embodiment of an architecture for bootstrapping user binding to an authenticator using a physical device such as a SIM card.

FIG. 13 illustrates yet another embodiment in which, during or following the KYC process, an identity module 1310 is provided to the user 1111 which may contain symmetric keys known by the relying party 1114. In one embodiment, the identity module 1310 comprises a subscriber identity module (SIM) card; however, the underlying principles of the invention are not limited to any particular form of identity module. At 1302, the relying party 1114 provides a challenge to the authenticator 1110 (e.g., a randomly generated nonce). At 1303, the authenticator verifies the existence of the identity module 1310 by using the symmetric key to generate a signature over the random number. It then provides the signature to the relying party 1115 during registration. The relying party 1115 may then verify the identity of the user 1111 by communicating the signature to the relying party 1114, which may use the symmetric key to verify the signature. The relying party 1115 may also perform a lookup in the identity database 1120 as previously described.

One embodiment of the described authenticator 1110 supports a new IUVRD, a one-time-UVRD, and/or a one-time Identity-Binding-Handle (OT-IBH) extension for FIDO registration. This extension includes the encrypted user verification data (or data from which the user verification data can be derived or the hashed or encrypted identity binding handle).

In case of the IUVRD extension, if no user is enrolled already, the authenticator 1110 will use this data as the initial user verification reference data (IUVRD) and treat the user being enrolled with this data. In one embodiment, the authenticator 1110 proceeds as specified in the FIDO specifications (e.g., verifying the user, generating the Uauth key pair specific to the AppID/relying party ID, generating the registration assertion and signing it with the attestation key). Additionally, one embodiment of the authenticator 1110 includes an extension containing a success indicator in the signed registration assertion to indicate that the data has indeed been used by the authenticator (and the relying party 1115 can assume the related user being enrolled to that authenticator). This result indicator could be a simple Boolean value (i.e. extension processed or not) or it could be a cryptographic hash value of the extension passed to the authenticator 1110. The latter is relevant if the extension includes a value encrypted to the authenticator 1110 but not authenticated by the originator (e.g. asymmetric encryption of a PIN). If some user is already enrolled to the authenticator 1110, the authenticator will not process the IUVRD extension and consequently also not include it in the response assertion.

In case of the One-Time-UVRD extension used in one embodiment, the user verification reference data included in the extension is applicable to exactly the registration operation it belongs to. In the case of the OT-IBH extension, the extension includes the nonce and potentially an additional identifier followed by the hash of the handle H concatenated with some nonce and potentially some additional Identifier ID. Stated more formally: OT-IBH=(Nonce, ID, Hash (H|Nonce|ID)).

The embodiment illustrated in FIG. 13 (sometimes referred to herein as a "what-you-have" implementation) may utilize a One-Time Identity-Binding-Handle Extension (OT-IBH). This concept will be described using the more concrete scenario of a SIM card supporting Extensible Authentication Protocol Authentication and Key Agreement (EAP-AKA, see RFC4187 https://tools.ietf.org/html/rfc4187) authentication to the mobile network operator (MNO).

In this example, relying party 1114 may be a mobile network operator which has already vetted the account owner and issued them a SIM (or personalized an embedded SIM; in general, a "what-you-have" token). The MNO also receives (through the mobile network) a device identifier (e.g., an International Mobile Equipment Identity, IMEI) and authenticates the SIM (and hence the International Mobile Subscriber Identity IMSI tied to it). As a result, the MNO already has a good understanding of the account owner tied to a specific mobile device. If the authenticator is bound to such a mobile device, this existing identity binding may be leveraged for the registration of the authenticator 1110.

The FIDO specifications carefully avoid exposing any global correlation handle through the authenticator 1110. So instead of just letting the authenticator add the IMEI or the IMSI as an extension to the registration assertion or the signature assertion, one embodiment of the invention uses a different approach.

In the OT-IBH approach, the existence of some handle H is assumed which is tied to the user (e.g., through an IMSI or IMEI or both). Such handle H being cryptographically authenticated or encrypted may even be supported (e.g. H=MAC(IMEI|IMSI) or H=Enc(key,IMEI|IMSI)). This handle H is owned by the Mobile Network Operator issuing the SIM.

As this handle H doesn't depend on any specific relying party (RP) H may be considered a global correlation handle. For privacy reasons such global correlation handles should not be known by multiple relying parties. In order to achieve this, one embodiment derives a relying party specific handle from it: Hd=Hash(H|Nonce|IDrp), where IDrp is a relying party identifier and where the nonce and the IDrp are provided by the owner of H. The nonce is some random value and IDrp is some identifier tied to the relying party wanting to leverage the identity binding performed by the MNO.

The derived handle Hd could be issued by the MNO to some RP using a backend service to which the RP would provide some user identifying information IDu (e.g. the MSISDN) which the user could have provided directly or which the RP App could have retrieved through some existing native API on the device.

Figure 14:
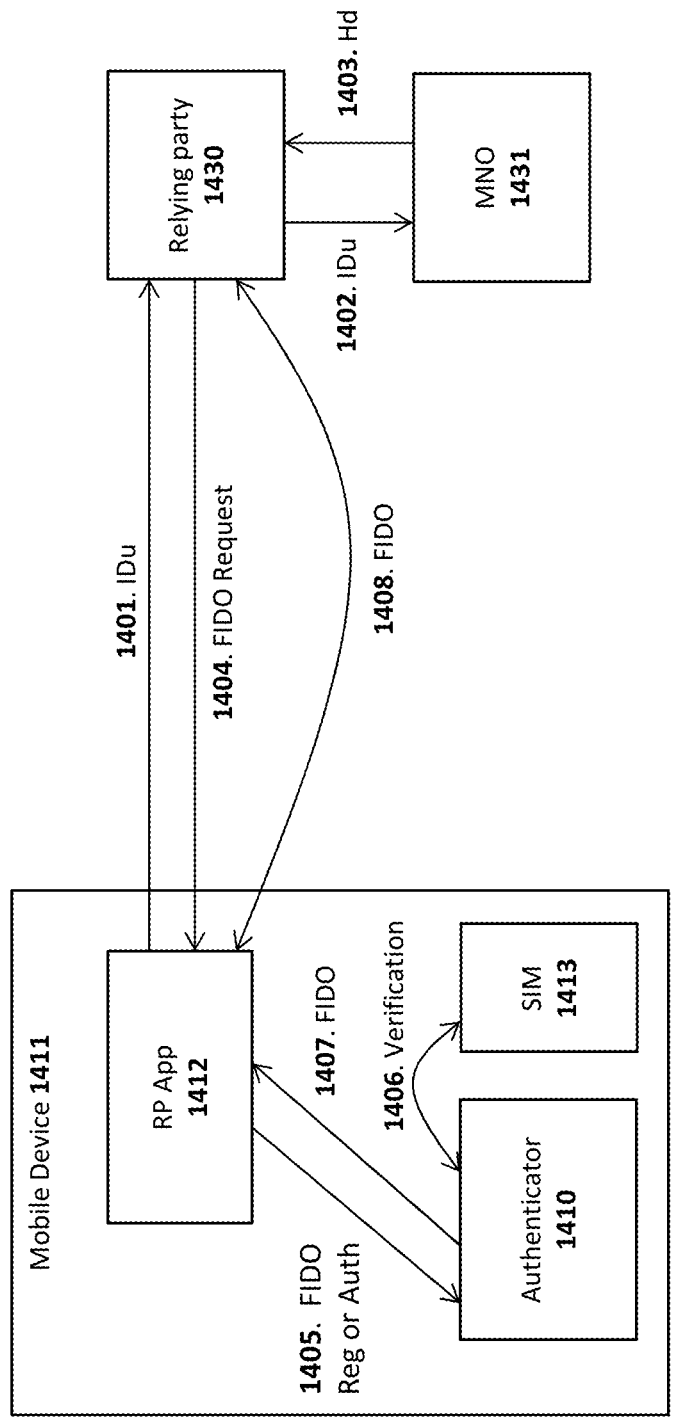
FIG. 14 illustrates one embodiment of the invention utilizing portions of the FIDO protocol.

FIG. 14 illustrates one particular embodiment in which a relying party app 1402 transmits user identifying information (IDu) to the relying party 1430 at 1401. At transaction 1402, the relying party 1430 transmits the identifying information to the MNO 1431 which responds with the relying party specific handle, Hd, at 1403. At 1404, the relying party 1430 transmits a FIDO request to the relying party app 1412. In response, the relying party app 1412 sends a FIDO registration or authentication request to the authenticator 1410 at 1405 and, at 1406, the authenticator performs a verification with the SIM 1413 at 1406. The FIDO transactions at 1407-1408 includes the Hd if verification at 1406 was successful. If verification failed, the Hd will not be included in the FIDO response.

The embodiment described above is more secure compared to using H as bearer token as the authenticator cryptographically binds H to an assertion generated by a specific authenticator. This protects against man in the middle (MITM) attacks and hence allows the lifetime of H to be extended.

This embodiment is also more privacy preserving as the authenticator 1410 will not reveal H; it will just allow an app 1412 to verify H if the app receives access to H through other means such as a contractual relationship to the entity issuing H (e.g., the MNO) or via some API available to the app 1412 on the mobile device 1411 (to which the user grants access permission).

The following exemplary use cases may be implemented. It should be noted, however, that the underlying principles of the invention are not limited to these specific use cases.

Use Case 1

In some branch office/shop a user may be vetted by an identification system using for example an electronic ID card reader, fingerprint scanner, or camera. The identification system verifies the authenticity of the ID card (if ID cards are being used) and then converts the captured data (captured from the user directly or captured from some trusted credential such as a government-issued ID card) into the format required by the authenticator.

The identification system encrypts the IUVRD data (as described above) and stores it along with the customer order for the authenticator. The order details are sent to a fulfillment center and the authenticator is shipped to the customer.

Once the customer uses the authenticator for the first time, it will automatically trigger the registration of this authenticator to the server providing the order number (or a similar identifier) allowing the server to understand the prospective user. The server will then add the appropriate IUVRD extension to the FIDO registration request and the authenticator will process the registration request as specified above.

Use Case 2

If the user is at home and orders the authenticator online, the user may provide a scan of his/her photo ID card as proof of identity. The identification system at the server side verifies the integrity of the scan and extracts the IUVRD from it. Proceed as in use Case 1, with the identification system verifying authenticity.

Use Case 3

Similar to Use Case 2 but using a PIN and a PIN-based authenticator (e.g. based on the SIM) or an authenticator supporting a PIN and some other user verification method(s).

Use Case 4

Sometimes the device and/or an entity tied to a device (e.g., something the user has such as a SIM card) are already bound to a user (e.g. mobile phone account owner). This binding may already be represented by some generic handle H (e.g., some bearer token, and/or a global correlation handle like the user's phone number or the device IMEI and potentially even encrypted or hashed like MAC(phone #+IMEI) or HMAC(MSN+IMEI), for example, which is owned by one specific relying party (e.g., the MNO). Instead of revealing such handle H to some relying party directly via the authenticator one embodiment allows the relying party to ask the authenticator in a privacy-friendly way whether the authenticator is somehow tied to this handle H. See section OT-IBH for details.

Because at least one embodiment described above works only once for an unused authenticator (unless a reset to factory defaults is performed), it only allows the authenticator vendor (not necessarily the manufacturer) to effectively use it at the beginning. In one common implementation this will be a mobile network operator selling authenticators bound to smartphones. The "One-Time-UVRD" embodiment allows the use of this approach by the authenticator manufacturer at any time and the "Select-UVM" embodiment allows the use of this approach by any RP or potentially limited to specific ones.

Cryptographic Details

Multiple cryptographic implementation options are possible. In one embodiment, a symmetric encryption key for the IUVRD/One-Time-UVRD/OT-IBH is shared between the authenticator and the identification system. In this case the IUVRD/One-Time-UVRD/OT-IBH would be protected by authenticated encryption. Alternatively, an asymmetric encryption/decryption key may be used inside the authenticator combined with an asymmetric public key as trust anchor. The IUVRD/One-Time-UVRD/OT-IBH may be signed by the identification system and then encrypted using the public encryption/decryption key. In both cases it may be assumed that the key is authenticator specific in order to prevent replay attacks to other authenticators.

Privacy Impact

The privacy impact is minimal when the RP is enabled to perform identity binding for its own Uauth key. The IUVRD extension allows the first RP to perform an identity binding to the authenticator if it owns cryptographic material specific to the authenticator.

The One-Time-UVRD extension allows any RP to do an identity binding to the authenticator if it owns cryptographic material specific to the authenticator.

The OT-IBH implementation allows any RP which is provided with access to the handle H through some other existing means (e.g., some native API already available to the App or through some backend-API to the RP "owning" handle H) to cryptographically verify whether the authenticator is indeed bound to it.

In one embodiment, one or more of the following privacy policies are followed. At no time are private Uauth keys exposed outside the authenticator boundary. At no time are user verification reference data enrolled by the user to the authenticator revealed by the authenticator. At no time does the authenticator reveal the number or names of relying parties it is registered to. At no time does the authenticator reveal any global correlation handle. At no time is it possible for any RP to modify user verification reference data for existing keys.

It is possible for the RP to query the authenticator to determine whether it is tied to some user (specified by the extension). However, the user is involved in such a query (through user verification) and—depending on the authenticator model—might also learn the name of the related RP.

System and Method for Sharing Keys Across Authenticators

Motivation

Current FIDO specifications (UAF, U2F and FIDO2/Web Authentication) expect authentication keys (e.g., Uauth keys) to be dedicated to an individual authenticator instance. Users can register multiple authenticators to each account/relying party. If a user loses any (but the last registered) authenticator, they can simply authenticate with one of the remaining authenticators and then register a new/replacement authenticator.

In reality there are two pain points for users. First, if a user loses a last registered authenticator, then the relying parties need to push the user through an account recovery procedure. Account recovery is a painful process, potentially even involving out of band checks. Account recovery is sometimes also a risky process and less secure/trustworthy than FIDO authentication.

In addition to registering the new authenticator, a user also must deregister the lost/stolen authenticator at each relying party individually and register a new authenticator at each relying party. The process of registering a new authenticator or deregistering an old authenticator can be painful as users often have multiple accounts.

The embodiments of the invention described herein address the above issues using a client-side biometric solution.

Approaches

One approach is to keep each Uauth key dedicated to one authenticator and to propose a standardized registration/deregistration API for relying partys for automatically adding/removing authenticators (as described above with respect to certain embodiments). However, standardizing web APIs across relying parties is challenging and requires time. As such, success is not guaranteed.

One embodiment of the invention extends the implementations described above to share keys across multiple authenticators.

Traditional FIDO Authenticators

Registering additional authenticators requires one manual operation per relying party. This manual operation might even include multiple steps (e.g. open app, click on register additional authenticator, perform user verification). This is the traditional FIDO model which is known in the art.

Synchronizing Wrapped Uauth Keys via a Cloud Service

In one embodiment of the invention, the user uses different authenticator instances of the same model (e.g., identified by the AAID/AAGUID). According to the FIDO specification, such authenticator would have similar security characteristics—no authenticator provides lower security than claimed in the Metadata Statement. So, for example, the class of authenticators could claim Trusted Execution Environment (TEE) security and some implementations may actually even use a secure element for key protection. More specifically, one authenticator may be bound to a smartphone using TEE for key protection, matcher protection and transaction confirmation display and may use a fingerprint as the user verification method. Another authenticator sharing that AAID might be implemented as a smart card with integrated fingerprint sensor and eInk transaction confirmation display and using a secure element for key and matcher protection.

Additionally these authenticators may allow the user to:
a) Store a copy of the authenticator persistent storage (i.e., private key material and related usernames and AppIDs) in wrapped form on a Cloud service. Only the authenticators belonging to the same user defined group can unwrap these wrapped persistent data blocks.
b) The first authenticator defines this group characterized by the symmetric wrapping key. The user can add additional authenticators to that group, by approving the "join" process on the first authenticator.

Authenticator Cryptographic Details

Figure 15:
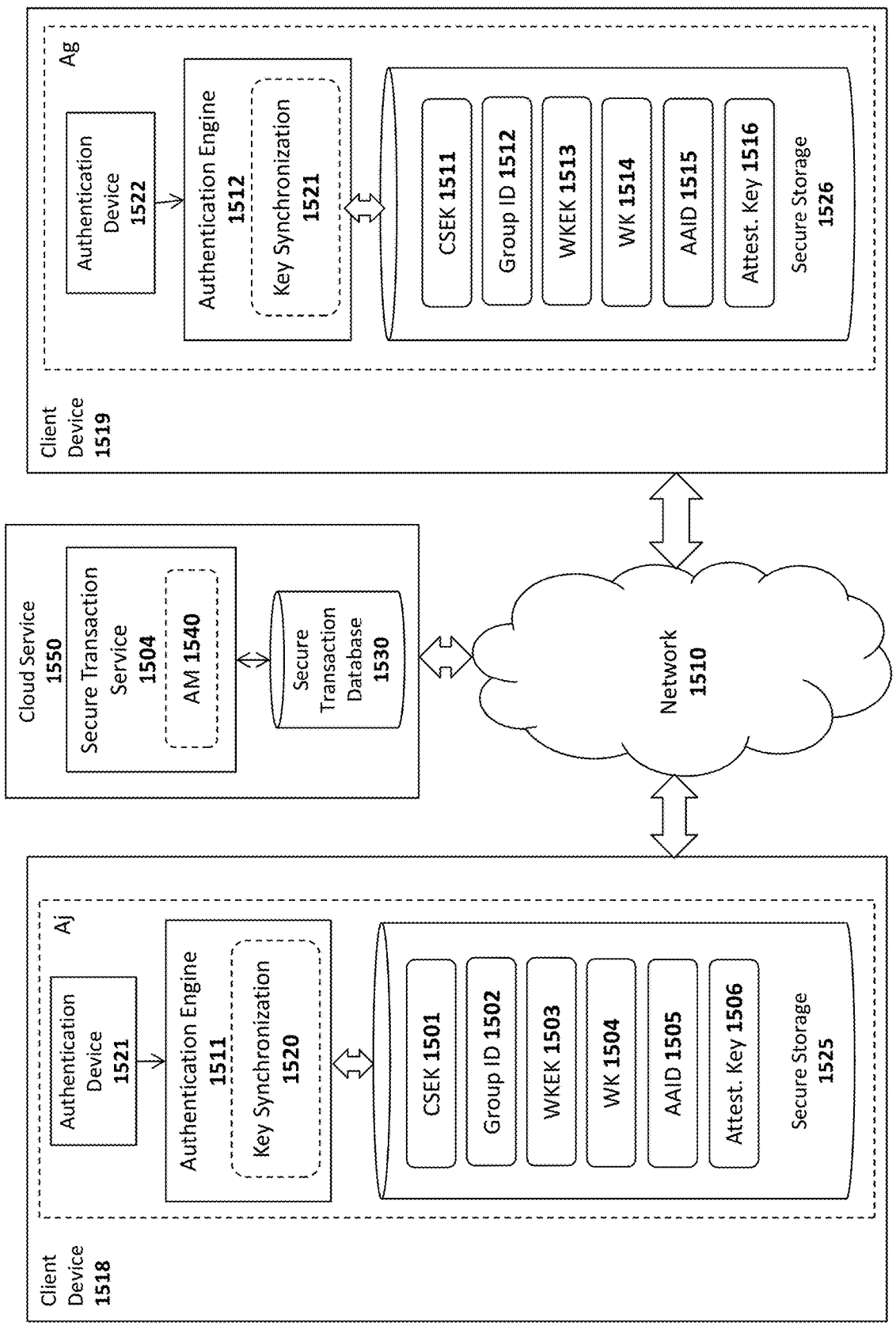
FIG. 15 illustrates one embodiment of the invention for securely sharing cryptographic data.

In one embodiment, the authenticator supports FIDO functions (e.g., it has a FIDO attestation key and supports the generation of FIDO Uauth keys). It should be noted, however, that the underlying principles of the invention are not limited to a FIDO implementation. FIG. 15 illustrates an exemplary embodiment with a first client device 1518 includes an authenticator which is joining a group Aj and a second client device 1519 includes an authenticator which has already joined the group Ag. Each authenticator in Aj, Ag includes a physical authentication device 1521-1522, an authentication engine 1511-1512 with key synchronization logic 1520-1521 for implementing the techniques described herein, and a secure storage 1625-1626 for storing the various types of cryptographic data described herein. While some of the details are not shown, client device 1519 may store all of the same data as client device 1518. As illustrated in FIG. 15, in one embodiment, each authenticator:
a) Has a public Cloud storage access ID encryption key (CSEK) 1501, 1511 (e.g., as a trust anchor).
b) Has a random Group ID (e.g., UUID) 1502, 1512 that is overwritten by each join procedure implemented by key synchronization logic 1520-1521 of the authentication engines 3710-1511.
c) Has an individual asymmetric wrapping key encryption key (WKEK) 1503, 1513. It may be generated by the authenticator 3710-1511 on first use and never made accessible outside the authenticator.
d) Has a symmetric wrapping key (WK) 1504, 1514 which may be generated on first use and overwritten by each join procedure.
e) In one implementation, the key synchronization logic 1520-1521 implements the following join process. There is an API function that can ask an authenticator Aj to join an existing authenticator group. The authenticator to join, Aj, generates a nonce value, asks the user for permission (i.e., triggers a user verification displaying the Join process indicator and the Nonce value in the display), appends to the Nonce value its AAID 1505 and public WKEK 1503 and signs it with its attestation key 1506. This data block is referred to as the "join block" or "trust block."
f) One authenticator in the join group, Ag, receives the join block which is verified by the key synchronization logic 1521. This is possible because the authenticators all know the acceptable public attestation keys (trust anchors) used for signature verification. The authentication engine 1511 displays the nonce, the AAID 1505 and a Join Request indicator in its display. If the user approves the action (e.g., by normal user verification), the key synchronization logic 1521 will encrypt the wrapping key (WK) 1514 and Group-ID 1512 using the public WKEK 1503 received in the join block. This data block is called in the join response block.
g) Aj decrypts the join response block and stores the wrapping key (WK) 1514 and Group-ID 1512.
h) One embodiment supports an API function to retrieve a sync-pull-request (given a Nonce value retrieved from the Cloud service 1550) from an authenticator Aj. The key synchronization logic 1520 on the authenticator Aj returns the concatenation of the server provided Nonce, the Group-ID 1502, and the hash of the internal persistent memory encrypted by the CSEK 1501 (e.g., sync pull request). This function is triggered by an external module (e.g., an ASM, authenticator configuration App). Once the sync-pull-request is received by the Cloud service 1550, the secure transaction service 4004 decrypts the block and compares the state hash with the hash received along with the latest data block. If it differs it returns the sync pull response, i.e., the latest wrapped data block encrypted by WKEK 1503, otherwise it returns "no change" code.
i) Supports an API function to process the sync-pull-response. The key synchronization logic 1520 decrypts the block using its private WKEK 1503 and then unwraps the data using the symmetric wrapping key (WK) 1504. It both operations are successful, the authentication engine 3710 updates its internal persistent storage accordingly. Note that this update procedure supports merging various elements (i.e., the key generated on this authenticator which has not yet been synced to the Cloud 1550).
j) Supports another API function to trigger generation of a sync-push-request in the authenticator. This API function triggers the key synchronization logic 1520 to return a Nonce, the GroupID 1502, the hash of the internal persistent memory concatenated with the wrapped persistent memory all encrypted with the CSEK 1501 (i.e., so the Cloud service 1550 can read the Nonce, the Group-ID 1502, and the hash—but it cannot unwrap the persistent memory containing the private key material). Note that the authenticator first needs to perform a sync-pull with the Cloud 1550 in order to merge-in changes before generating the sync-push-request.

Characteristics

Using the above approach, new authenticators may be readily added to the group with a single operation. The join process can be performed independently from the Cloud service. However, one drawback is that if the user loses his last registered authenticator, a full account recovery needs to be performed, which is burdensome on the user.

Synchronizing Password-Protected Uauth Keys Via a Cloud Service

One embodiment of the invention is similar to the approach described above with one difference being that the symmetric wrapping key (WK) may be derived from a password provided by the user. In particular, step (d) above is supplemented with the ability to overwrite the current WK with a WK derived from a password (e.g., via a dedicated API function). In one embodiment, the password is always entered on the authenticator's secure display.

In addition, in one embodiment, step (h) above is modified as indicated by the bolded portions of the following paragraph. In particular, the key synchronization logic 1520 will return the concatenation of the server provided Nonce, the Group-ID 1502, the WKEK 1503, and the hash of the internal persistent memory first signed by the attestation key 1506 and then encrypted by the CSEK 1501 (sync pull request). This function is triggered by an external module (e.g. ASM, authenticator configuration App). Once received by the cloud service, it decrypts the block, verifies the attestation signature and compares the state hash with the hash received along with the latest data block. This method (in combination with encryption to WKEK) allows the cloud service to restrict access to the wrapped memory block to authenticators having the correct model (e.g., protecting against brute force attacks on the password by other authenticators/attackers). If it differs it returns the sync pull response, i.e., the latest wrapped data block encrypted by WKEK 1503, otherwise it returns "no change" code.

Aside from the differences highlighted above, the remaining operations from (a-j) are performed as previously described.

Characteristics

With the approach described above, it is easy to add a new authenticator to the group with a single operation. If the user loses the last authenticator, he can recover the by providing his password. Brute force attacks on the password are prevented by encrypting the wrapped memory block using the respective authenticated WKEK. However, one drawback is that the Cloud service provider still has access to the wrapped memory block and hence could brute force the password.

Fallback Join-Authenticator in the Cloud

In one embodiment, to address the above limitation, the wrapped data and the CSEK 1501 private key is protected by a special authentication module 1540 used by the Cloud service 1550. This authentication module is a unique kind of authenticator with the following features:
1. It supports multiple users in one hardware box, similar to bound UAF authenticators used by tablets supporting multiple OS accounts.
2. It supports only remote user verification, via another authenticator of exactly that model used at first enrollment.
3. It doesn't allow the user to actually use any Uauth key for authentication, only approving other authenticators joining the group is supported.

As a consequence, this Cloud authenticator module 1540 can be joined to the group like any other authenticator can.

Authenticator Cryptographic Details

One embodiment of the invention is similar to the previous approach but with additional techniques for enrolling with a Cloud service and using a cloud-based join-authenticator. These new techniques are highlighted in bold. In this embodiment, each authenticator:
  a) Has a public Cloud storage access ID encryption key (CSEK) 1501, 1511 (e.g., as a trust anchor).
  b) Has a random Group ID (e.g., UUID) 1502, 1512 that is overwritten by each join procedure implemented by key synchronization logic 1520-1521 of the authentication engines 3710-1511.
  c) Has an individual asymmetric wrapping key encryption key (WKEK) 1503, 1513. It may be generated by the authenticator 3710-1511 on first use and never made accessible outside the authenticator.
  d) Has a symmetric wrapping key (WK) 1504, 1514 which may be generated on first use and overwritten by each join procedure.
  e) Can be "enrolled" to the Cloud service 1550 in order to create a new partition. One embodiment of this process may comprise a FIDO registration:
    1. The user takes one authenticator Aj and registers it to the cloud service 1550. The user additionally provides his email address to identify his partition.
    2. The cloud-based join-authenticator 1540 creates a "partition" for the registered authenticator Aj. This partition is identified by the related Uauth public key. Each "partition" has its own set of persistent data (including key material).
  f) Can be "enrolled" to an existing partition of the cloud service (recovery join):
    1. User enters his/her email address for an existing partition.
    2. The user takes one authenticator Aj and registers it to the cloud service.
    3. Note that this authenticator is not yet approved. The only action the user can trigger is a join process using this authenticator as Aj (and the cloud-based join-authenticator 1540 as Ag). In one embodiment, this process will only succeed if the AAID 1505 of this authenticator is identical to the AAID of the Authenticator originally creating this partition (e.g., AAID 1515).
  g) Supports the following join process:
    1. There is an API function that can ask an authenticator to join an existing authenticator group. The authenticator to join (Aj) will generate a nonce value, ask the user for permission (i.e. trigger user verification displaying the Join process indicator and the Nonce value in the display), append to the Nonce value its AAID and public WKEK and sign it with its attestation key. This data block is called "join block" or "trust block."
    2. This function is also supported by the cloud-based join-authenticator 1540.
      a. The user first asks the cloud-based join-authenticator 1540 to join the group (initialized by the authenticator Aj first "enrolled" to the cloud service).
      b. In this case, the cloud-based join-authenticator plays the role of Aj and the user's initial authenticator the role of Ag.

c. Ag authenticates to the cloud service and calls the Aj.join API function. The cloud service 1550 passes the AAID 1515 of Ag to Aj while calling the API function. Aj responds with the join block (see above).
d. Ag performs step h below and sends the join-response block to Aj.
e. Aj stores the Group-ID 1502 and WK 1504 in the related "partition".

h) One authenticator in the join group, Ag, receives the join block and the key synchronization logic 1521 verifies it. This is easily possible as the authenticators all know the acceptable public attestation keys (trust anchors) used for signature verification. Ag displays the nonce, the AAID 1515 and a Join Request indicator in its display. If the user approves the action (by normal user verification), the authenticator will encrypt the wrapping key (WK) 1514 and Group-ID 1512 using the public WKEK 1513 received in the join block. This data block is called in the join response block.

i) Aj will decrypt the join response block and store the wrapping key (WK) 1504 and Group-ID 1502.

j) One embodiment supports an API function to retrieve a sync-pull-request (given a Nonce value retrieved from the Cloud service 1550) from an authenticator Aj. In particular, the key synchronization logic 1520 will return the concatenation of the server provided Nonce, the Group-ID 1502, the WKEK 1503, and the hash of the internal persistent memory first signed by the attestation key 1506 and then encrypted by the CSEK 1501 (sync pull request). This function is triggered by an external module (e.g. ASM, authenticator configuration App). Once received by the cloud service, it decrypts the block, verifies the attestation signature and compares the state hash with the hash received along with the latest data block. This method (in combination with encryption to WKEK) allows the cloud service to restrict access to the wrapped memory block to authenticators having the correct model (e.g., protecting against brute force attacks on the password by other authenticators/attackers). If it differs it returns the sync pull response, i.e., the latest wrapped data block encrypted by WKEK 1503, otherwise it returns "no change" code.

k) Supports an API function to process the sync-pull-response. The key synchronization logic 1520 decrypts the block using its private WKEK 1503 and then unwraps the data using the symmetric wrapping key (WK) 1504. It both operations are successful, the authentication engine 3710 updates its internal persistent storage accordingly. Note that this update procedure supports merging various elements (i.e., the key generated on this authenticator which has not yet been synced to the Cloud 1550).

l) Supports another API function to trigger generation of a sync-push-request in the authenticator. This API function triggers the key synchronization logic 1520 to return a Nonce, the GroupID 1502, the hash of the internal persistent memory concatenated with the wrapped persistent memory all encrypted with the CSEK 1501 (i.e., so the Cloud service 1550 can read the Nonce, the Group-ID 1502, and the hash—but it cannot unwrap the persistent memory containing the private key material). Note that the authenticator first needs to perform a sync-pull with the Cloud 1550 in order to merge-in changes before generating the sync-push-request.

Characteristics

With this approach, adding a new authenticator to the group with a single operation is realitvely easy. If the user loses his last authenticator, he can recover the by providing his password. Brute force attacks on the password are prevented by encrypting the wrapped memory block using the respective authenticated WKEK. The cloud service provider would have to break the cloud-based join-authenticator in order to brute force the password. As a consequence the cloud-based join-authenticator should use secure element based security. Its security is reflected by the attestation statement.

Unfortunately, the user cannot revoke individual authenticator members of his/her recovery group.

Fallback Join-Authenticator in the Cloud and Automatic Key Deletion Policy in Authenticators This approach supplements the previous approach as follows. Each authenticator (except the cloud-based join-authenticator), will delete its persistent private key storage (WK, WKEK, Uauth keys, etc.), except the attestation private key after a configurable time period, unless the authenticator persistent storage is re-synchronized to the cloud storage. As a consequence, the authenticator needs a reliable internal clock/ticker.

The user has the ability to remove individual authenticators from the group via the cloud storage. If an authenticator has been removed, it cannot be synchronized any longer.

Authenticator Cryptographic Details

This approach supplements the previous approach as follows (with key features highlighted in bold). The authenticator supports another API function to retrieve a sync-pull-request (given a Nonce value retrieved from the cloud service) from an authenticator. The authenticator will return the sync pull response, i.e., the concatenation of the server provided Nonce, the Group-ID 1502, WKEK 1503 and the hash of the internal persistent memory first signed by the attestation key and then encrypted by the CSEK 1501 (sync pull request). This function is triggered by an external module (e.g. ASM, authenticator configuration App). Once received by the cloud service 1550, it decrypts the block, verifies the attestation signature and compares the state hash with the hash received along with the latest data block. It returns the sync pull response, i.e. the latest wrapped data block encrypted by WKEK 1503. In one implementation, the cloud service 1550 increments a mismatch counter if the hash doesn't match. Very high counter values indicate increased risk.

In one embodiment, the authenticator supports an API function to process the sync-pull-response. The authenticator decrypts the block using its private WKEK and then unwraps the data using the symmetric wrapping key WK. It both operations are successful, the authenticator updates its internal persistent storage accordingly and resets its internal need-cloud-sync ticker.

Characteristics

With this approach it is easy to add new authenticator to the group with a single operation. If the user loses his last authenticator, he can recover the by providing his password.

Brute force attacks on the password are prevented by encrypting the wrapped memory block using the respective authenticated WKEK.

The cloud service provider would have to break the cloud-based join-authenticator in order to brute force the password. As a consequence, the cloud-based join-authenticator should use secure element based security. Its security is reflected by the attestation statement.

In addition, in this particular embodiment, the user can "revoke" individual authenticator members of his recovery group by removing them from the group.

Sensitive Data Migration Card

Figure 16:
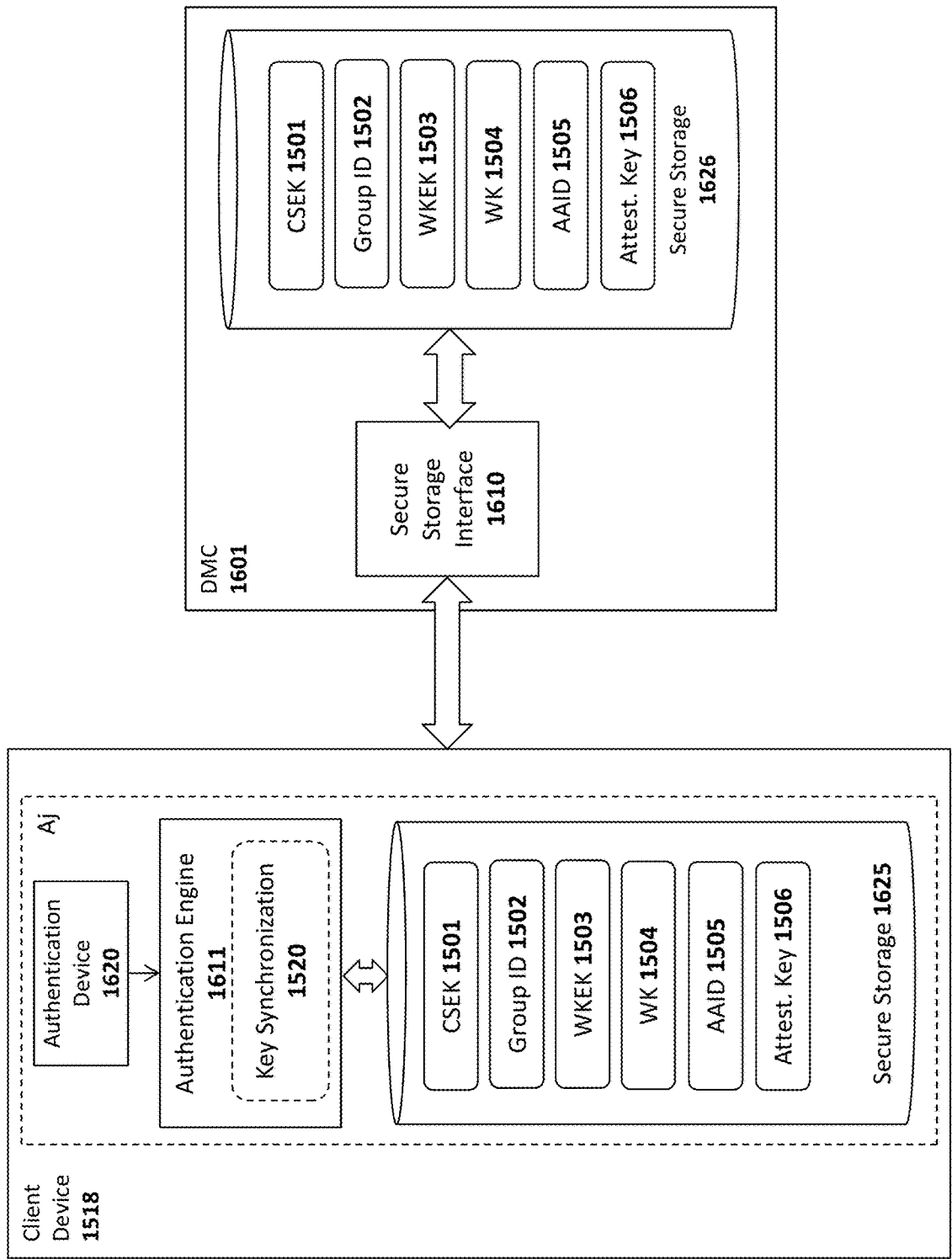
FIG. 16 illustrates one embodiment which utilizes a data migration card (DMC)

Instead of using a Cloud service, one embodiment of the invention uses a dedicated chip card (ICC), illustrated in FIG. 16 as a data migration card (DMC) with secure storage 1626 for storing a protected backup of the all Uauth keys and even all other sensitive data stored in the client device 1518. To "backup" the sensitive data, the user connects via a secure storage interface 1610 of the DMC 1601 to the client device 1518 containing a bound authenticator Aj (or to the authenticator directly). The user confirms to the authenticator Aj that the data is to be backed-up to the DMC 1601. This step erases all existing data on the DMC.

Depending on the settings, the secure storage interface 1610 may remember the authenticator model (AAID, AAGUID) or a model with similar security characteristics (e.g. keys+matcher TEE protected, etc.) and will only restore the data to an identical model or model with comparable security characteristics.

In one embodiment, the authenticator Aj will only backup keys to a DMC 1601 with acceptable security characteristics, e.g., having a model configured in the authenticator. The DMC 1601 will only restore keys into authenticators with acceptable security characteristics, e.g., having the same model as the original authenticator. The security mechanisms may be implemented using authenticator/DMC attestation.

In one embodiment, a second authenticator may act as a DMC (e.g. via NFC+BLE). For example, in FIG. 15, all keys stored in secure storage 1525 of client device 1518 may be securely migrated into a the secure storage 1526 of client device 1519.

DMC Cryptographic Details

In one embodiment, the DMC is like a traditional (external) authenticator. Consequently, the DMC and each authenticator supporting it may perform the same key synchronization techniques described above for joining and managing a join block or trust block.

For example, in one embodiment, an authenticator can be "enrolled" to the DMC. This may be accomplished with a FIDO registration in which the user takes one authenticator and registers it to the DMC. The user additionally provides an identifier (e.g. his email address) to identify his partition in the DMC (only required if the DMC supports multiple partitions). Moreover, the DMC may create a "partition" for the registered authenticator (if it supports multiple partitions, otherwise it uses its only pre-configured partition). This partition is identified by the related Uauth public key. Each "partition" has its own set of persistent data (including key material).

An authenticator can also be "enrolled" to an existing partition of the DMC (recovery join). The user enters his identifier (e.g. email address) for an existing partition and registers one authenticator to the DMC. Note that this authenticator is not approved yet. The only action the user can trigger is a join process using this authenticator as Aj (and the DMC is a join-authenticator as Ag). This process will only succeed if the AAID of this authenticator is identical to the AAID of the Authenticator originally creating this partition.

In addition, one embodiment, there is an API function that can ask an authenticator to join an existing authenticator group. This function is also supported by the DMC join-authenticator. The user first asks the DMC join-authenticator to join the group (initialized by the authenticator first "enrolled" to the cloud service. In this case, the DMC join-authenticator plays the role of Aj and the user's initial authenticator the role of Ag. Ag authenticates to the DMC and calls Aj.join API function. The DMC passes the AAID of Ag to Aj while calling the API function. Aj responds with the join block (see above). Ag performs step h below and sends the join-response block to Aj. Aj then stores the Group-ID and WK in the related "partition".

Exemplary Data Processing Devices

Figure 17:
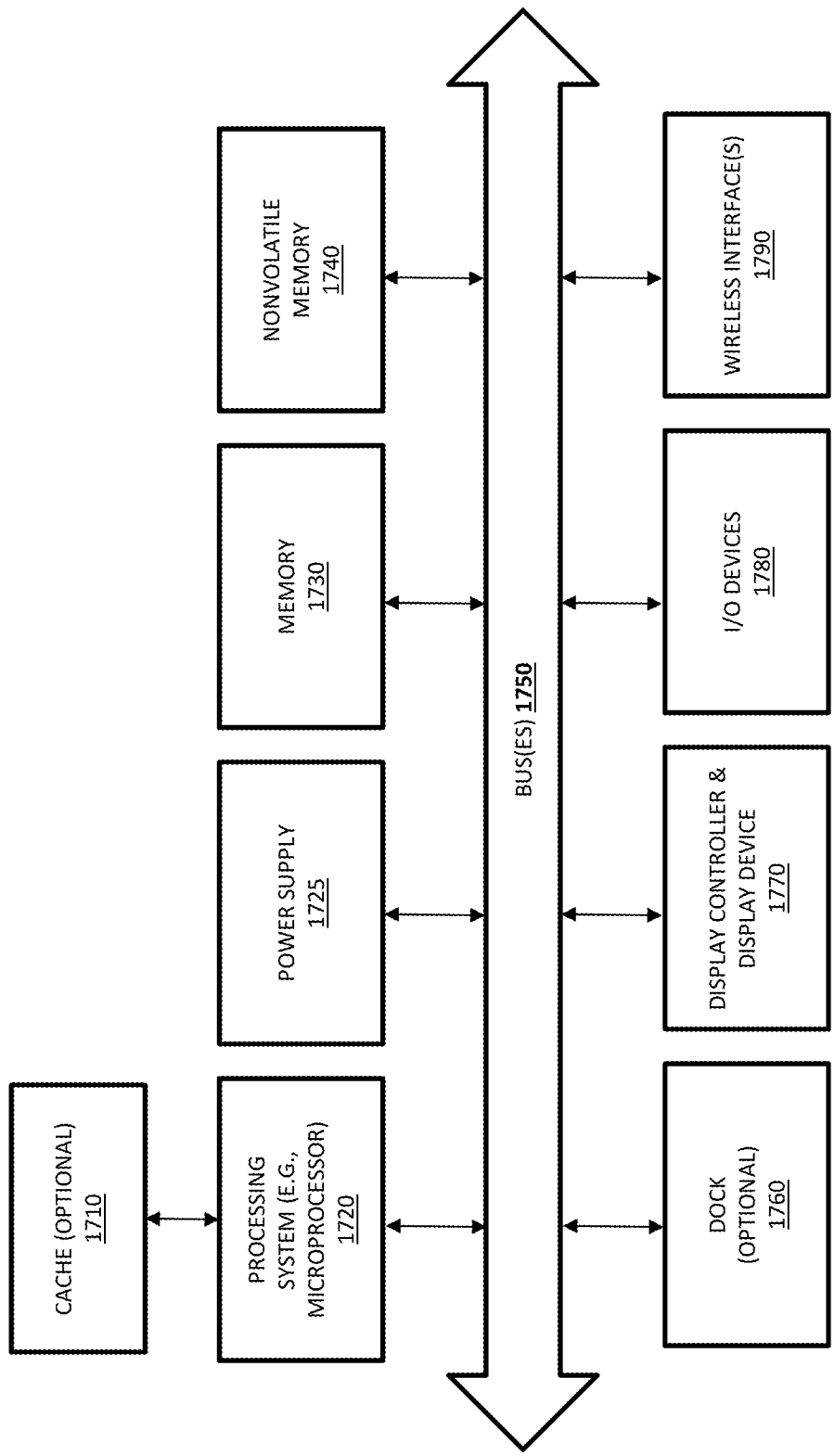
FIG. 17 illustrates a system in accordance with one embodiment of the invention.

FIG. 17 is a block diagram illustrating an exemplary clients and servers which may be used in some embodiments of the invention. It should be understood that while FIG. 17 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 17, the computer system 1700, which is a form of a data processing system, includes the bus(es) 1750 which is coupled with the processing system 1720, power supply 1725, memory 1730, and the nonvolatile memory 1740 (e.g., a hard drive, flash memory, Phase-Change Memory (PCM), etc.). The bus(es) 1750 may be connected to each other through various bridges, controllers, and/or adapters as is well known in the art. The processing system 1720 may retrieve instruction(s) from the memory 1730 and/or the nonvolatile memory 1740, and execute the instructions to perform operations as described above. The bus 1750 interconnects the above components together and also interconnects those components to the optional dock 1760, the display controller & display device 1770, Input/Output devices 1780 (e.g., NIC (Network Interface Card), a cursor control (e.g., mouse, touchscreen, touchpad, etc.), a keyboard, etc.), and the optional wireless transceiver(s) 1790 (e.g., Bluetooth, WiFi, Infrared, etc.).

Figure 18:
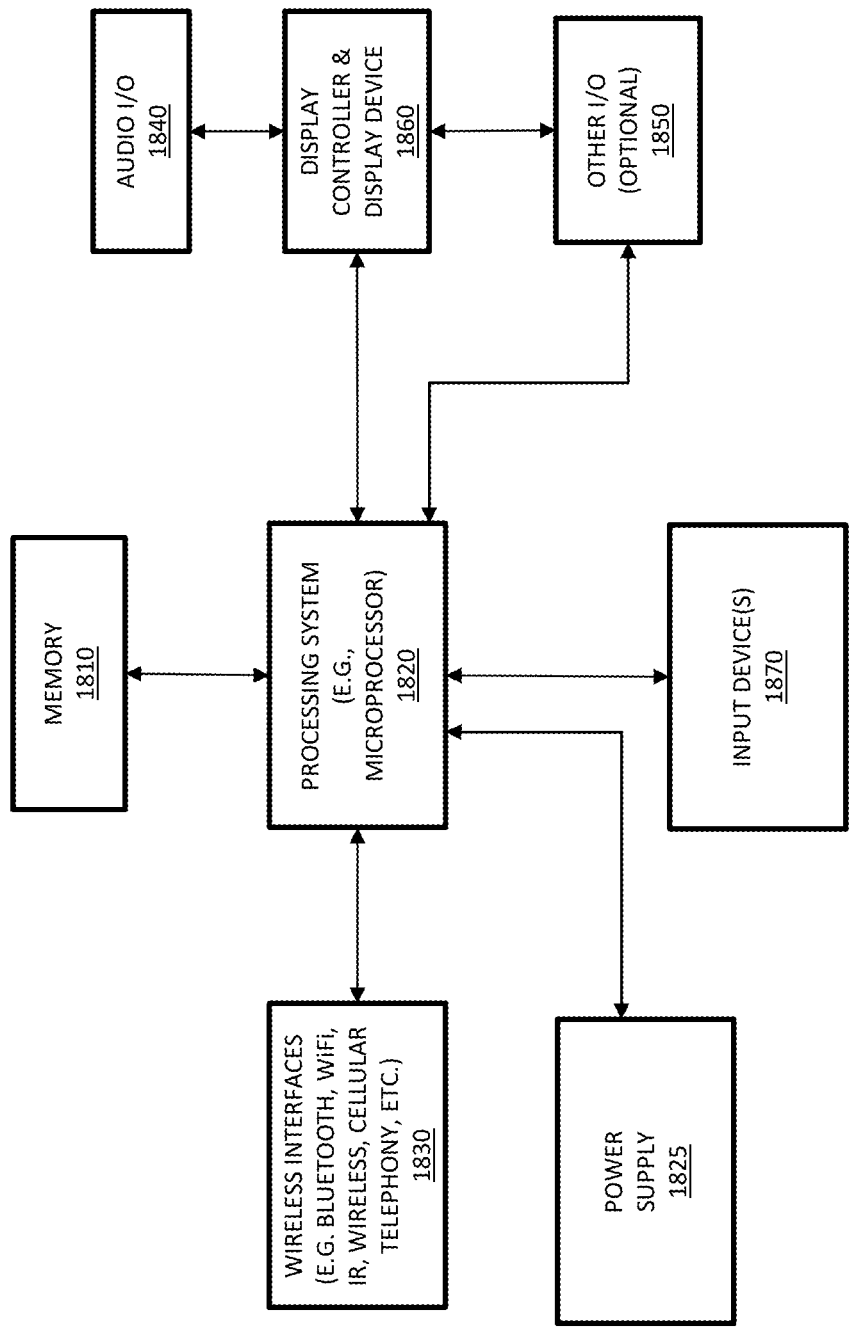
FIG. 18 illustrates a system on a chip (SoC) in accordance with one embodiment.

FIG. 18 is a block diagram illustrating an exemplary data processing system which may be used in some embodiments of the invention. For example, the data processing system 1800 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 1800 may be a network computer or an embedded processing device within another device.

According to one embodiment of the invention, the exemplary architecture of the data processing system 1800 may be used for the mobile devices described above. The data processing system 1800 includes the processing system 1820, which may include one or more microprocessors and/or a system on an integrated circuit. The processing system 1820 is coupled with a memory 1810, a power supply 1825 (which includes one or more batteries) an audio input/output 1840, a display controller and display device 1860, optional input/output 1850, input device(s) 1870, and wireless transceiver(s) 1830. It will be appreciated that additional components, not shown in FIG. 18, may also be a part of the data processing system 1800 in certain embodiments of the invention, and in certain embodiments of the invention fewer components than shown in FIG. 18 may be used. In addition, it will be appreciated that one or more buses, not shown in FIG. 18, may be used to interconnect the various components as is well known in the art.

The memory 1810 may store data and/or programs for execution by the data processing system 1800. The audio input/output 1840 may include a microphone and/or a speaker to, for example, play music and/or provide telephony functionality through the speaker and microphone. The display controller and display device 1860 may include a graphical user interface (GUI). The wireless (e.g., RF) transceivers 1830 (e.g., a WiFi transceiver, an infrared transceiver, a Bluetooth transceiver, a wireless cellular telephony transceiver, etc.) may be used to communicate with other data processing systems. The one or more input devices 1870 allow a user to provide input to the system. These input devices may be a keypad, keyboard, touch panel, multi touch panel, etc. The optional other input/output 1850 may be a connector for a dock.

System and Method for Authenticator Endorsement

In some scenarios, especially those involving electronic payments, apps of multiple merchants need to authenticate payment credentials from a user. Today simple bearer tokens like Primary Account Numbers (PANs) or tokenized PANs are used for that purpose. This approach provides very limited security as such information could be phished and used by malicious actors.

Alternatively, a step-up authentication scheme is sometimes used (e.g., Three-Domain Secure or 3DS). Such schemes essentially implement a "decoupled" model which require the issuer to trigger step-up authentication through an out-of-band channel. Today one-time passwords via SMS are primarily used for this step-up authentication, leading to a high cart abandonment rate (e.g., 15% by one estimate).

Modern authentication concepts like FIDO provide substantially more security and are supported by 3DS v2 for user-to-merchant authentication. Unfortunately, FIDO authentication is designed in a way that the authentication credential is specific to the app and hence leads to the need for a separate authenticator registration step required per merchant which adds undesirable friction.

One embodiment of the invention uses a highly secure authentication technology such as FIDO but allows the seamless endorsement of merchant specific authentication credential related to the payment card or account instead of one related to the merchant. Privacy is not an issue in such a scenario as the payment provider by definition will learn that the specific merchant receives a payment from the user. Thus, this embodiment avoids the need for per-app authenticator registration—while still allowing the authenticator to be implemented in the merchant App through an embedded AppSDK.

The embodiments of the invention described herein can optionally leverage the techniques described in U.S. Pat. No. 10,091,195 ('195 patent), issued on Oct. 2, 2018 and U.S. Pat. No. 9,413,533 ('533 patent), issued on September 2016.

One embodiment of this authenticator-centric implementation extends FIDO authenticators with various new functionalities including secure (initial) sharing of user verification reference data between authenticators tied to the same platform. In addition, one embodiment allows synchronization of user verification reference data between authenticators tied to the same platform.

Figure 19:
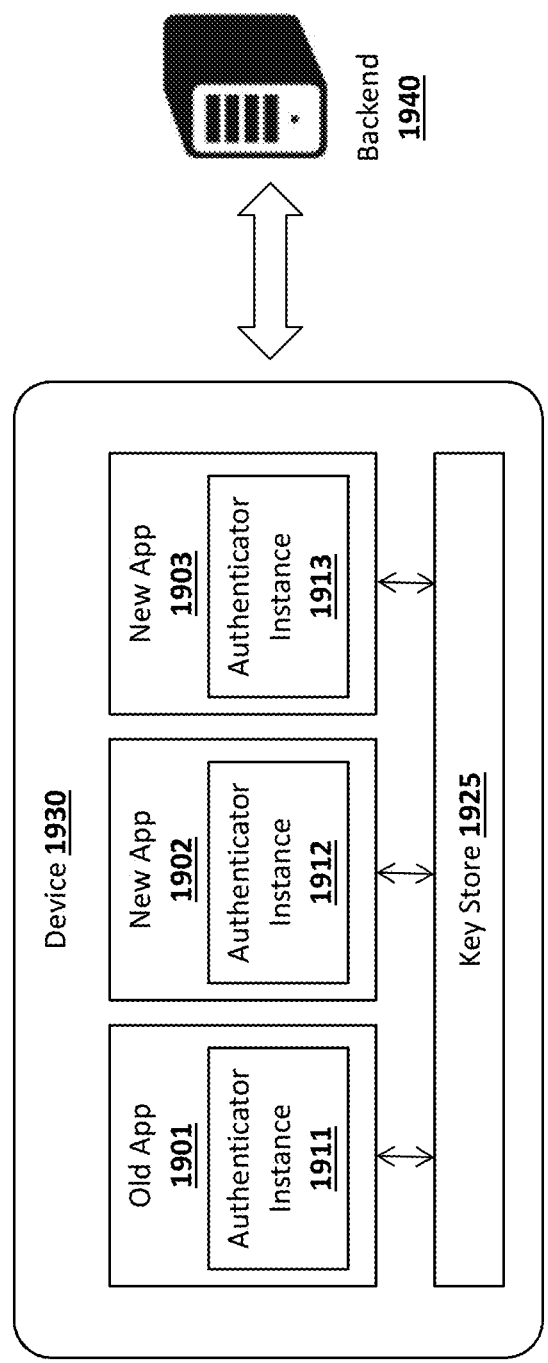
FIGS. 19-21 illustrate different embodiments for sharing authentication data between different authenticators.

One embodiment will be described with respect to the architecture shown in FIG. 19 which includes a client device 1930 with a secure key store 1925 for securely storing authentication data (e.g., keys), an old app 1901 associated with authenticator instance 1911, a first new app 1902 associated with authenticator instance 1912, and a third new app associated with authenticator instance 1913.

The Apps used in these embodiments may belong to different merchants, but still support the same payment scheme. In order to reduce friction for the user, the Apps want authentication credentials of that user that are seamlessly endorsed to the payment scheme when authenticating to the scheme backend 1940.

In one embodiment, the user initially installs the old App 1901 which checks whether other Apps supporting the same "Scheme" and having a registered authenticator are already installed. If not, then in one embodiment, the user enters his user identifier (e.g. username, or email address, or PAN that might even be tokenized) and also enters a bearer token such as a password or a one-time passcode (e.g. received through SMS). The user is then authenticated by the backend service 1940 which issues a session token to the App 1901.

In one embodiment, the App 1901 triggers registration of its authenticator instance 1911 (e.g., through the AppSDK). This operation may include asking the user for user verification reference data (e.g. a PIN) and generating the authentication key (FIDO credentials).

Figure 20:
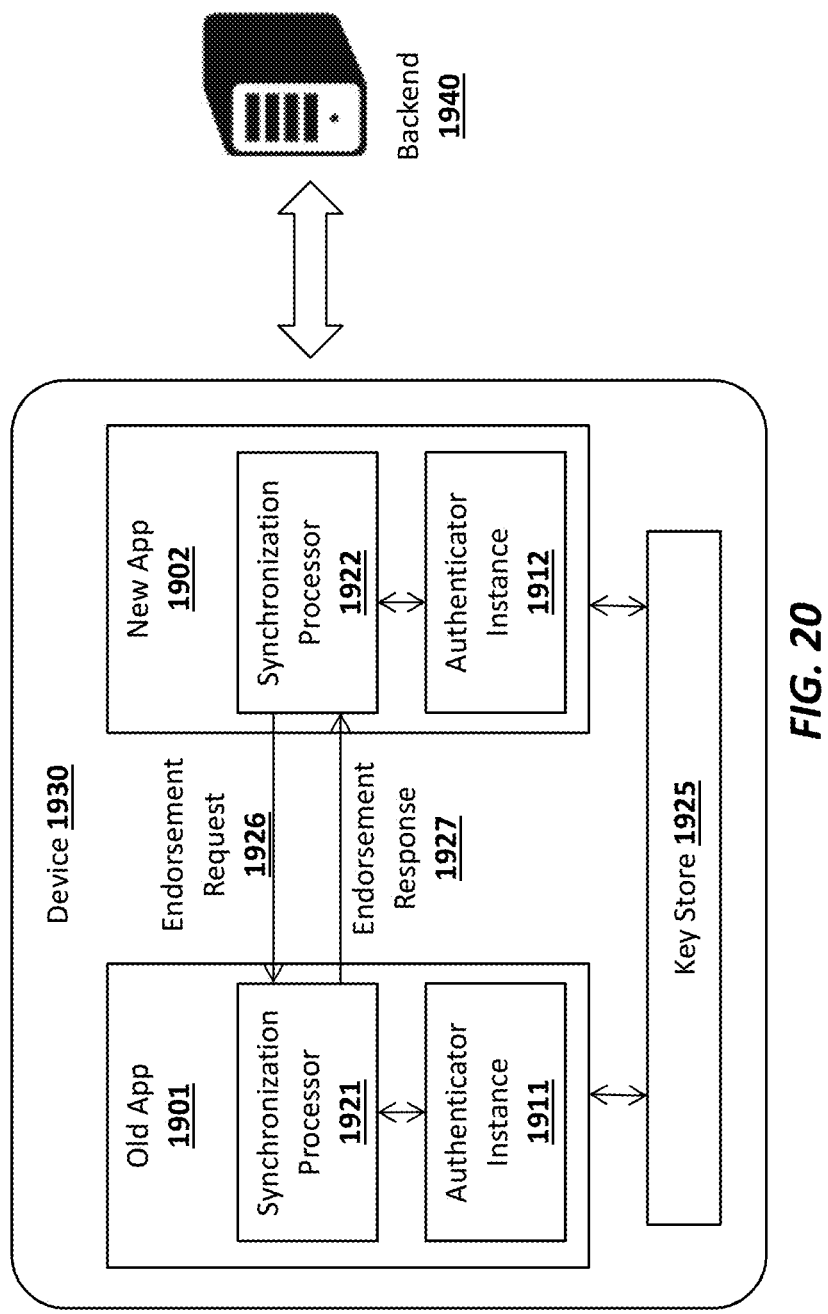

Referring now to FIG. 20, in one embodiment, synchronization processor 1921 on an old App 2901 and a synchronization processor 1922 in a new App 1902 implement the techniques described herein. In particular, when the user installs a new app 1902, the App 1902 checks whether other Apps 1901 supporting the same "Scheme" and having a registered authenticator 1911 are already installed. If so, then the synchronization processor 1922 of the new App 1902 sends an endorsement request 1926 to "endorse" the App's authenticator instance 1912 to the old App 1901. The synchronization processors described herein may be implemented in circuitry, program code executed on circuitry, or any combination thereof.

This endorsement request 1926 may include the public authentication key(s) and the attestation object generated by the new App's 1902's authenticator instance 1912. The endorsement request may include a public encryption key for the initial user verification reference data to be used for accessing the private authentication key.

In one embodiment, the old App's 1901's authenticator instance 1911, upon receipt of the request from the synchronization processor 1921, verifies the source of the request (e.g., using Caller Identification data associated with the request) against a trusted FacetID list. This list may have been retrieved from the backend server 1940 by old App 1911 or it may have been provided by the new App 1902 as a signed object with some version indication in order to protect against attacks replaying outdated FacetID list versions.

If the endorsement request is positively verified, the old App's 1901's authenticator instance 1911 generates an endorsement response 1927. This response 1927 may be a session token retrieved from the "Scheme" backend service 1940 or it could be a signed endorsement object created by the authenticator 1911 without having access to any backend server, but including the public authentication key and potentially parts of the or the entire attestation object as described above. See also FIGS. 2-6 and associated text. The initial user verification reference data used to gate use access to the related private authentication key may also be included. This data may be encrypted using the public encryption key included in the endorsement request described above.

In one embodiment, the endorsement response 1927 is returned to the synchronization processor 1922 of the calling new App 1902 which passes the endorsement response 1927 to the authenticator instance 1912. The authenticator instance 1912 retrieves the user verification reference data included in the response 1927, decrypts it using the key store 1925 and updates its own status to require this new user verification reference data before using the private authentication key.

Once a network connection to the backend service 1940 is available, the synchronization processor 1922 of the new App 1902 transmits the endorsement response 1927 to the backend service 1940 and retrieves an authenticated session either directly or after proving its possession of the private key related to one or more of the authentication keys generated by the authenticator instance 1912 as described above.

Figure 21:
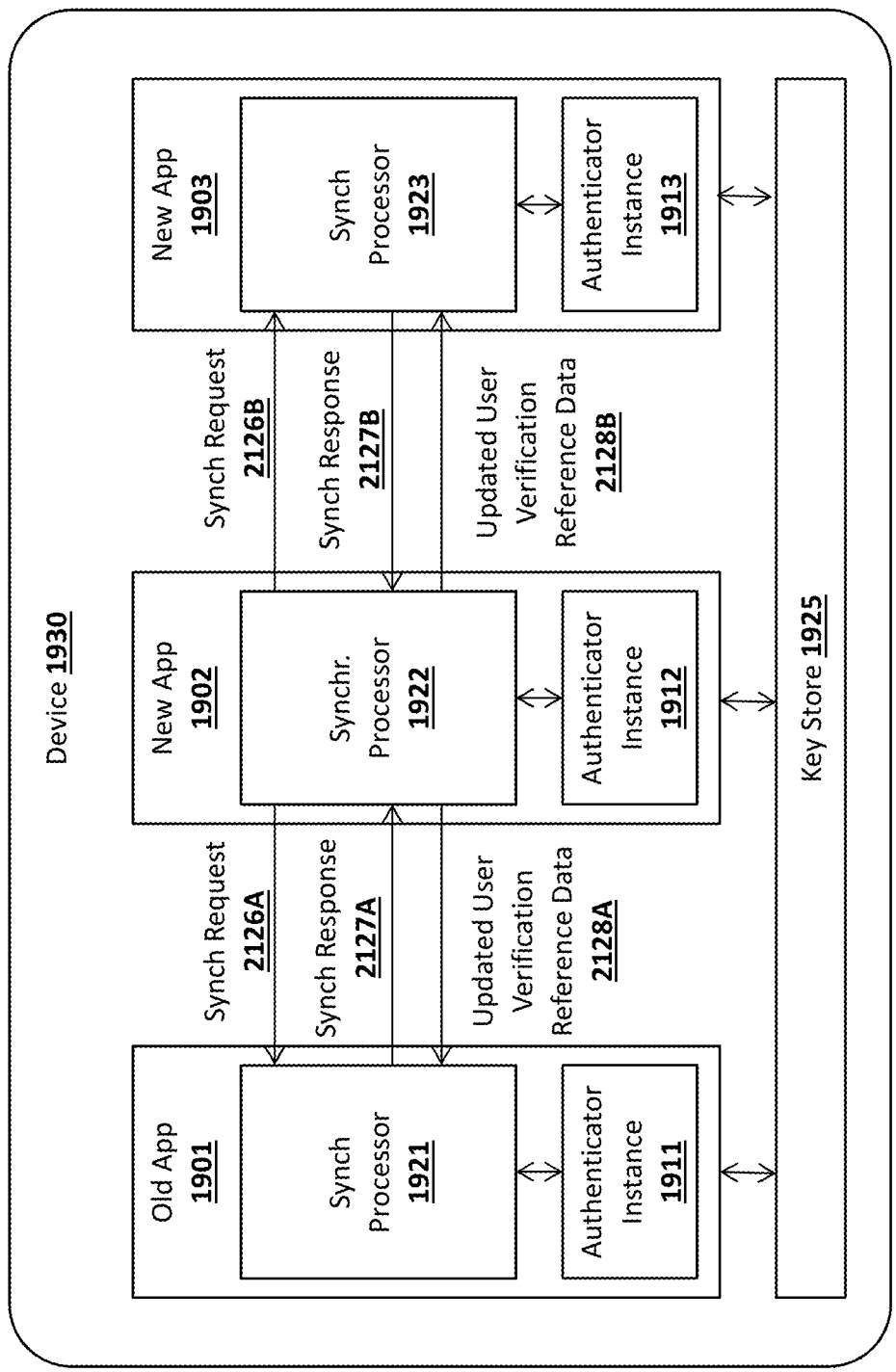

The following series of operations, described with respect to FIG. 21, are used in one embodiment for synchronizing User Verification Reference Data. In this embodiment, an App's authenticator instance 1912 receives a request from the user to change the verification reference data. A synchronization processor 1922 sends a synchronization request 2126A-B to each other App 1901, 1903 installed on the same device 1930 that supports the same "Scheme".

Each of the other Apps 1901, 1903 include synchronization processors 1921, 1923, respectively, which transmit synchronization responses 2127A-B with messages indicating interest in receiving the update. These responses 2127A-B may include an encryption key for the user verification reference data to be updated and may also include the latest version of the Signed FacetID list known to the other App 1901, 1903.

The App's authenticator instance 1912 verifies the source of that message (e.g., using Caller Identification) against a trusted FacetID list. This list may have been freshly retrieved from the server by the App 1902 or it may have been provided by one of the other Apps 1901, 1903 as a signed object with some version indication in order to protect against attacks replaying outdated FacetID list versions.

At 2128A-B, the synchronization processor 1922 provides the updated user verification reference data to the other synchronization processors 1921, 1923, making the reference data available to the other authenticator instances 1911, 1913. In one embodiment, this updated user verification reference data might be encrypted using the public encryption key received in the synchronization response(s) 2127A-B.

One embodiment uses an ASM-centric approach based on a FIDO authenticator supporting client-PIN as described in Client to Authenticator Protocol (CTAP) Implementation Draft, Feb. 27, 2018 (see, e.g., https://fidoalliance.org/specs/fido-v2.0-id-20180227/fido-client-to-authenticator-protocol-v2.0-id-20180227.html#authenticatorClientPIN). This may include, for example, a PIN entered into the ASM (or the platform) and send to the authenticator through an API. This embodiment uses an ASM embedded in the App to collect the PIN and to share it with other eligible Apps installed on the same device.

The ASM-centric approach may be implemented using the same or similar techniques as those described above. The difference is that it is not the authenticator remembering and sharing the PIN, but the ASM. As a consequence, any FIDO authenticator supporting the client-PIN can be used as long as it is possible to implement an ASM interfacing to the client-PIN specific API.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

We claim:

1. An apparatus comprising:
   a first instance of an authenticator associated with a first app to allow a user of the first app to authenticate with a first relying party;
   a hardware secure key store accessible by the first instance of the authenticator to securely store authentication data related to the first app;
   a first synchronization processor associated with the first app, the first synchronization processor to share at least a portion of the authentication data with a second instance of the authenticator associated with a second app to be executed on the apparatus, wherein to share the portion of the authentication data comprises providing initial user verification reference data to the second instance of the authenticator; and a second synchronization processor associated with the second app, the second synchronization processor to transmit to the first synchronization processor an endorsement request comprising an authentication public key, an attestation object generated by the second synchronization processor, and an encryption public key of an encryption public/private key pair;

wherein the first synchronization processor is to transmit an endorsement response to the second synchronization processor responsive to a positive verification of the endorsement request, the endorsement response comprising at least a portion of the attestation object and the initial user verification reference data encrypted with the encryption public key; and wherein the second instance of the authenticator is to receive the endorsement response from the second synchronization processor and to retrieve the initial user verification reference data from the endorsement response.

2. The apparatus of claim 1 wherein the initial user verification reference data comprises at least one of a personal identification number (PIN), a password, a pattern, and a biometric template.

3. The apparatus of claim 1 wherein the at least a portion of the authentication data comprises a first key associated with the first authenticator.

4. The apparatus of claim 1 wherein the first synchronization processor and second synchronization processor are to exchange messages to share updated user verification reference data.

5. The apparatus of claim 1 wherein the endorsement response includes a session token.

6. The apparatus of claim 1 wherein the endorsement request and/or the endorsement response includes a signature generated over some object including the authentication public key.

7. The apparatus of claim 1 wherein the first synchronization processor is to perform encryption of the at least a portion of the authentication data.

8. The apparatus of claim 1, wherein the second synchronization processor is to transmit, to a backend service, the at least a portion of the authentication data received from the synchronization processor to establish an authentication session with the backend service.

9. A method comprising:

installing, on a client device, a first instance of an authenticator associated with a first app to allow a user of the first app to authenticate with a first relying party, the first instance of the authenticator to securely store authentication data related to the first app in a hardware secure key store;

sharing at least a portion of the authentication data including initial user verification reference data with a second instance of the authenticator associated with a second app to be executed on the client device via a first synchronization processor associated with the first app and a second synchronization processor associated with the second app;

transmitting an endorsement request from the second synchronization processor to the first synchronization processor, the endorsement request comprising an authentication public key, an attestation object generated by the second synchronization processor, and an encryption public key of an encryption public/private key pair;

transmitting an endorsement response from the first synchronization processor to the second synchronization processor responsive to a positive verification of the endorsement request, the endorsement response comprising at least a portion of the attestation object and the initial user verification reference data encrypted with the encryption public key; and retrieving, by the second instance of the authenticator, the initial user verification reference data from the endorsement response using an encryption private key of the encryption public/private key pair.

10. The method of claim 9 wherein the initial user verification reference data comprises at least one of a personal identification number (PIN), a password, a pattern, and a biometric template.

11. The method of claim 9 wherein the at least a portion of the authentication data comprises a first key associated with the first authenticator.

12. The method of claim 9 wherein the first synchronization processor and second synchronization processor are to exchange messages to share updated user verification reference data.

13. The method of claim 9 wherein the endorsement response includes a session token.

14. The method of claim 9 wherein the endorsement request and/or the endorsement response includes a signature generated over some object including the authentication public key.

15. The method of claim 9 wherein the first synchronization processor is to perform encryption of the at least a portion of the authentication data.

16. A machine-readable medium having program code stored thereon which, when executed by one or more computing devices, causes the one or more computing devices to perform the operations of:

installing, on a client device, a first instance of an authenticator associated with a first app to allow a user of the first app to authenticate with a first relying party, the first instance of the authenticator to securely store authentication data related to the first app in a hardware secure key store;

sharing at least a portion of the authentication data including initial user verification reference data with a second instance of the authenticator associated with a second app to be executed on the client device via a first synchronization processor associated with the first app and a second synchronization processor associated with the second app;

transmitting an endorsement request from the second synchronization processor to the first synchronization processor, the endorsement request comprising an authentication public key, an attestation object generated by the second synchronization processor, and an encryption public key of an encryption public/private key pair;

transmitting an endorsement response from the first synchronization processor to the second synchronization processor responsive to a positive verification of the endorsement request, the endorsement response comprising at least a portion of the attestation object and the initial user verification reference data encrypted with the encryption public key; and retrieving, by the second instance of the authenticator, the initial user verification reference data from the endorsement response.

17. The machine-readable medium of claim 16 wherein the initial user verification reference data comprises at least one of a personal identification number (PIN), a password, a pattern, and a biometric template.

18. The machine-readable medium of claim 16 wherein the at least a portion of the authentication data comprises a first key associated with the first authenticator.

\* \* \* \* \*